United States Patent
Tateishi et al.

(10) Patent No.: US 12,528,945 B2
(45) Date of Patent: Jan. 20, 2026

(54) DYE INK COMPOSITION, CYAN DYE INK, DYE INK FOR INK JET RECORDING, INK JET RECORDING METHOD, AND AQUEOUS DYE SOLUTION

(71) Applicant: FUJIFILM Corporation, Tokyo (JP)

(72) Inventors: Keiichi Tateishi, Kanagawa (JP); Takashi Saitou, Kanagawa (JP); Yuta Takasaki, Kanagawa (JP); Yusuke Sakai, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 1011 days.

(21) Appl. No.: 17/672,694

(22) Filed: Feb. 16, 2022

(65) Prior Publication Data

US 2022/0169859 A1 Jun. 2, 2022

Related U.S. Application Data

(63) Continuation of application No. PCT/JP2020/031689, filed on Aug. 21, 2020.

(30) Foreign Application Priority Data

Aug. 23, 2019 (JP) .................. 2019-153292
Mar. 30, 2020 (JP) .................. 2020-061656

(51) Int. Cl.
| | | |
|---|---|---|
| C09B 67/22 | (2006.01) | |
| C09B 47/06 | (2006.01) | |
| C09B 67/12 | (2006.01) | |
| C09D 11/037 | (2014.01) | |

(52) U.S. Cl.
CPC ........ *C09B 67/0035* (2013.01); *C09B 47/065* (2013.01); *C09B 67/0016* (2013.01); *C09D 11/037* (2013.01)

(58) Field of Classification Search
CPC .............. C09B 67/0035; C09B 47/065; C09B 67/0016; C09B 67/0083; C09D 11/037; C09D 11/38; C09D 11/328
See application file for complete search history.

(56) References Cited

U.S. PATENT DOCUMENTS

| | | |
|---|---|---|
| 2005/0073563 A1 | 4/2005 | Hanaki et al. |
| 2005/0215773 A1 | 9/2005 | Tateishi et al. |
| 2008/0178766 A1 | 7/2008 | Mcgorrin |
| 2009/0269496 A1 | 10/2009 | Tateishi et al. |
| 2010/0080909 A1* | 4/2010 | Nakano .................. B41M 5/52 427/256 |
| 2014/0238264 A1 | 8/2014 | Fujie et al. |
| 2015/0240096 A1* | 8/2015 | Fujie .................. C08K 5/3492 106/31.47 |
| 2020/0248024 A1* | 8/2020 | Hama .................. C09B 67/0035 |

FOREIGN PATENT DOCUMENTS

| | | |
|---|---|---|
| CN | 1653138 | 8/2005 |
| CN | 101600767 | 12/2009 |
| CN | 103917607 | 7/2014 |
| CN | 104797658 | 7/2015 |
| EP | 2921530 | 9/2015 |
| JP | 2003238864 | 8/2003 |
| JP | 2004002670 | 1/2004 |
| JP | 2008088345 | 4/2008 |
| JP | 2010037504 | 2/2010 |
| JP | 2010037504 A * | 2/2010 |
| JP | 2010516889 | 5/2010 |
| JP | 2013112800 | 6/2013 |
| JP | 2013129805 | 7/2013 |
| JP | 5560043 | 7/2014 |
| WO | 2014077291 | 5/2014 |

OTHER PUBLICATIONS

English machine translation of JP-2010037504-A (Year: 2010).*
"Office Action of Japan Counterpart Application", issued on Jul. 11, 2023, with English translation thereof, p. 1-p. 4.
"International Search Report (Form PCT/ISA/210) of PCT/JP2020/031689," mailed on Nov. 2, 2020, with English translation thereof, pp. 1-6.
"Written Opinion of the International Searching Authority (Form PCT/ISA/237)" of PCT/ JP2020/031689, mailed on Nov. 2, 2020, with English translation thereof, pp. 1-10.
"Search Report of Europe Counterpart Application", issued on Sep. 12, 2022, p. 1-p. 8.
Office Action of China Counterpart Application, with English translation thereof, issued on Aug. 8, 2022, pp. 1-20.
"Office Action of Japan Counterpart Application", issued on Feb. 28, 2023, with English translation thereof, p. 1-p. 12.

* cited by examiner

Primary Examiner — Amber R Orlando
Assistant Examiner — Jeffrey Eugene Barzach
(74) Attorney, Agent, or Firm — JCIPRNET

(57) ABSTRACT

A dye ink composition includes: a compound A represented by the general formula (I-1) as defined herein; a compound B represented by the general formula (I-2) as defined herein; at least one of a compound C-I represented by the general formula (I-3-1) as defined herein or a compound C-II represented by the general formula (I-3-2) as defined herein; a compound D represented by the general formula (I-4) as defined herein; and water.

20 Claims, No Drawings

DYE INK COMPOSITION, CYAN DYE INK, DYE INK FOR INK JET RECORDING, INK JET RECORDING METHOD, AND AQUEOUS DYE SOLUTION

CROSS REFERENCE TO RELATED APPLICATION

This is a continuation of International Application No. PCT/JP2020/031689 filed on Aug. 21, 2020, and claims priorities from Japanese Patent Application No. 2019-153292 filed on Aug. 23, 2019 and Japanese Patent Application No. 2020-061656 filed on Mar. 30, 2020, the entire disclosures of which are incorporated herein by reference.

BACKGROUND OF THE INVENTION

1. Field of the Invention

The present invention relates to a dye ink composition, a cyan dye ink, a dye ink for ink jet recording, an ink jet recording method, and an aqueous dye solution.

2. Description of the Related Art

Dye ink compositions including phthalocyanine dyes are known in the related art.

For example, JP5560043B discloses an ink jet ink that includes a phthalocyanine dye having specific substituents, a specific liquid vehicle, and imidazole.

SUMMARY OF THE INVENTION

Ink jet paper (also referred to as "ink jet glossy paper", "photo paper", or the like) that has an ink-receiving layer having a function of absorbing an ink and fixing a colorant is generally used as a recording material to which an ink jet recording method is applied.

Recently, from the viewpoint of the operating cost (low material cost and being free of maintenance) and the like, more and more users are switching from an electrophotographic recording process using color toners to an ink jet process, also for application to documents in, for example, homes and offices.

In view of such situations, dye ink compositions that exhibit high printing density to recording materials of both ink jet paper and plain paper have been desired.

Furthermore, in recent years, ink jet printers mounting large-volume ink-tanks having a volume of 50 mL or more have been developed, and such ink jet printers mounting large volume ink-tanks are said to be excellent in terms of, for example, printing cost because the frequency at which an ink cartridge is replaced can be reduced.

On the other hand, however, dye ink compositions used in such ink jet printers mounting large-volume ink-tanks are required to have continuous ejection stability at a level that has not been achieved in the related art. In addition, storage stability at a level that has not been achieved in the related art is required because inks remain in the large-volume ink-tanks for a long period.

In JP5560043B, no investigations from these points of view are performed, and the above-described new problems that do not arise in the related art cannot be addressed.

That is, an object of the present invention is to provide a dye ink composition that enables the formation of an image having high printing density on both ink jet paper and plain paper, that enables stable ejection of an ink even during long time use (that has good continuous ejection stability), and that enables the formation of an image having high printing density and has good continuous ejection stability even after a long period of time has passed after preparation; a cyan dye ink including the dye ink composition; a dye ink for ink jet recording, the dye ink including the dye ink composition; an ink jet recording method using the dye ink for ink jet recording; and an aqueous dye solution that can be used to produce the dye ink composition.

The inventors of the present invention have found that the above object can be achieved by the configurations described below.

[1]

A dye ink composition includes a compound A represented by the following general formula (I-1), a compound B represented by the following general formula (I-2), at least one of a compound C-I represented by the following general formula (I-3-1) or a compound C-II represented by the following general formula (I-3-2), a compound D represented by the following general formula (I-4), and water.

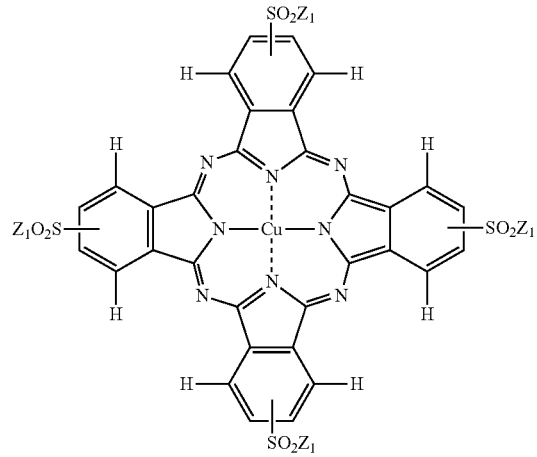

(I-1)

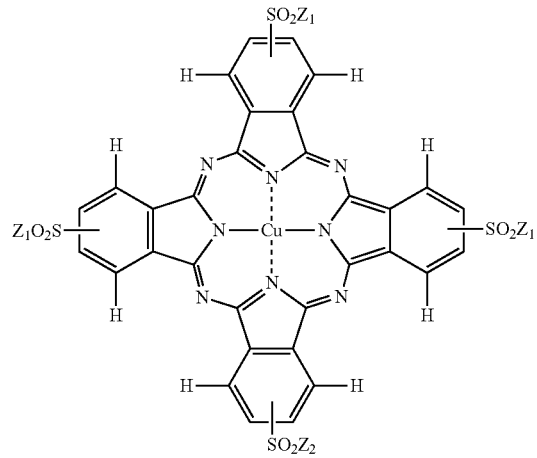

(I-2)

(I-3-1)

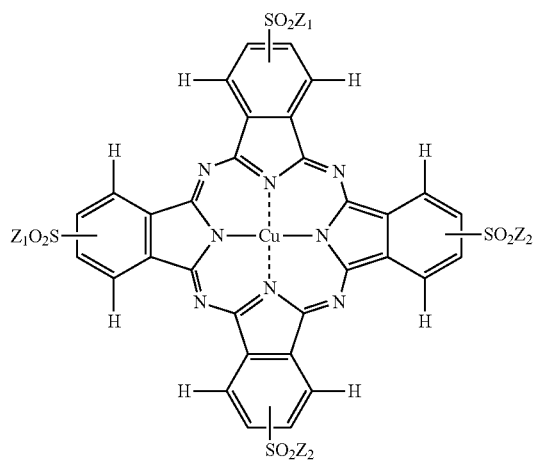

(I-3-2)

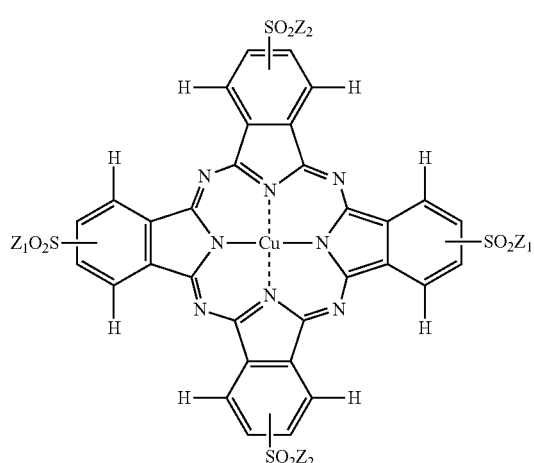

(I-4)

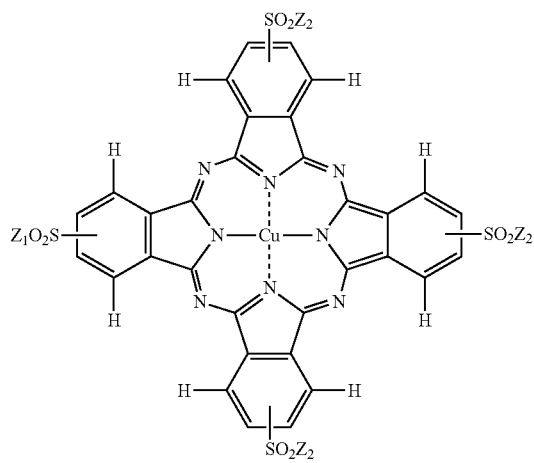

In the general formulae (I-1), (I-2), (I-3-1), (I-3-2), and (I-4), each $Z_1$ represents an alkyl group, an aryl group, or a heterocyclic group, the alkyl group, the aryl group, and the heterocyclic group having a substituent that has at least one ionic hydrophilic group. A plurality of $Z_1$'s in the general formulae (I-1), (I-2), (I-3-1), and (I-3-2) may be the same as or different from each other.

In the general formulae (I-2), (I-3-1), (I-3-2), and (I-4), each $Z_2$ represents a substituted or unsubstituted alkyl group, a substituted or unsubstituted aryl group, or a substituted or unsubstituted heterocyclic group; each $Z_2$ does not have an ionic hydrophilic group. A plurality of $Z_2$'s in the general formulae (I-3-1), (I-3-2), and (I-4) may be the same as or different from each other.

In the dye ink composition, in a case where a mass of the compound A is represented by $W_1$, a mass of the compound B is represented by $W_2$, a sum of a mass of the compound C-I and a mass of the compound C-II is represented by $W_3$, a mass of the compound D is represented by $W_4$, and a total sum of $W_1$, $W_2$, $W_3$, and $W_4$ is represented by $W_{A1}$, a ratio of $W_1$ to $W_{A1}$ is 6.0% to 35.0% by mass, a ratio of $W_2$ to $W_{A1}$ is 20.0% to 45.0% by mass, a ratio of $W_3$ to $W_{A1}$ is 15.0% to 45.0% by mass, and a ratio of $W_4$ to $W_{A1}$ is 1.0% to 30.0% by mass.

[2]

In the dye ink composition according to [1], $Z_2$ has at least one of a hydroxy group or a tertiary nitrogen atom.

[3]

In the dye ink composition according to [1] or [2], the ionic hydrophilic group is at least one of —$SO_3M$, —$CO_2M$, or —$PO(OM)_2$ wherein M represents a hydrogen atom or a counter cation.

[4]

In the dye ink composition according to any one of [1] to [3], a ratio of $W_{A1}$ to a total mass of the dye ink composition is 3.0% by mass or more and 5.5% by mass or less.

[5]

The dye ink composition according to any one of [1] to [4], further includes a compound represented by the following general formula (II).

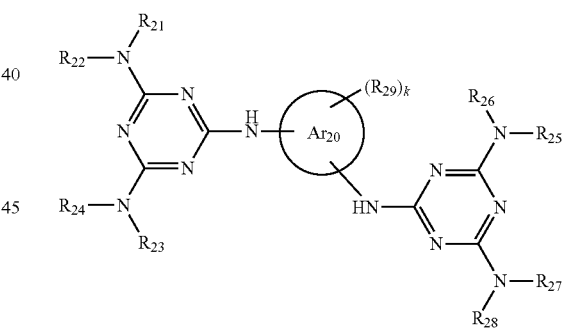

(II)

In the general formula (II), $Ar_{20}$ represents a benzene ring or a naphthalene ring. $R_{21}$ to $R_{28}$ each independently represent a hydrogen atom or a substituent. $R_{21}$ and $R_{22}$ may be linked to each other to form a ring. $R_{23}$ and $R_{24}$ may be linked to each other to form a ring. $R_{25}$ and $R_{26}$ may be linked to each other to form a ring. $R_{27}$ and $R_{28}$ may be linked to each other to form a ring. $R_{29}$ represents a substituent. In a case where $Ar_{20}$ represents a benzene ring, k represents an integer of 0 to 4. In a case where $Ar_{20}$ represents a naphthalene ring, k represents an integer of 0 to 6. In a case where a plurality of $R_{29}$'s are present, the plurality of $R_{29}$'s may be the same as or different from each other. In a case where a plurality of $R_{29}$'s are present, the plurality of $R_{29}$'s may be linked to each other to form a ring. However, at least any one of $R_{21}$ to $R_{29}$ has a hydrophilic group.

[6]

In the dye ink composition according to [5], a content of the compound represented by the general formula (II) is 0.5% to 3.0% by mass with respect to a total mass of the dye ink composition.

[7]

The dye ink composition according to any one of [1] to [6] further includes a compound represented by the following general formula (Cy-1).

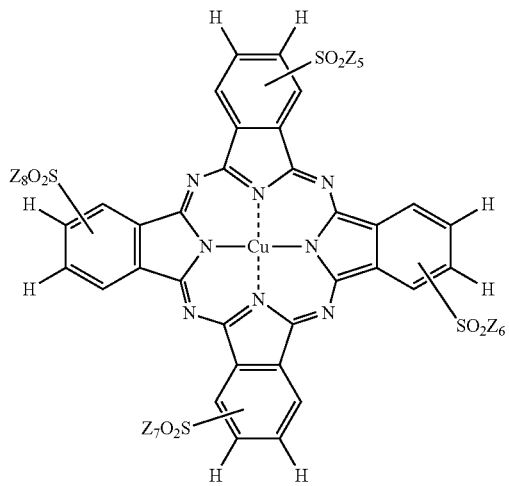

(Cy-1)

In the general formula (Cy-1), $Z_5$, $Z_6$, $Z_7$, and $Z_8$ each independently represent a substituted or unsubstituted alkyl group, a substituted or unsubstituted aryl group, or a substituted or unsubstituted heterocyclic group, and at least one of $Z_5$, $Z_6$, $Z_7$, or $Z_8$ has a substituent that has an ionic hydrophilic group.

[8]

The dye ink composition according to any one of [1] to [7] further includes a compound represented by any of the following general formulae (Cy-2) to (Cy-5).

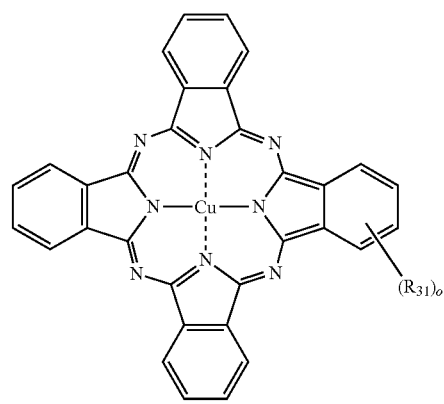

(Cy-2)

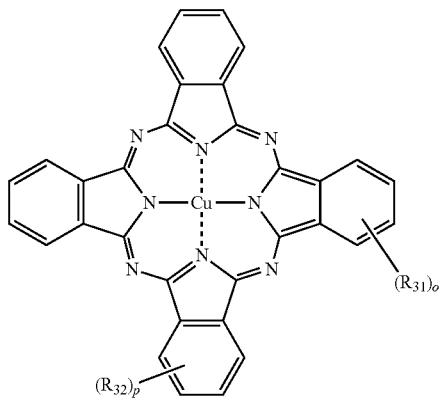

(Cy-3)

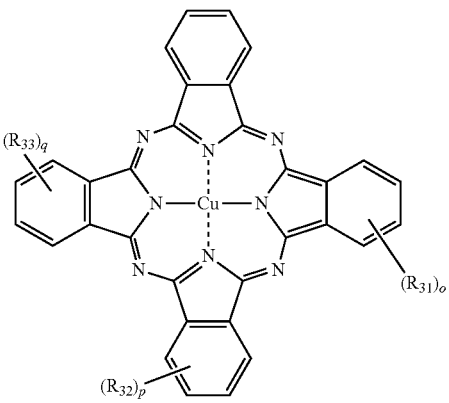

(Cy-4)

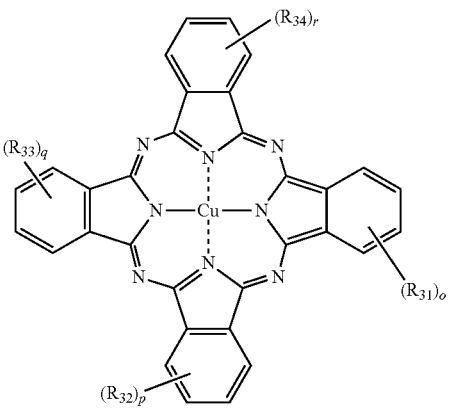

(Cy-5)

In the general formulae (Cy-2) to (Cy-5), $R_{31}$, $R_{32}$, $R_{33}$, and $R_{34}$ each independently represent a substituted or unsubstituted sulfamoyl group, a substituted or unsubstituted carbamoyl group, a sulfo group, or a carboxy group. In a case where a plurality of $R_{13}$'s are present, the plurality of $R_{31}$'s may be the same as or different from each other. In a case where a plurality of $R_{32}$'s are present, the plurality of $R_{32}$'s may be the same as or different from each other. In a case where a plurality of $R_{33}$'s are present, the plurality of $R_{33}$'s may be the same as or different from each other. In a case where a plurality of $R_{34}$'s are present, the plurality of $R_{34}$'s may be the same as or different from each other. o, p, q, and r each independently represent an integer of 1 to 4.

[9]

The dye ink composition according to any one of [1] to [8] further includes a chelating agent.

[10]

The dye ink composition according to any one of [1] to [9] further includes a preservative.

[11]

A cyan dye ink includes the dye ink composition according to any one of [1] to [10].

[12]

A dye ink for ink jet recording includes the dye ink composition according to any one of [1] to [11].

[13]

An ink jet recording method includes ejecting the dye ink for ink jet recording according to [12] with a recording head for an ink jet process.

[14]

An aqueous dye solution including: a preservative, a compound A represented by the following general formula (I-1), a compound B represented by the following general formula (I-2), at least one of a compound C-I represented by the following general formula (I-3-1) or a compound C-II represented by the following general formula (I-3-2), and a compound D represented by the following general formula (I-4), wherein, in the aqueous dye solution, in a case where a mass of the compound A is represented by $W_1$, a mass of the compound B is represented by $W_2$, a sum of a mass of the compound C-I and a mass of the compound C-II is represented by $W_3$, a mass of the compound D is represented by $W_4$, and a total sum of $W_1$, $W_2$, $W_3$, and $W_4$ is represented by $W_{A1}$, a ratio of $W_{A1}$ to a total mass of the aqueous dye solution is 8% to 15% by mass.

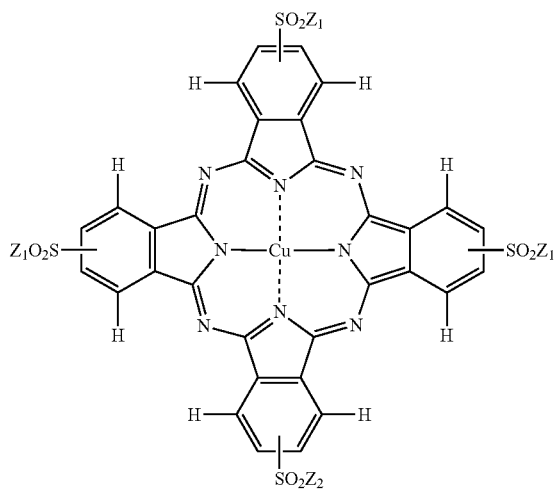

(I-2)

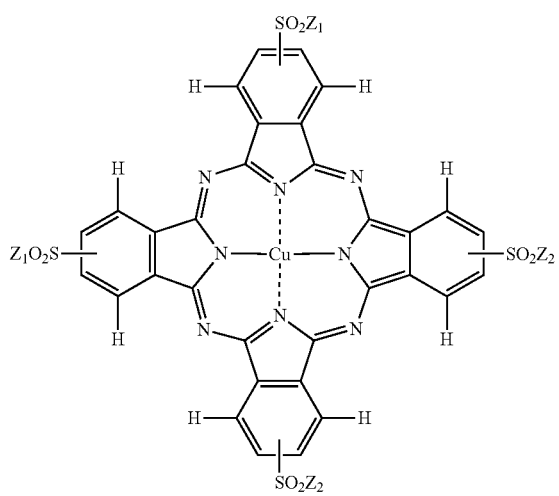

(I-3-1)

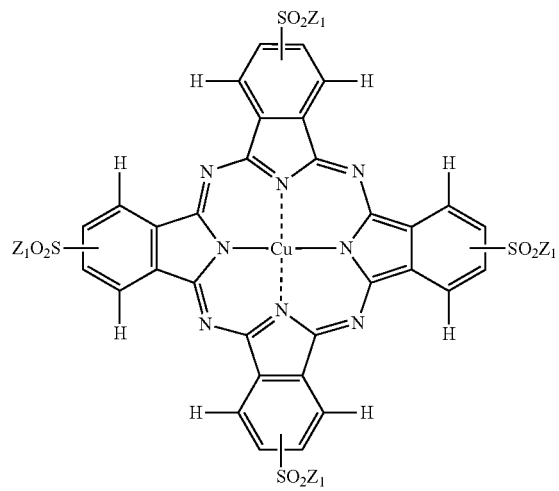

(I-1)

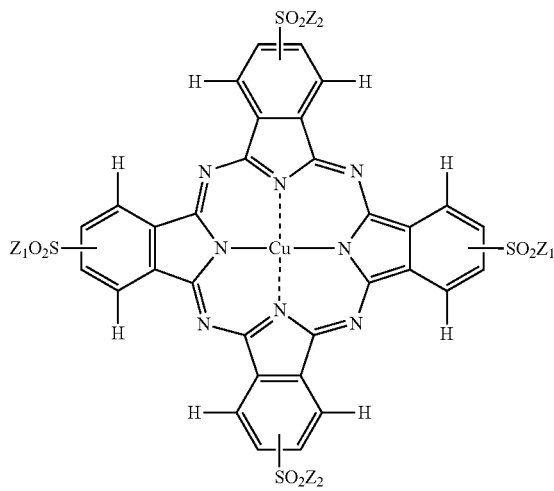

(I-3-2)

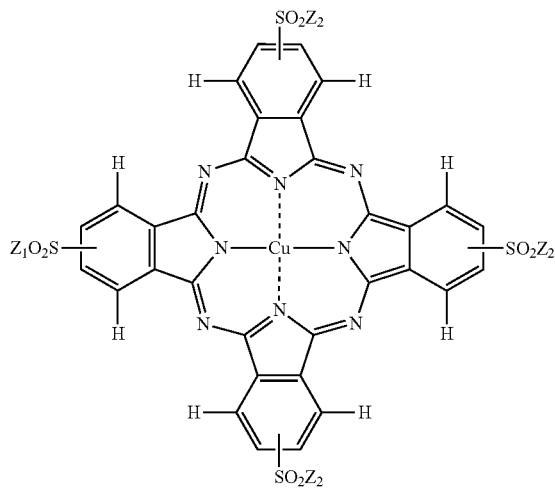

(I-4)

In the general formulae (I-1), (I-2), (I-3-1), (I-3-2), and (I-4), each $Z_1$ represents an alkyl group, an aryl group, or a heterocyclic group, the alkyl group, the aryl group, and the heterocyclic group having a substituent that has at least one ionic hydrophilic group. A plurality of $Z_1$'s in the general formulae (I-1), (I-2), (I-3-1), and (I-3-2) may be the same as or different from each other.

In the general formulae (I-2), (I-3-1), (I-3-2), and (I-4), each $Z_2$ represents a substituted or unsubstituted alkyl group, a substituted or unsubstituted aryl group, or a substituted or unsubstituted heterocyclic group, and each $Z_2$ does not have an ionic hydrophilic group. A plurality of $Z_2$'s in the general formulae (I-3-1), (I-3-2), and (I-4) may be the same as or different from each other.

[15]

In the aqueous dye solution according to [14], further comprising a compound E represented by the following general formula (I-5), and in a case where a mass of the compound E is represented by $W_5$ and a total sum of $W_1$, $W_2$, $W_3$, $W_4$, and $W_5$ is represented by $W_{A2}$, a ratio of $W_{A2}$ to the total mass of the aqueous dye solution is 8% to 15% by mass.

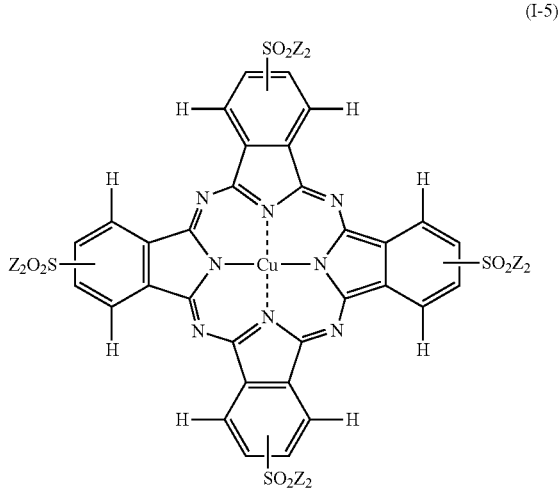

(I-5)

In the general formula (I-5), each $Z_2$ represents a substituted or unsubstituted alkyl group, a substituted or unsubstituted aryl group, or a substituted or unsubstituted heterocyclic group, and each $Z_2$ does not have an ionic hydrophilic group. A plurality of $Z_2$'s may be the same as or different from each other.

[16]

The aqueous dye solution according to [14] or [15] further includes a compound represented by the following general formula (II).

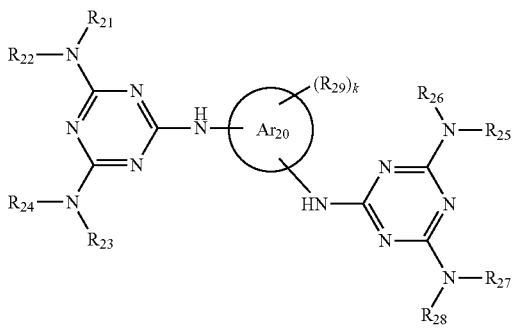

(II)

In the general formula (II), $Ar_{20}$ represents a benzene ring or a naphthalene ring. $R_{21}$ to $R_{28}$ each independently represent a hydrogen atom or a substituent. $R_{21}$ and $R_{22}$ may be linked to each other to form a ring. $R_{23}$ and $R_{24}$ may be linked to each other to form a ring. $R_{25}$ and $R_{26}$ may be linked to each other to form a ring. $R_{27}$ and $R_{28}$ may be linked to each other to form a ring. $R_{29}$ represents a substituent. In a case where $Ar_{20}$ represents a benzene ring, k represents an integer of 0 to 4. In a case where $Ar_{20}$ represents a naphthalene ring, k represents an integer of 0 to 6. In a case where a plurality of $R_{29}$'s are present, the plurality of $R_{29}$'s may be the same as or different from each other. In a case where a plurality of $R_{29}$'s are present, the plurality of $R_{29}$'s may be linked to each other to form a ring. However, at least any one of $R_{21}$ to $R_{29}$ has a hydrophilic group.

[17]

The aqueous dye solution according to any one of [14] to [16] further includes a chelating agent.

According to the present invention, it is possible to provide a dye ink composition that enables the formation of an image having high printing density on both ink jet paper and plain paper, that enables stable ejection of an ink even during long time use (that has good continuous ejection stability), and that enables the formation of an image having high printing density and has good continuous ejection stability even after a long period of time has passed after preparation; a cyan dye ink including the dye ink composition; a dye ink for ink jet recording, the dye ink including the dye ink composition; an ink jet recording method using the dye ink for ink jet recording; and an aqueous dye solution that can be used to produce the dye ink composition.

DESCRIPTION OF THE PREFERRED EMBODIMENTS

Hereafter, the present invention will be described in detail with reference to preferred embodiments.

Dye Ink Composition

A dye ink composition according to the present invention is a dye ink composition that includes a compound A represented by general formula (I-1) below, a compound B represented by general formula (I-2) below, at least one of a compound C-I represented by general formula (I-3-1) below or a compound C-II represented by general formula (I-3-2) below, a compound D represented by general formula (I-4) below, and water.

(I-1)

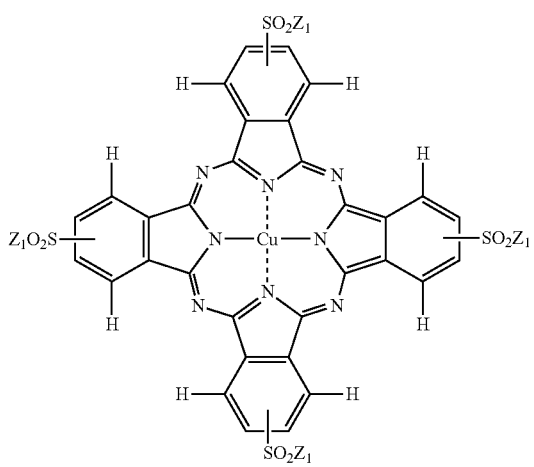

(I-2)

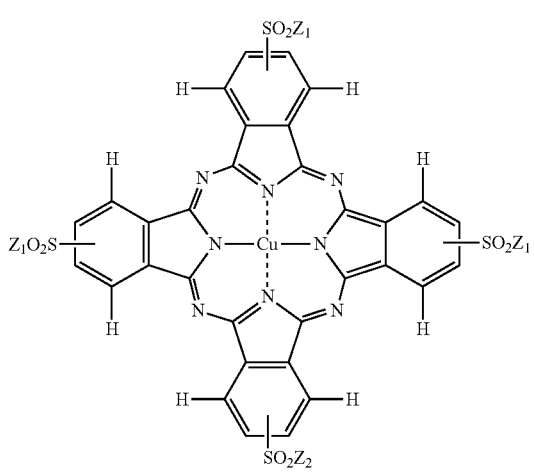

(I-3-1)

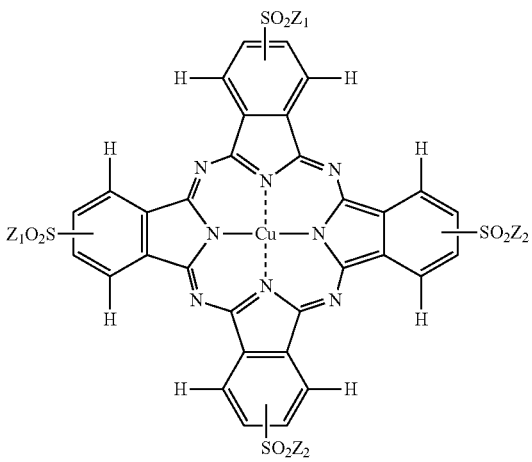

(I-3-2)

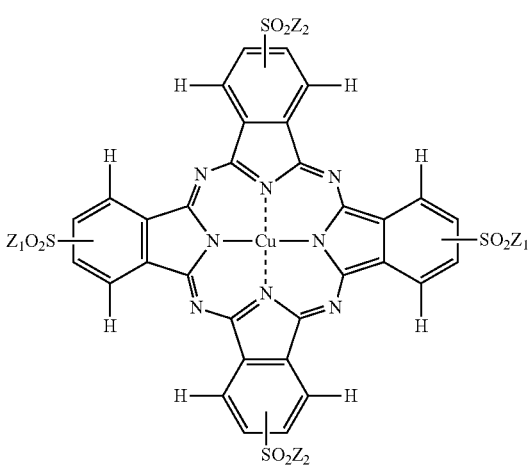

(I-4)

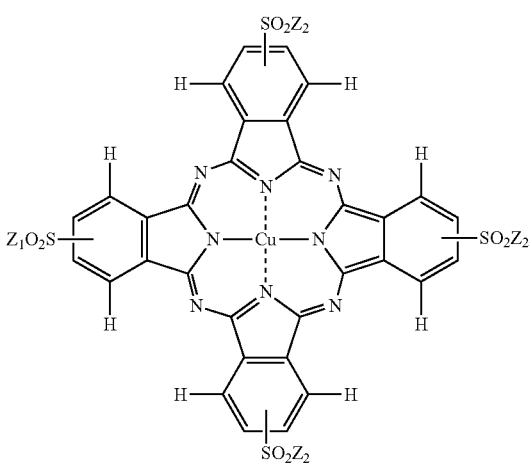

In general formulae (I-1), (I-2), (I-3-1), (I-3-2), and (I-4), each $Z_1$ represents an alkyl group, aryl group, or heterocyclic group having a substituent that includes at least one ionic hydrophilic group. The plurality of $Z_1$'s in general formulae (I-1), (I-2), (I-3-1), and (I-3-2) may be the same or different.

In general formulae (I-2), (I-3-1), (I-3-2), and (I-4), each $Z_2$ represents a substituted or unsubstituted alkyl group, a substituted or unsubstituted aryl group, or a substituted or unsubstituted heterocyclic group, provided that each $Z_2$ does not have an ionic hydrophilic group. The plurality of $Z_2$'s in general formulae (I-3-1), (I-3-2), and (I-4) may be the same or different.

The reason why the dye ink composition according to the present invention enables the formation of an image having high printing density on both ink jet paper and plain paper, has good continuous ejection stability, and enables the formation of an image having high printing density and has good continuous ejection stability even after a long period of time has passed after preparation has not been completely clarified; however, the inventors of the present invention assume that the reason is as follows.

The use of a dye ink composition that includes an existing water-soluble phthalocyanine dye enables the formation of an image with a cyan hue by an ink jet recording method. In the image immediately after the formation, the phthalocyanine dye is considered to form a relatively stable association state of the dye in an aqueous medium. Next, during drying of the dye ink composition, together with a change in the temperature and humidity of the surrounding environment, the water-soluble phthalocyanine dye is considered to proceed to a more stable association state of the dye with the temperature and moisture serving as driving force. It is assumed that a decrease in wavelength of the hue and a simultaneous decrease in the color value occur, and consequently, the printing density decreases.

Furthermore, in the case of the dye ink composition that includes an existing water-soluble phthalocyanine dye, when an image is formed not on ink jet paper, which has an ink-receiving layer supported on porous silica or alumina, but on plain paper, the dye ink composition penetrates as it is in the thickness direction of base paper. Therefore, when droplets of the dye ink composition are ejected onto plain paper, the resulting image is considered to have a lower reflection density than that in the case where droplets of the dye ink composition are ejected onto ink jet paper, as long as the amount of dye ink composition ejected in the form of droplets is the same.

In contrast, in the present invention, since the compound A, the compound B, at least one of the compound C-I or the compound C-II, and the compound D are used as a coloring agent, in an image immediately after being formed by the ink jet recording method, the compound A, the compound B, at least one of the compound C-I or the compound C-II, and the compound D can be stabilized by the effect of the intermolecular interaction. It is assumed that, as a result, a high-order associate is formed to increase the apparent molecular weight of the phthalocyanine-based dyes, and the dye ink composition is less likely to penetrate in the depth direction of plain paper (the coloring agent is easily localized in a surface portion of the paper); therefore, high printing density (an increase in reflection density) could be achieved.

In addition, when an image is formed on plain paper, the dye ink composition having a strong interaction between molecules of the phthalocyanine dye of the compound A, the compound B, at least one of the compound C-I or the compound C-II, and the compound D also interacts with, for example, cellulose fibers constituting base paper and is thereby less likely to penetrate as it is in the thickness direction of the base paper, and as a result, the reflection density is less likely to decrease. This is considered to be another mechanism by which high printing density could be realized.

Furthermore, it is considered that since the compound A having high water solubility and the compound D that induces a strong intermolecular interaction coexist in the dye ink composition according to the present invention, it was possible to achieve continuous ejection stability and storage stability at higher levels than those in the related art (the performance that an image with high printing density can be formed and good continuous election stability of an ink is also achieved even after the dye ink composition is preserved for a long period of time after preparation). More specifically, the above effect is considered to be exhibited because the presence of the compound A having the highest water solubility enhances compatibility of the mixture of the compound A to the compound D in the water medium.

In the present invention, when a compound is a salt, the salt is present in the water-soluble ink in such a manner that the salt is dissolved in a state of being completely dissociated into ions. When the compound has an ionic hydrophilic group having a high acid dissociation constant (pKa), the compound may be present in such a manner that most part is dissociated, and a part is dissolved in a salt state.

Compound A

The compound A in the present invention will be described.

The compound A is a compound represented by general formula (I-1) below.

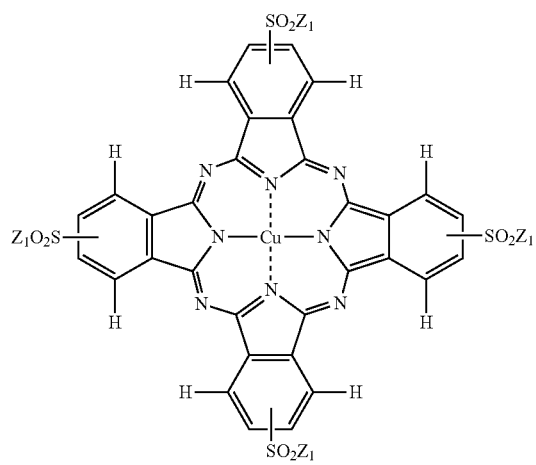

(I-1)

In general formula (I-1), each $Z_1$ represents an alkyl group, aryl group, or heterocyclic group having a substituent that includes at least one ionic hydrophilic group. The plurality of $Z_1$'s may be the same or different.

The compound A is a phthalocyanine dye in which substituted sulfonyl groups (—$SO_2$—$Z_1$) are introduced to β positions of the phthalocyanine skeleton. That is, in general formula (I-1), —$SO_2$—$Z_1$ replace hydrogen atoms at β positions of the phthalocyanine skeleton but do not replace hydrogen atoms at α positions of the phthalocyanine skeleton. All the four —$SO_2$—$Z_1$ in general formula (I-1) are preferably the same group.

The α positions and the β positions of the phthalocyanine skeleton are as illustrated in formula (a) below.

(a)

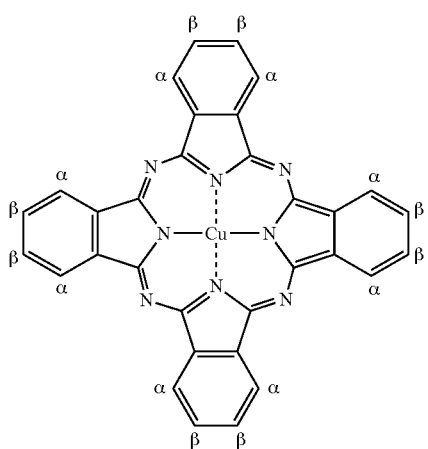

In general formula (I-1), each $Z_1$ represents an alkyl group, aryl group, or heterocyclic group having a substituent that includes at least one ionic hydrophilic group.

"The alkyl group, aryl group, or heterocyclic group having a substituent that includes at least one ionic hydrophilic group" may be "an alkyl group, aryl group, or heterocyclic group having, as a substituent, at least one ionic hydrophilic group" or may be "an alkyl group, aryl group, or heterocyclic group having, as a substituent, a group other than an ionic hydrophilic group, the group being substituted with at least one ionic hydrophilic group".

$Z_1$ preferably represents an alkyl group or aryl group having a substituent that includes at least one ionic hydrophilic group and more preferably represents an alkyl group having a substituent that includes at least one ionic hydrophilic group.

When $Z_1$ represents an alkyl group having a substituent that includes at least one ionic hydrophilic group, the alkyl group is not particularly limited but is preferably an alkyl group having 1 to 8 carbon atoms, more preferably an alkyl group having 1 to 6 carbon atoms, and still more preferably an alkyl group having 3 to 5 carbon atoms from the viewpoints of water solubility of the dye and stability of the substituent. The alkyl group may be linear, branched, or cyclic but is preferably a linear alkyl group having 3 to 5 carbon atoms from the viewpoints of availability of raw materials and water solubility of the dye. Specific examples of the alkyl group include a methyl group, an ethyl group, a n-propyl group, an i-propyl group, a n-butyl group, an isobutyl group, a sec-butyl group, a t-butyl group, and a n-pentyl group.

In the present specification, an "alkyl group" may be linear, branched, or cyclic. That is, the "alkyl group" also includes a cycloalkyl group, a bicycloalkyl group, and the like. This also applies to an alkyl group in other substituents (for example, an alkyl group in an alkyloxy group or an alkylthio group). This also applies to an "alkenyl group" and an "alkynyl group".

When $Z_1$ represents an aryl group having a substituent that includes at least one ionic hydrophilic group, the aryl group is not particularly limited but is preferably an aryl group having 6 to 14 carbon atoms, more preferably an aryl group having 6 to 12 carbon atoms, and particularly preferably an aryl group having 6 to 10 carbon atoms from the viewpoints of availability of raw materials and water solubility of the dye. Specific examples of the aryl group include a phenyl group and a naphthyl group.

When $Z_1$ represents a heterocyclic group having a substituent that includes at least one ionic hydrophilic group, the heterocyclic group is not particularly limited but is preferably a heterocyclic group having 2 to 12 carbon atoms, more preferably a heterocyclic group having 2 to 8 carbon atoms, and particularly preferably a heterocyclic group having 2 to 6 carbon atoms from the viewpoints of availability of raw materials, water solubility of the dye, and stability of the substituent. Examples of heteroatoms included in the heterocyclic group include, but are not particularly limited to, a sulfur atom, a nitrogen atom, and an oxygen atom.

The ionic hydrophilic group is a group selected from the group consisting of a sulfo group (—$SO_3M$), a carboxy group (—$CO_2M$), a thiocarboxy group, a sulfino group (—$SO_2M$), a phosphono group (—PO(OT)(OM)), a dihydroxyphosphino group, a phosphate group (—$PO(OM)_2$), a quaternary ammonium group, an acylsulfamoyl group (—$SO_2N^-M^+COT$), a sulfonylcarbamoyl group (—$CON^-M^+SO_2$-T), and a sulfonylaminosulfonyl group (—$SO_2N^-M^+SO_2$-T). M represents a hydrogen atom or a counter cation. T is a monovalent substituent (such as an alkyl group or an aryl group).

From the viewpoints of providing the dye with water solubility and enhancing storage stability of the dye ink composition, the ionic hydrophilic group included in $Z_1$ is preferably an acidic group, more preferably at least one of a sulfo group (—$SO_3M$), a carboxy group (—$CO_2M$), or a phosphate group (—$PO(OM)_2$), still more preferably a sulfo group (—$SO_3M$) or a carboxy group (—$CO_2M$), and most preferably a sulfo group (—$SO_3M$).

M represents a hydrogen atom or a counter cation.

When M represents a counter cation, examples thereof include an ammonium ion ($NH_4^+$), alkali metal ions (e.g., a lithium ion, a sodium ion, and a potassium ion), and organic cations (e.g., a tetramethylammonium ion, a tetramethylguanidinium ion, and a tetramethylphosphonium ion).

M is preferably a hydrogen atom, an alkali metal ion, or an ammonium ion and more preferably an alkali metal ion or a mixed ion of an alkali metal ion and an ammonium ion.

From the viewpoint of providing the dye with water solubility, M in —$SO_3M$ is preferably a lithium ion, a sodium ion, a potassium ion, an ammonium ion, or a mixed ion of two to three of these ions, more preferably a lithium ion, a sodium ion, or a mixed ion of a sodium ion and an ammonium ion, particularly preferably a lithium ion or a sodium ion, and most preferably a lithium ion.

From the viewpoint of providing the dye with water solubility, M in —$CO_2M$ is preferably a lithium ion, a sodium ion, a potassium ion, an ammonium ion, or a mixed ion of two to three of these ions, more preferably a sodium ion, a potassium ion, or a mixed ion of a sodium ion and an ammonium ion, particularly preferably a sodium ion or a potassium ion, and most preferably a potassium ion.

M may be a divalent counter cation. If M is a divalent counter cation, the compound may have, for example, a form in which one M functions as a counter cation of two —$SO_3^-$. From the viewpoint of water solubility, M is preferably a monovalent counter cation.

$Z_1$ may have only one ionic hydrophilic group or two or more ionic hydrophilic groups. If $Z_1$ has two or more ionic hydrophilic groups, the ionic hydrophilic groups may be the same or different from each other.

When M represents a particular cation (e.g., a lithium ion), all M need not necessarily be lithium ions (may be, for example, a mixed salt of two or three salts), but substantially, the counter cation having the highest presence ratio is preferably a lithium ion. Under the conditions of such a presence ratio, the compound can include, as M, for example, a hydrogen atom, an alkali metal ion (e.g., a sodium ion or a potassium ion), an alkaline-earth metal ion (e.g., a magnesium ion, a calcium ion, or the like), a quaternary ammonium ion (e.g., an ammonium ion: $NH_4$ ion), a quaternary phosphonium ion, or a sulfonium ion. The amount of lithium ions is preferably 50% or more, more preferably 60% or more, still more preferably 80% or more, particularly preferably 90% or more, and most preferably 100% relative to the total number of M.

The case of a lithium ion also applies to a case where the particular cation represents a cation (e.g., a sodium ion) other than a lithium ion.

When $Z_1$ is an alkyl group, aryl group, or heterocyclic group having, as a substituent, a group other than an ionic hydrophilic group, the group being substituted with at least one ionic hydrophilic group, examples of the group other than the ionic hydrophilic group include substituted or unsubstituted alkyloxy groups, substituted or unsubstituted aryloxy groups, substituted or unsubstituted amino groups, substituted or unsubstituted sulfamoyl groups, substituted or unsubstituted carbamoyl groups, substituted or unsubstituted alkylsulfonyl groups, and substituted or unsubstituted arylsulfonyl groups. When these substituents can further have at least one substituent, groups having, as the additional substituent, a substituent selected from the group consisting of the aforementioned substituents are also included in the examples of the group other than the ionic hydrophilic group. The group other than the ionic hydrophilic group preferably has 1 to 20 carbon atoms and more preferably has 1 to 10 carbon atoms from the viewpoint of dissolution stability of the dye.

$Z_1$ may have, in addition to a substituent that includes an ionic hydrophilic group, a substituent other than the substituent that includes an ionic hydrophilic group. Examples of the substituent other than the substituent that includes an ionic hydrophilic group include halogen atoms, a hydroxy group, substituted or unsubstituted alkyl groups, substituted or unsubstituted aryl groups, substituted or unsubstituted heterocyclic groups, substituted or unsubstituted alkyloxy groups, substituted or unsubstituted aryloxy groups, substituted or unsubstituted amino groups, substituted or unsubstituted sulfamoyl groups, substituted or unsubstituted carbamoyl groups, substituted or unsubstituted alkylsulfonyl groups, and substituted or unsubstituted arylsulfonyl groups. When these substituents can further have at least one substituent, groups having, as the additional substituent, a substituent selected from the group consisting of the aforementioned substituents are also included in the examples of the substituent other than the substituent that includes an ionic hydrophilic group. When the substituent other than the substituent that includes an ionic hydrophilic group is an organic group (group that includes at least one carbon atom), the substituent is preferably an organic group having 1 to 10 carbon atoms, and more preferably an organic group having 1 to 6 carbon atoms from the viewpoint of dissolution stability of the dye.

Preferred examples of $Z_1$ include —$(CH_2)_3$—$SO_3M$, —$(CH_2)_4$—$SO_3M$, —$(CH_2)_2CH(CH_3)$—$SO_3M$, —$(CH_2)_5$—$SO_3M$, —$(CH_2)_3$—$CO_2M$, —$(CH_2)_4$—$CO_2M$, —$(CH_2)_5$—$CO_2M$, —$C_2H_4OC_2H_4SO_3M$, —$C_2H_4OC_2H_4OC_2H_4SO_3M$, —$CH_2CH(OH)CH_2SO_3M$, —$CH_2CH(OH)CH_2CO_2M$, —$(CH_2)_3$—$SO_2NHCH_2CH(OH)CH_2SO_3M$, —$(CH_2)_3$—$SO_2NHCH_2CH(OH)CH_2CO_2M$, —$(CH_2)_3$—$CONHC_2H_4SO_3M$, —$(CH_2)_3$—$CONHCH_2CH(OH)CH_2CH_2SO_3M$, —$(CH_2)_3$—$CONHCH_2CH(OH)CH_2CO_2M$, —$(CH_2)_3$—$SO_2NHCH_2CH_2N$ $CH_2CH_2SO_3M$, —$(CH_2)_3$—$SO_2NHCH_2CH_2N\{CH_2CH_2CO_2M\}_2$, and

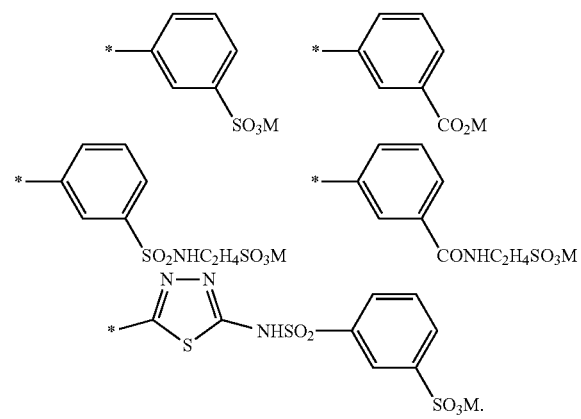

In the structural formulae, * represents a binding site to a sulfonyl group.

In the chemical formulae and the structural formulae, M represents a hydrogen atom or a counter cation, and specific examples and preferred examples are the same as those described above.

The plurality of $Z_1$'s in general formula (I-1) may be the same or different; however, all $Z_1$ are preferably the same.

The compound A included in the dye ink composition according to the present invention may be one compound or two or more compounds.

Compound B

The compound B in the present invention will be described.

The compound B is a compound represented by general formula (I-2) below.

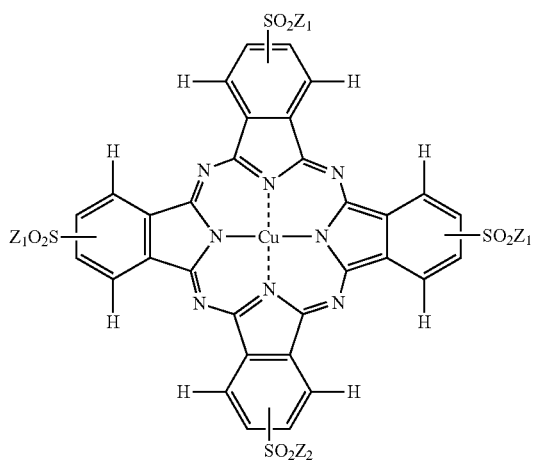

(I-2)

In general formula (I-2), each $Z_1$ represents an alkyl group, aryl group, or heterocyclic group having a substituent that includes at least one ionic hydrophilic group. The plurality of $Z_1$'s may be the same or different. $Z_2$ represents a substituted or unsubstituted alkyl group, a substituted or unsubstituted aryl group, or a substituted or unsubstituted heterocyclic group, provided that $Z_2$ does not have an ionic hydrophilic group.

The compound B is a phthalocyanine dye in which substituted sulfonyl groups (—$SO_2$—$Z_1$ and —$SO_2$—$Z_2$) are introduced to β positions of the phthalocyanine skeleton. That is, in general formula (I-2), —$SO_2$—$Z_1$ and —$SO_2$—$Z_2$ replace hydrogen atoms at β positions of the phthalocyanine skeleton but do not replace hydrogen atoms at α positions of the phthalocyanine skeleton. All the three —$SO_2$—$Z_1$ in general formula (I-2) are preferably the same group.

Each $Z_1$ in general formula (I-2) is the same as $Z_1$ in general formula (I-1) described above.

The plurality of $Z_1$'s in general formula (I-2) may be the same or different; however, all $Z_1$ are preferably the same.

In general formula (I-2), $Z_2$ represents a substituted or unsubstituted alkyl group, a substituted or unsubstituted aryl group, or a substituted or unsubstituted heterocyclic group, provided that $Z_2$ does not have an ionic hydrophilic group.

$Z_2$ preferably represents a substituted or unsubstituted alkyl group or a substituted or unsubstituted aryl group and more preferably represents a substituted or unsubstituted alkyl group.

When $Z_2$ represents a substituted or unsubstituted alkyl group, the alkyl group is not particularly limited but is preferably an alkyl group having 1 to 8 carbon atoms, more preferably an alkyl group having 1 to 6 carbon atoms, and still more preferably an alkyl group having 3 to 5 carbon atoms from the viewpoints of water solubility of the dye and stability of the substituent. The alkyl group may be linear, branched, or cyclic but is preferably a linear alkyl group having 3 to 5 carbon atoms from the viewpoints of availability of raw materials and water solubility of the dye. Specific examples of the alkyl group include a methyl group, an ethyl group, a n-propyl group, an i-propyl group, a n-butyl group, an isobutyl group, a sec-butyl group, a t-butyl group, and a n-pentyl group.

When $Z_2$ represents a substituted or unsubstituted aryl group, the aryl group is not particularly limited but is preferably an aryl group having 6 to 14 carbon atoms, more preferably an aryl group having 6 to 12 carbon atoms, and particularly preferably an aryl group having 6 to 10 carbon atoms from the viewpoints of availability of raw materials and water solubility of the dye. Specific examples of the aryl group include a phenyl group and a naphthyl group.

When $Z_2$ represents a substituted or unsubstituted heterocyclic group, the heterocyclic group is not particularly limited but is preferably a heterocyclic group having 2 to 12 carbon atoms, more preferably a heterocyclic group having 2 to 8 carbon atoms, and particularly preferably a heterocyclic group having 2 to 6 carbon atoms from the viewpoints of availability of raw materials, water solubility of the dye, and stability of the substituent. Examples of heteroatoms included in the heterocyclic group include, but are not particularly limited to, a sulfur atom, a nitrogen atom, and an oxygen atom.

When $Z_2$ represents a substituted alkyl group, a substituted aryl group, or a substituted heterocyclic group, the substituent is not particularly limited as long as the substituent is a group other than the aforementioned ionic hydrophilic group. Examples of the substituent include halogen atoms, a hydroxy group, substituted or unsubstituted alkyl groups, substituted or unsubstituted aryl groups, substituted or unsubstituted heterocyclic groups, substituted or unsubstituted alkyloxy groups, substituted or unsubstituted aryloxy groups, substituted or unsubstituted amino groups, substituted or unsubstituted sulfamoyl groups, substituted or unsubstituted carbamoyl groups, substituted or unsubstituted alkylsulfonyl groups, and substituted or unsubstituted arylsulfonyl groups. When these substituents can further have at least one substituent, groups having, as the additional substituent, a substituent selected from the group consisting of the aforementioned substituents are also included in the examples of the substituent. The substituent is preferably a halogen atom, a hydroxy group, a substituted or unsubstituted aryl group, a substituted or unsubstituted alkyloxy group, a substituted or unsubstituted aryloxy group, a substituted or unsubstituted amino group, a substituted or unsubstituted sulfamoyl group, a substituted or unsubstituted carbamoyl group, a substituted or unsubstituted alkylsulfonyl group, or a substituted or unsubstituted arylsulfonyl group, more preferably a hydroxy group, a substituted or unsubstituted amino group, a substituted or unsubstituted sulfamoyl group, a substituted or unsubstituted carbamoyl group, a substituted or unsubstituted alkylsulfonyl group, or a substituted or unsubstituted arylsulfonyl group, still more preferably a substituted or unsubstituted sulfamoyl group or a substituted or unsubstituted carbamoyl group, and particularly preferably a substituted or unsubstituted sulfamoyl group.

When the substituent is an organic group, the substituent is preferably an organic group having 1 to 20 carbon atoms, and more preferably an organic group having 1 to 10 carbon atoms from the viewpoint of dissolution stability of the dye.

$Z_2$ preferably has at least one of a hydroxy group or a tertiary nitrogen atom, more preferably has a hydroxy group, and still more preferably has an alcoholic hydroxy group (a hydroxy group bound to an alkyl group) because a strong intermolecular interaction is exhibited.

When $Z_2$ has a tertiary nitrogen atom, $Z_2$ preferably has a substituent represented by general formula (N-1) below.

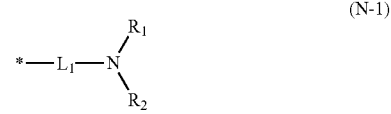

(N-1)

In general formula (N-1), $R_1$ and $R_2$ each independently represent a monovalent substituted or unsubstituted hydrocarbon group and Li represents a divalent substituted or unsubstituted hydrocarbon group. Symbol * represents a binding site to the $Z_2$ residue.

The monovalent hydrocarbon group represented by $R_1$ and $R_2$ is not particularly limited but is, for example, an alkyl group, preferably an alkyl group having 1 to 10 carbon atoms, and more preferably an alkyl group having 1 to 6 carbon atoms.

Preferably, $R_1$ and $R_2$ each independently represent an alkyl group, and the total number of carbon atoms of $R_1$ and $R_2$ is 6 or less from the viewpoint of water solubility of the dye.

The divalent hydrocarbon group represented by Li is not particularly limited but is, for example, an alkylene group, preferably an alkylene group having 1 to 10 carbon atoms, more preferably an alkylene group having 1 to 6 carbon atoms, and particularly preferably an alkylene group having 3 to 5 carbon atoms from the viewpoint of water solubility of the dye.

$R_1$, $R_2$, and Li may have a substituent, and the substituent is not particularly limited as long as the substituent is a group other than the aforementioned ionic hydrophilic group.

Examples of the substituent include halogen atoms, a hydroxy group, substituted or unsubstituted alkyl groups, substituted or unsubstituted aryl groups, substituted or unsubstituted heterocyclic groups, substituted or unsubstituted alkyloxy groups, substituted or unsubstituted aryloxy groups, substituted or unsubstituted amino groups, substituted or unsubstituted sulfamoyl groups, substituted or unsubstituted carbamoyl groups, substituted or unsubstituted alkylsulfonyl groups, and substituted or unsubstituted arylsulfonyl groups. When these substituents can further have at least one substituent, groups having, as the additional substituent, a substituent selected from the group consisting of the aforementioned substituents are also included in the examples of the substituent. When the substituent is an organic group, the substituent is preferably an organic group having 1 to 10 carbon atoms, and more preferably an organic group having 1 to 6 carbon atoms.

Preferred examples of $Z_2$ include —$CH_2CH_2CH_2OH$, —$CH_2CH(OH)CH_3$, —$CH_2CH(OH)CH_2OH$, —$CH_2CH_2CH_2N(CH_3)_2$, —$(CH_2)_3$—$SO_2NHCH_2CH_2CH_3$, —$(CH_2)_3$—$SO_2NHCH_2CH_2OH$, —$(CH_2)_3$—$SO_2N(CH_2CH_2OH)_2$, —$(CH_2)_3$—$SO_2NHCH_2CH_2CH_2OH$, —$(CH_2)_3$—$SO_2NHCH_2CH(OH)CH_3$, —$(CH_2)_3$—$SO_2NHCH_2CH(OH)CH_2OH$, $CH_2CH_2CH(CH_3)SO_2NHCH_2CH(OH)CH_2OH$, —$(CH_2)_3$—$CONHCH_2CH(OH)CH_3$, —$(CH_2)_3$—$CONHCH_2CH(OH)CH_2OH$, —$(CH_2)_3$—$SO_2NHCH_2CH_2N(CH_3)_2$, —$(CH_2)_3$—$SO_2NHCH_2CH_2CH_2N(CH_3)_2$, —$(CH_2)_3CONHCH_2CH_2N(CH_3)_2$, —$(CH_2)_3SO_2NHCH_2CH_2OCH_2CH_2OCH_3$, —$(CH_2)_4CONHCH_2CH(OH)CH_2OH$, $(CH_2)_5CONHCH_2CH_2OH$, —$CH_2CH_2OCH_2CH_2OH$, —$CH_2CH(OH)CH_2SO_2NHCH_2CH_2OH$, —$CH_2CH(OH)CH_2SO_2N(CH_2CH_2OH)_2$, —$CH_2CH_2CH(CH_3)SO_2NHCH_2CH(OH)CH_3$, and

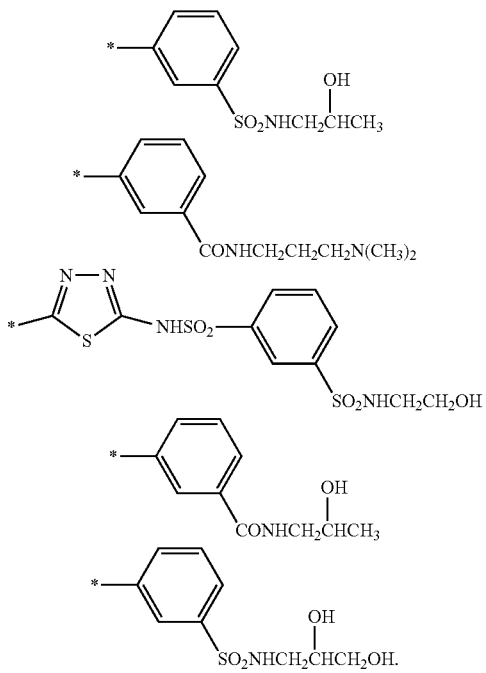

In the structural formulae, * represents a binding site to a sulfonyl group.

The compound B included in the dye ink composition according to the present invention may be one compound or two or more compounds.

Compound C-I and Compound C-II

The compound C-I and the compound C-II in the present invention will be described.

The compound C-I is a compound represented by general formula (I-3-1), and the compound C-II is a compound represented by general formula (I-3-2).

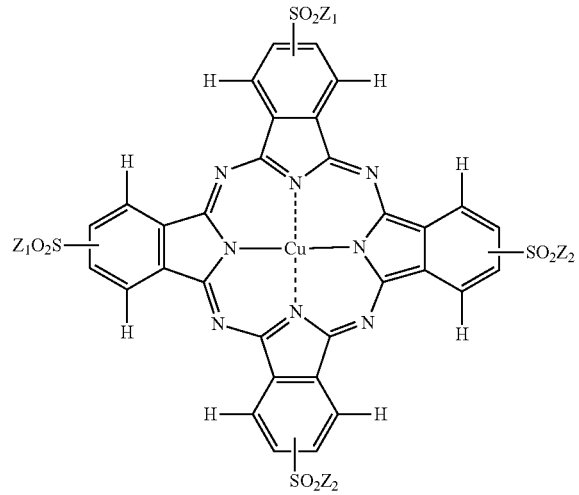

(I-3-1)

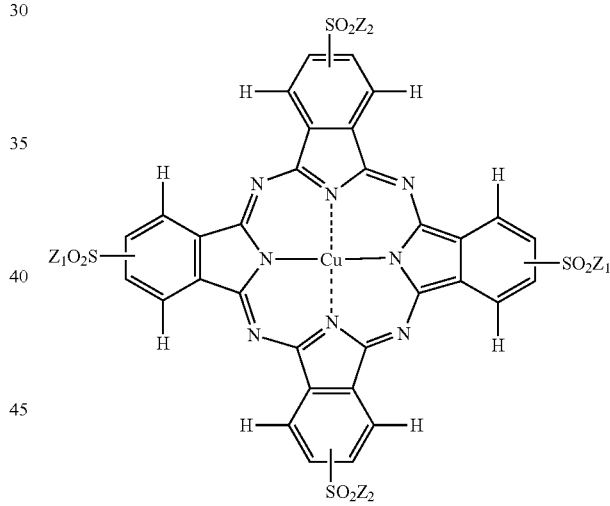

(I-3-2)

In general formulae (I-3-1) and (I-3-2), each $Z_1$ represents an alkyl group, aryl group, or heterocyclic group having a substituent that includes at least one ionic hydrophilic group. The plurality of $Z_1$'s may be the same or different. Each $Z_2$ represents a substituted or unsubstituted alkyl group, a substituted or unsubstituted aryl group, or a substituted or unsubstituted heterocyclic group, provided that each $Z_2$ does not have an ionic hydrophilic group. The plurality of $Z_2$'s may be the same or different.

The compound represented by general formula (I-3-1) and the compound represented by general formula (I-3-2) are positional isomers in which the introduction positions of substituents are different.

The compound C-I and the compound C-II are each a phthalocyanine dye in which substituted sulfonyl groups (—$SO_2$—$Z_1$ and —$SO_2$—$Z_2$) are introduced to β positions of the phthalocyanine skeleton. That is, in general formulae (I-3-1) and (I-3-2), —SO$_2$—Z$_1$ and —SO$_2$—Z$_2$ replace hydrogen atoms at β positions of the phthalocyanine skeleton but do not replace hydrogen atoms at α positions of the phthalocyanine skeleton. The two —SO$_2$—Z$_1$ in general formulae (I-3-1) and (I-3-2) are preferably the same group. The two —SO$_2$—Z$_2$ in general formulae (I-3-1) and (I-3-2) are preferably the same group.

Each Z$_1$ in general formulae (I-3-1) and (I-3-2) is the same as Z$_1$ in general formula (I-1) described above.

The plurality of Z$_1$'s in general formulae (I-3-1) and (I-3-2) may be the same or different; however, all Z$_1$ are preferably the same.

Each Z$_2$ in general formulae (I-3-1) and (I-3-2) is the same as Z$_2$ in general formula (I-2) described above.

The plurality of Z$_2$'s in general formulae (I-3-1) and (I-3-2) may be the same or different; however, all Z$_2$ are preferably the same.

The dye ink composition according to the present invention includes at least one of the compound C-I or the compound C-II. The dye ink composition may include only the compound C-I, only the compound C-II, or both the compound C-I and the compound C-II.

When the dye ink composition according to the present invention includes the compound C-I, the compound C-I included in the dye ink composition according to the present invention may be one compound or two or more compounds.

When the dye ink composition according to the present invention includes the compound C-II, the compound C-II included in the dye ink composition according to the present invention may be one compound or two or more compounds.

Compound D

The compound D in the present invention will be described.

The compound D is a compound represented by general formula (I-4).

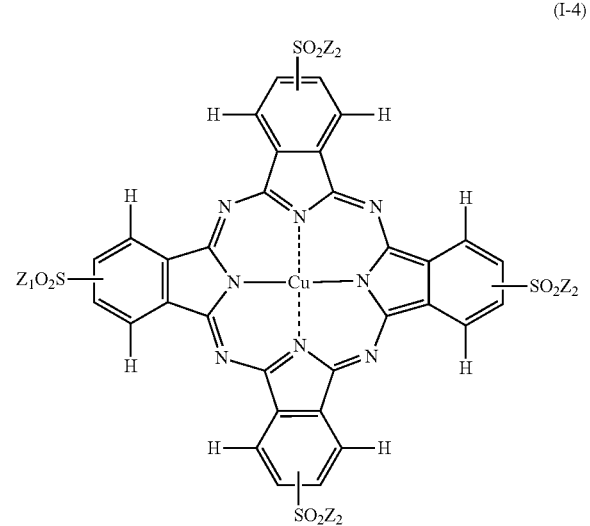

(I-4)

In general formula (I-4), Z$_1$ represents an alkyl group, aryl group, or heterocyclic group having a substituent that includes at least one ionic hydrophilic group. Each Z$_2$ represents a substituted or unsubstituted alkyl group, a substituted or unsubstituted aryl group, or a substituted or unsubstituted heterocyclic group, provided that each Z$_2$ does not have an ionic hydrophilic group. The plurality of Z$_2$'s may be the same or different.

The compound D is a phthalocyanine dye in which substituted sulfonyl groups (—SO$_2$—Z$_1$ and —SO$_2$—Z$_2$) are introduced to β positions of the phthalocyanine skeleton. That is, in general formula (I-4), —SO$_2$—Z$_1$ and —SO$_2$—Z$_2$ replace hydrogen atoms at β positions of the phthalocyanine skeleton but do not replace hydrogen atoms at α positions of the phthalocyanine skeleton. All the three —SO$_2$—Z$_2$ in general formula (I-4) are preferably the same group.

Z$_1$ in general formula (I-4) is the same as Z$_1$ in general formula (I-1) described above.

Each Z$_2$ in general formula (I-4) is the same as Z$_2$ in general formula (I-2) described above.

The plurality of Z$_2$'s in general formula (I-4) may be the same or different; however, all Z$_2$ are preferably the same.

The compound D included in the dye ink composition according to the present invention may be one compound or two or more compounds.

Compound E

The dye ink composition according to the present invention preferably further includes a compound E below in addition to the compound A to the compound D described above.

The compound E induces a stronger intermolecular interaction to the compound A than the compound B to the compound D.

When the dye ink composition according to the present invention includes the compound A to the compound E, better continuous ejection stability and storage stability can be exhibited.

The compound E will be described below.

The compound E is a compound represented by general formula (I-5).

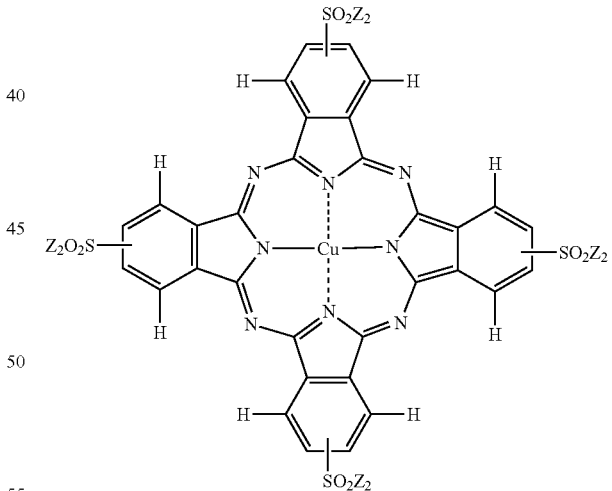

(I-5)

In general formula (I-5), each Z$_2$ is as defined in general formulae (I-2), (I-3-1), (I-3-2), and (I-4). The plurality of Z$_2$'s may be the same or different.

The compound E is a phthalocyanine dye in which substituted sulfonyl groups (—SO$_2$—Z$_2$) are introduced to β positions of the phthalocyanine skeleton. That is, in general formula (I-5), —SO$_2$—Z$_2$ replace hydrogen atoms at β positions of the phthalocyanine skeleton but do not replace hydrogen atoms at α positions of the phthalocyanine skeleton. All the four —SO$_2$—Z$_2$ in general formula (I-5) are preferably the same group.

Each $Z_2$ in general formula (I-5) is the same as $Z_2$ in general formula (I-2) described above.

The plurality of $Z_2$'s in general formula (I-5) may be the same or different; however, all $Z_2$ are preferably the same.

When the dye ink composition according to the present invention includes the compound E, the compound E included in the dye ink composition according to the present invention may be one compound or two or more compounds.

All $Z_1$ in the compound A to the compound D are preferably the same group.

All $Z_2$ in the compound B to the compound E are preferably the same group.

Specific examples of the compound A to the compound E are described below, but are not limited thereto. Note that the specific examples below are each a mixture including positional isomers (refer to (2A) to (2D) below) of specific substituents R (each R represents $-SO_2Z_1$ or $-SO_2Z_2$), and therefore, the introduction positions of substituents are not specified, and the positional isomers are treated as the same compound. In the specific examples below, it is indicated that the substituted sulfonyl groups ($-SO_2Z_1$ or $-SO_2Z_2$) each replace any hydrogen atom at a β position but do not replace the portions having "H" in each structural formula.

(2A)

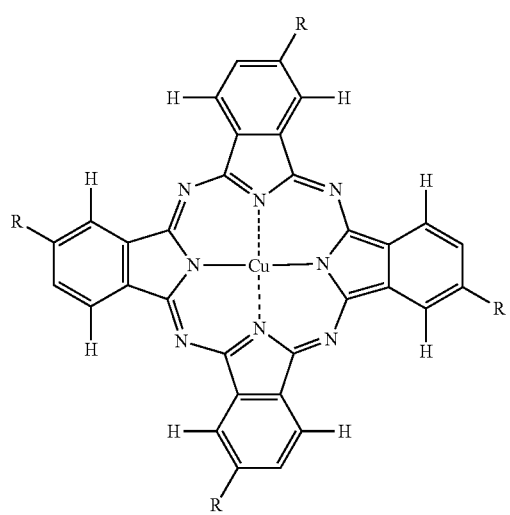

(2B)

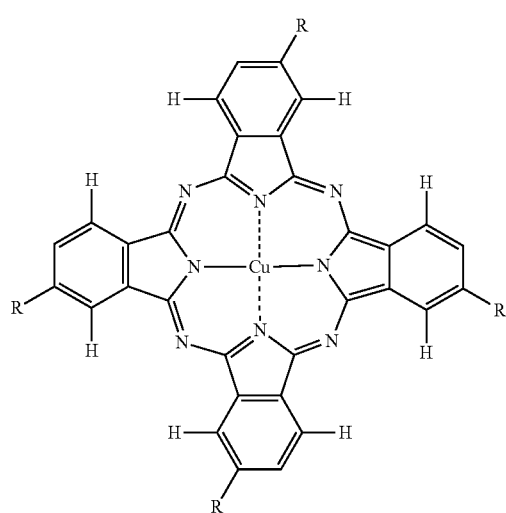

(2C)

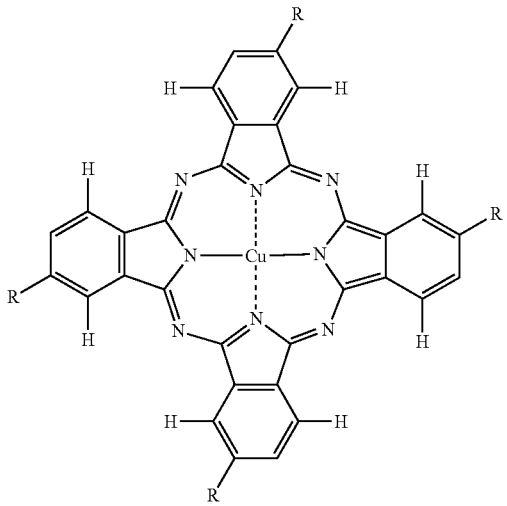

(2D)

Specific examples of the compound A (compound represented by general formula (I-1)) are described without distinguishing the substitution positions. That is, the specific examples below each encompass positional isomers having different substitution positions as in (2A) to (2D) above. R in this case each represent a substituent ($-SO_2Z_1$). Although a counter cation (M) of an ionic hydrophilic group (for example, $-SO_3M$ or $-CO_2M$) is described in the form of a salt, the counter cation is not limited to a single salt but may be in the form of a partial free acid (for example, M=Li ion and hydrogen atom, or Na ion and hydrogen atom) and a mixed salt (for example, M=salts of Li ion and Na ion, or salts of Na ion and $NH_4$ ion).

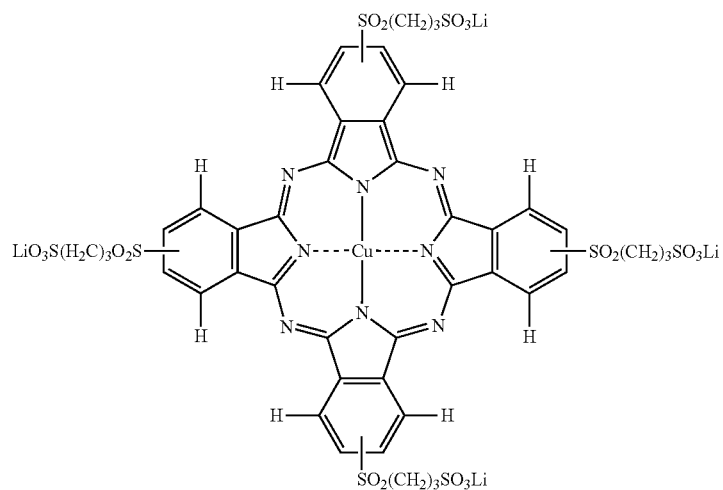
A-1
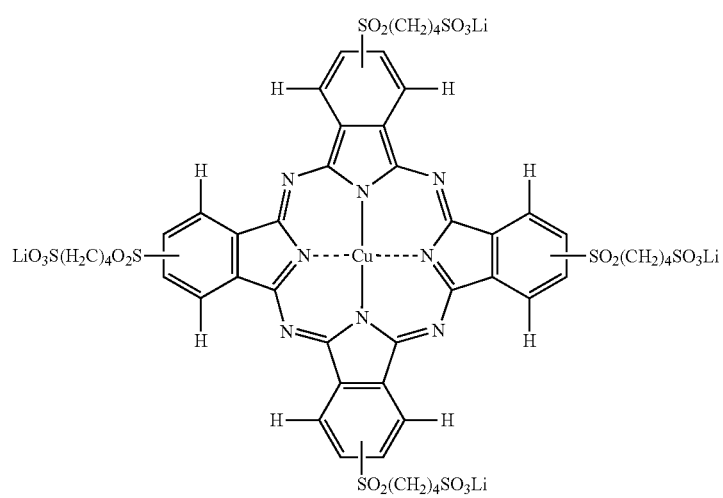
A-2
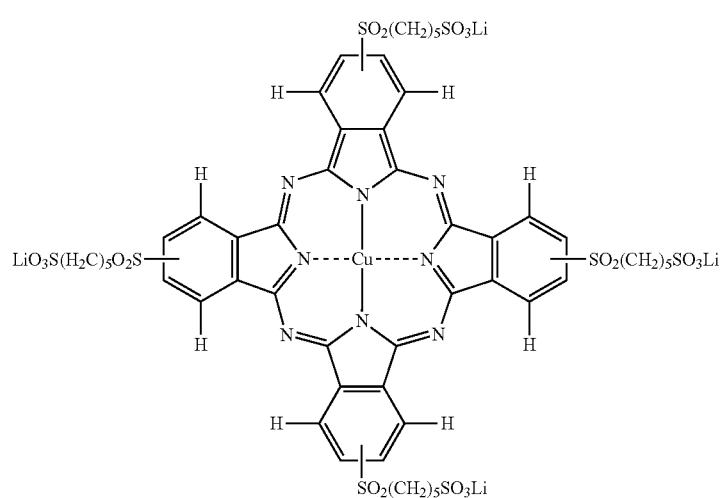
A-3

A-4
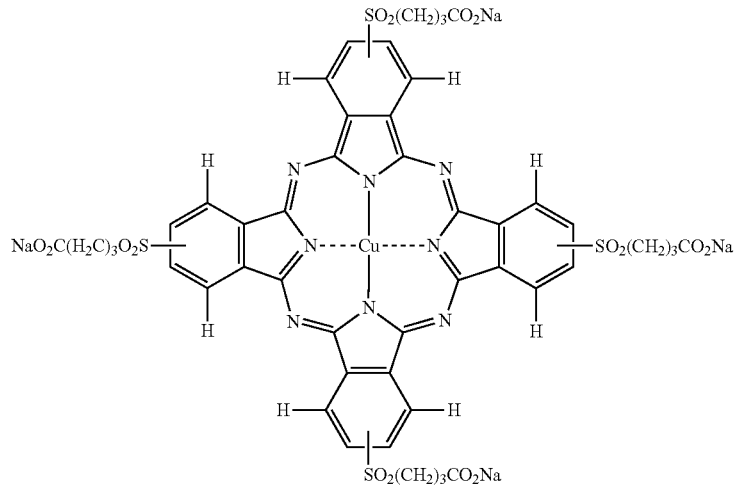
A-5
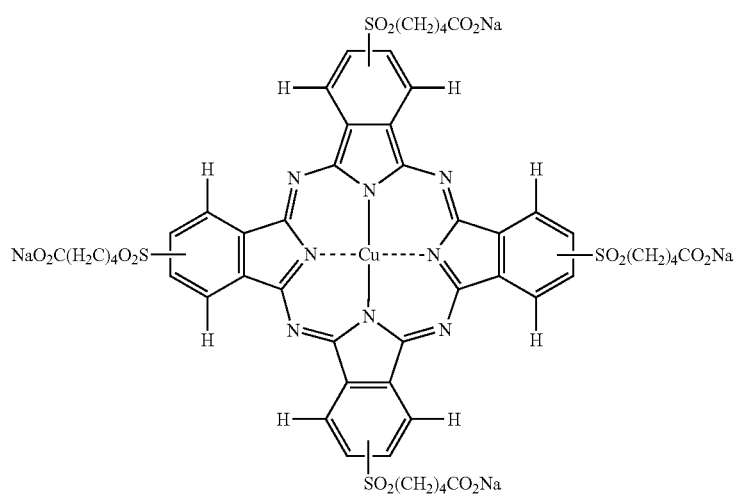
A-6
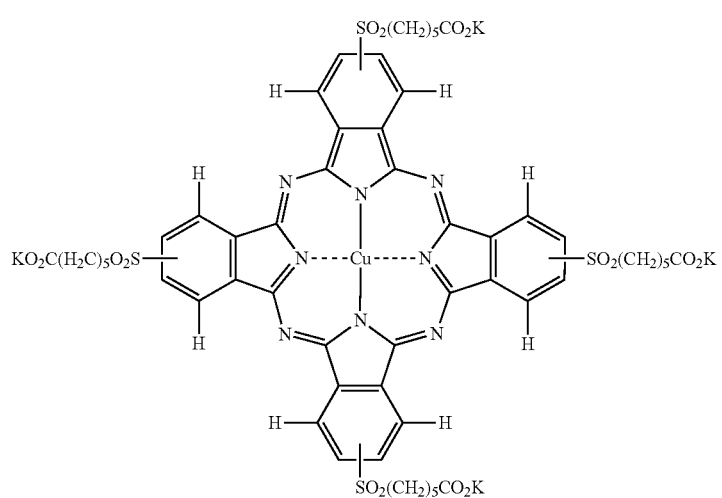

-continued
A-7
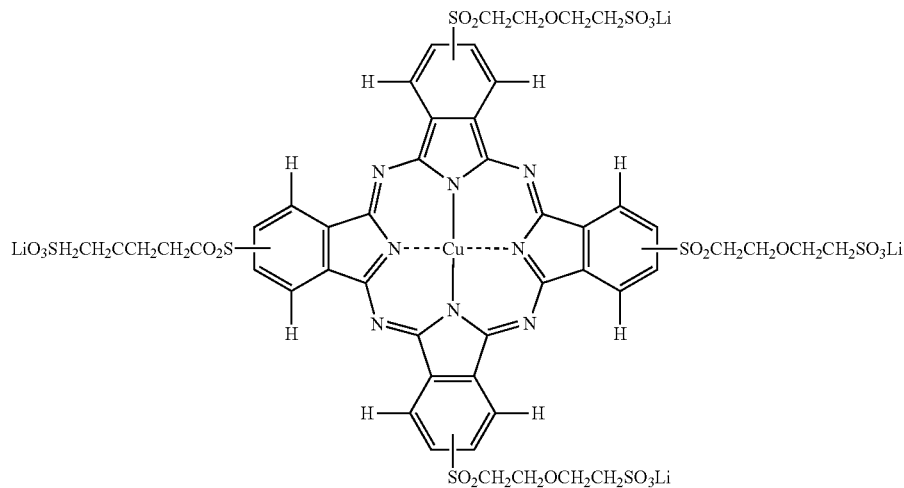
A-8
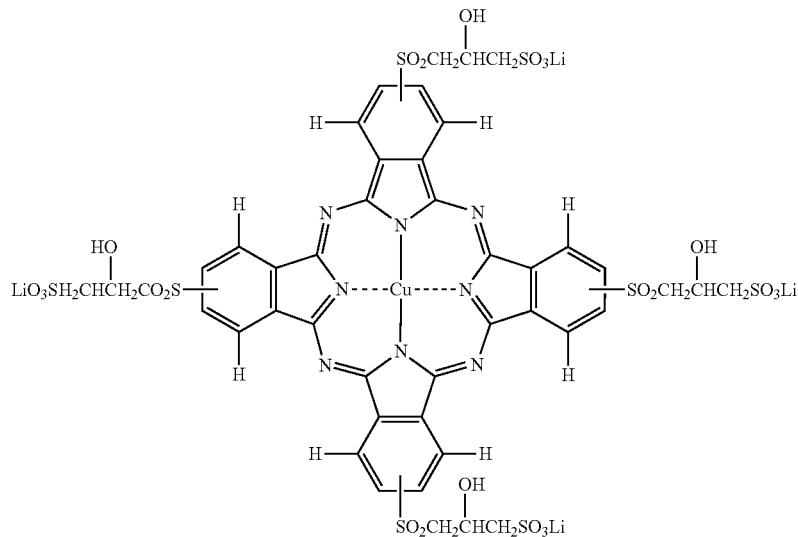
A-9
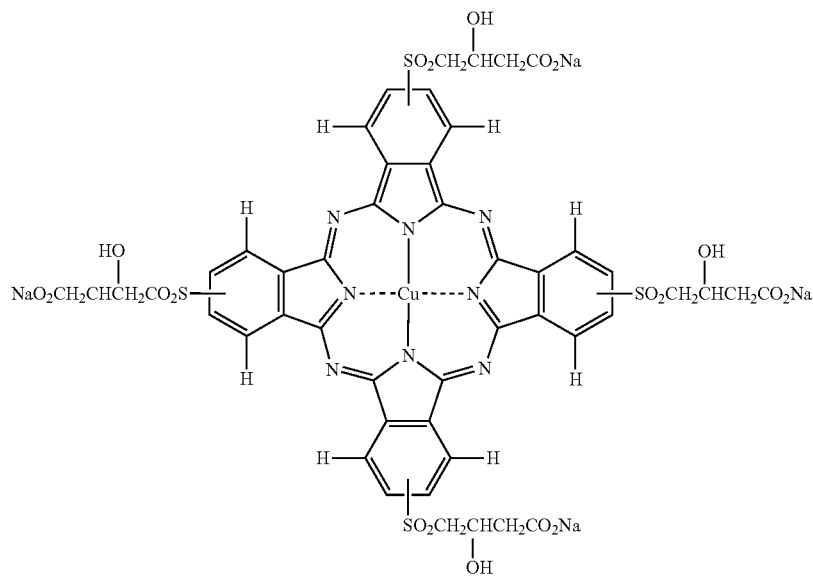

-continued
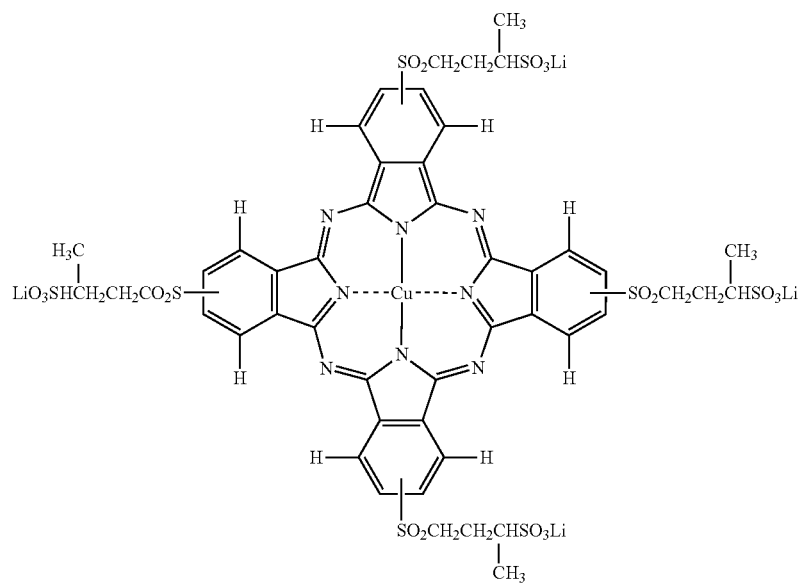
A-10
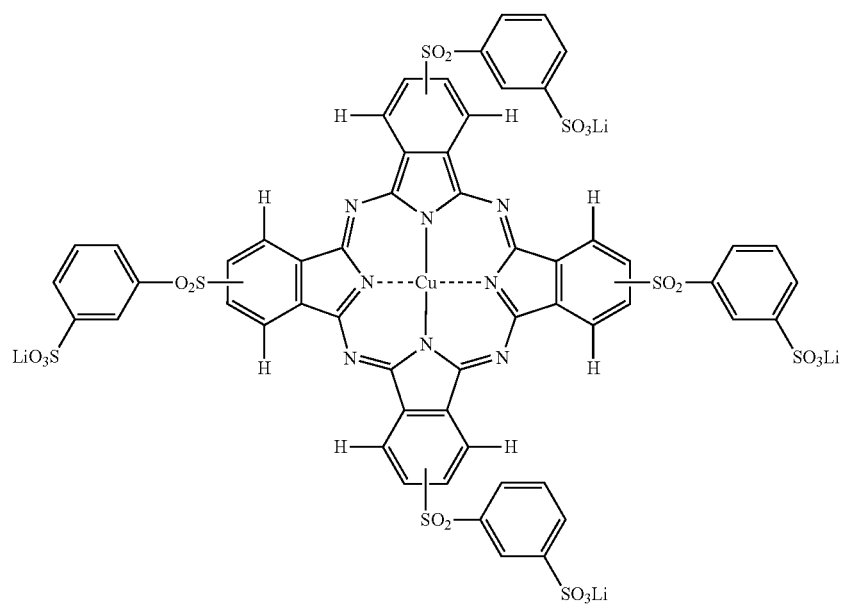
A-11

-continued
A-12
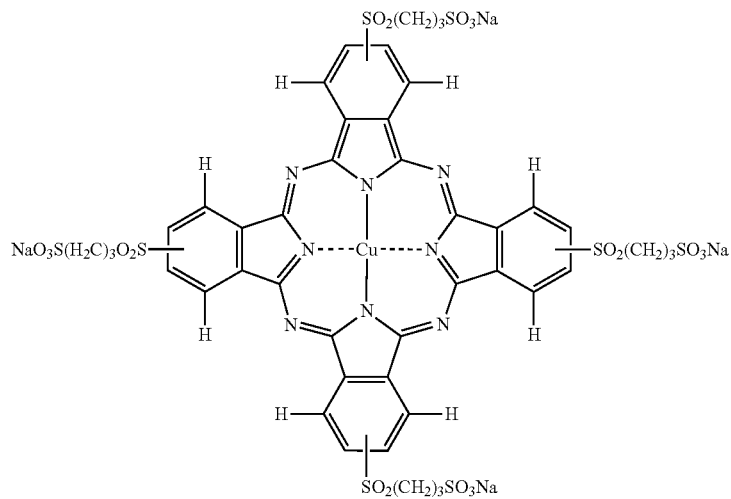
A-13
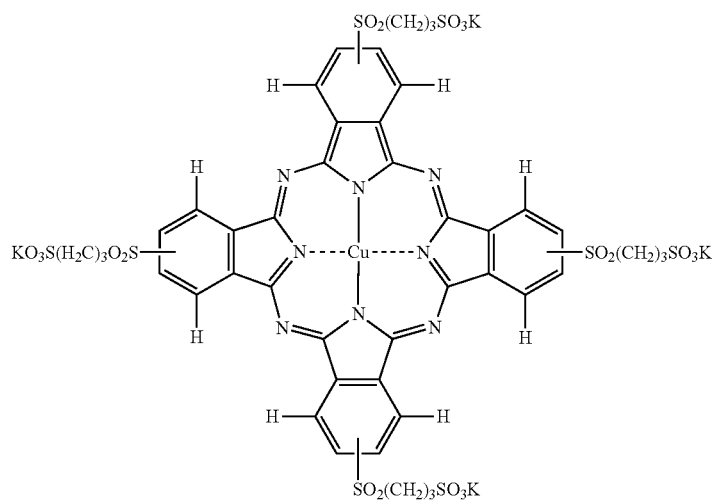
A-14
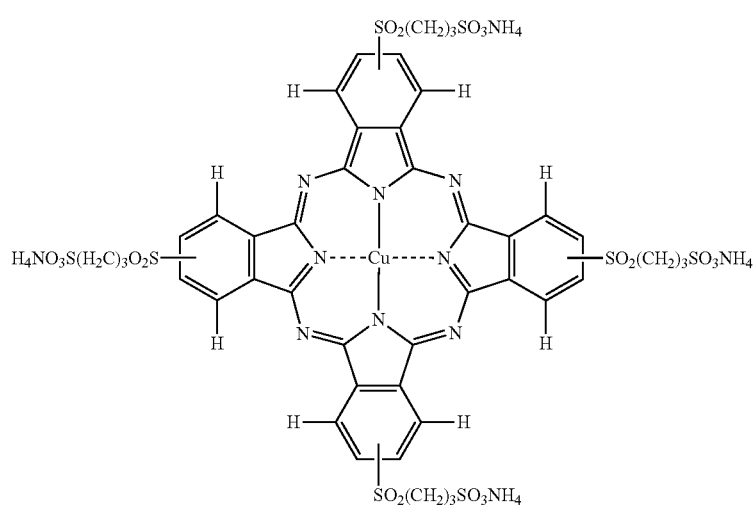

-continued
A-15
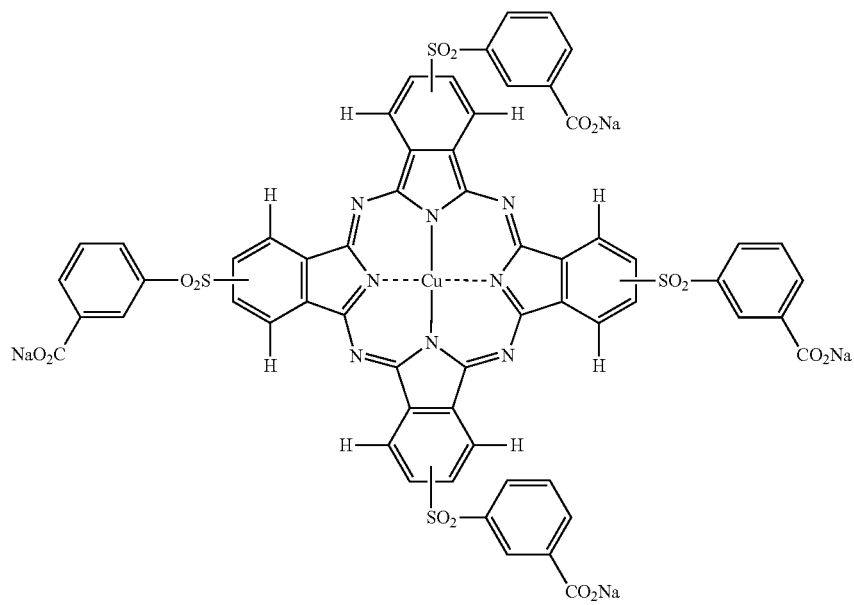
A-16
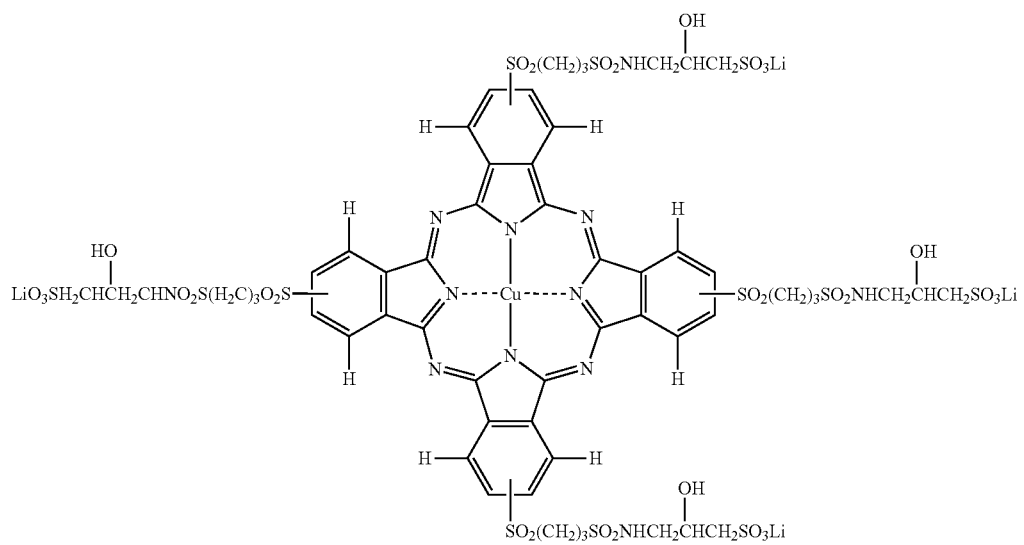

-continued
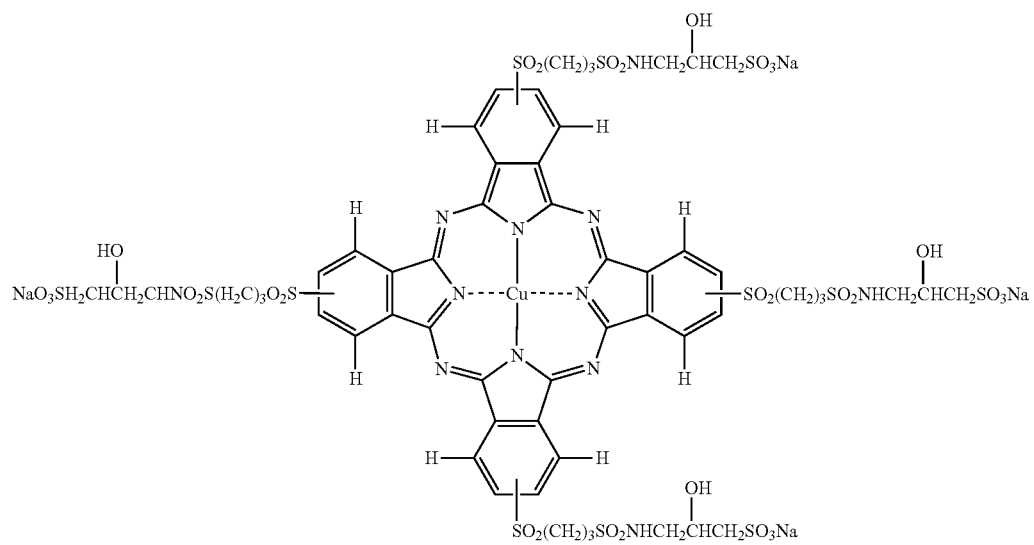
A-17
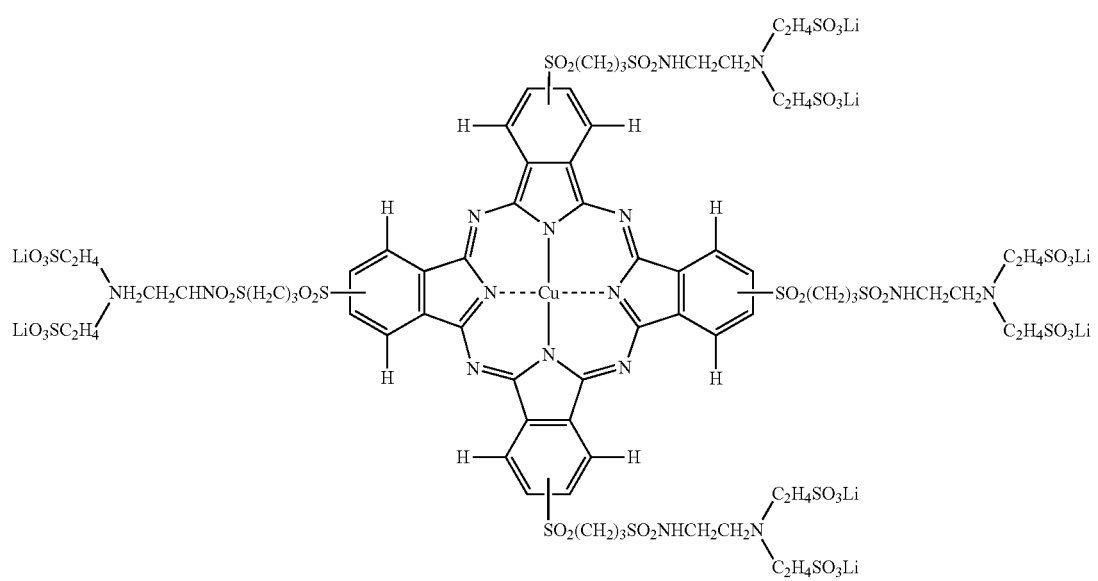
A-18

A-19
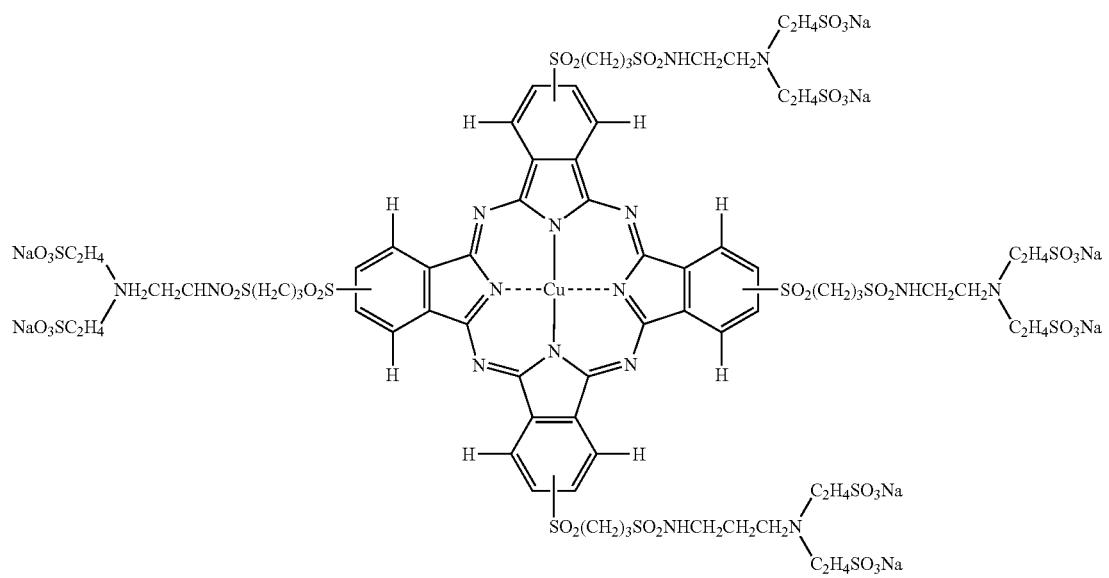
A-20
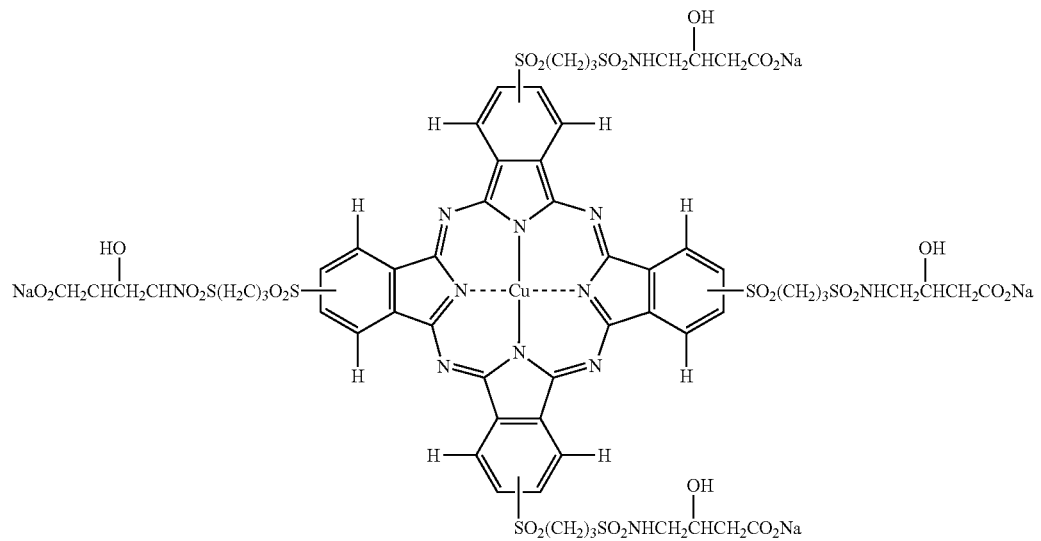
A-21
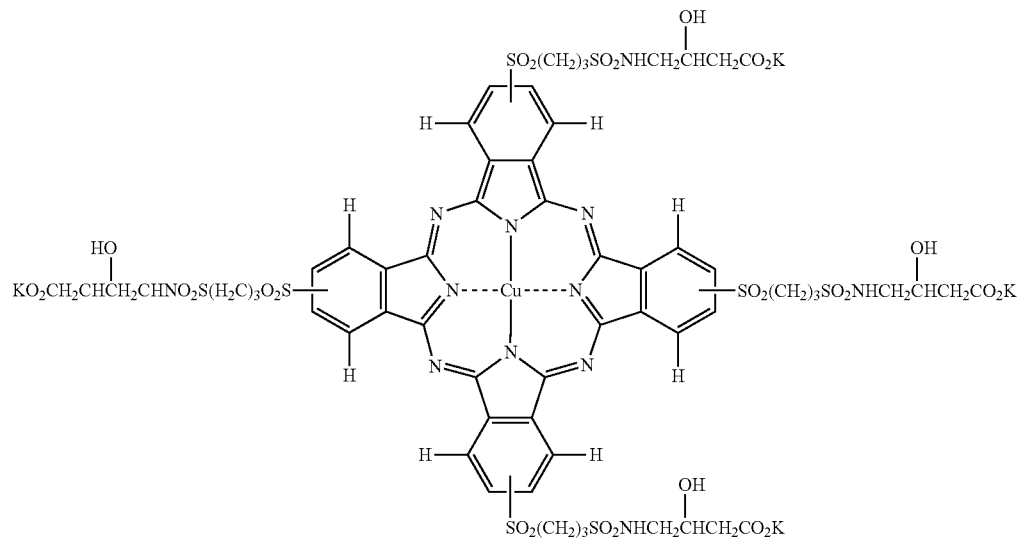

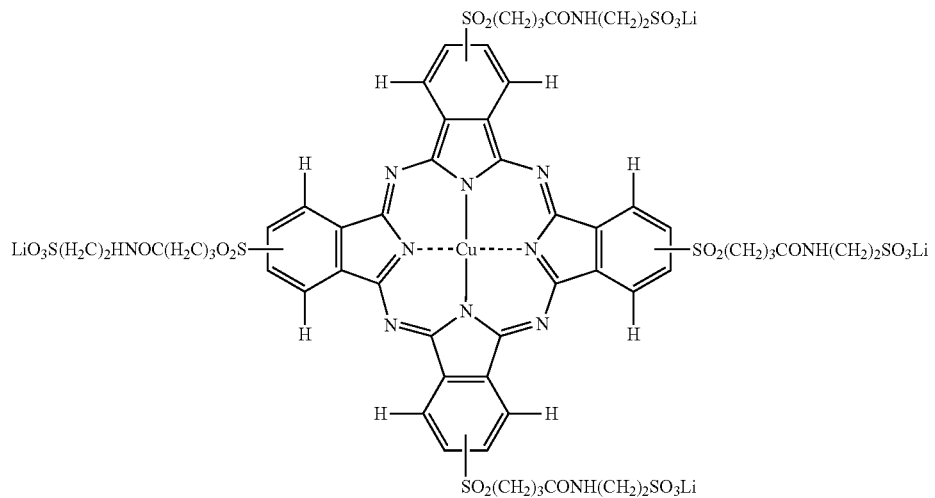
A-22
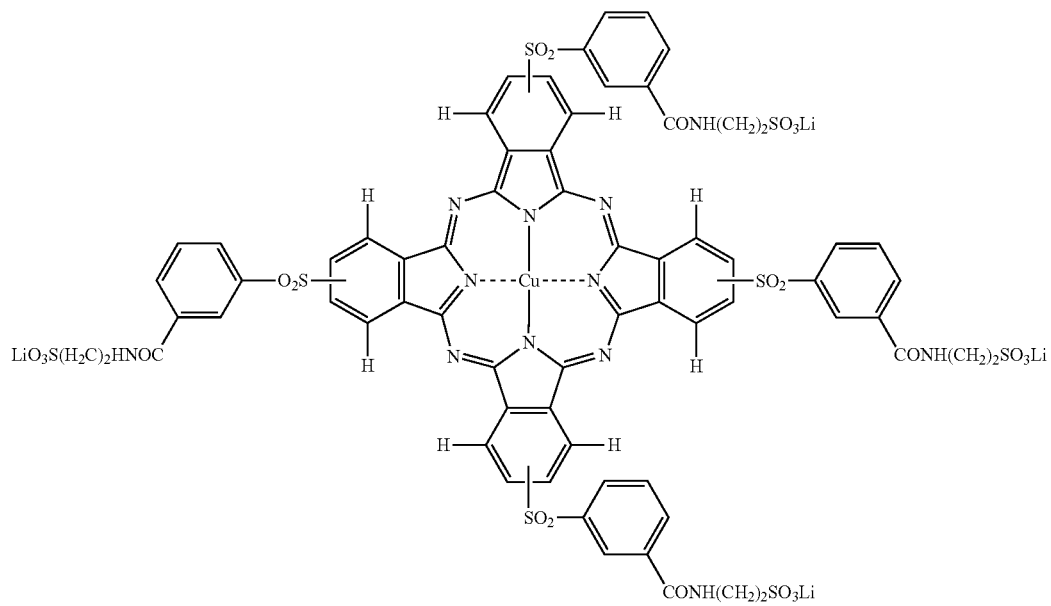
A-23

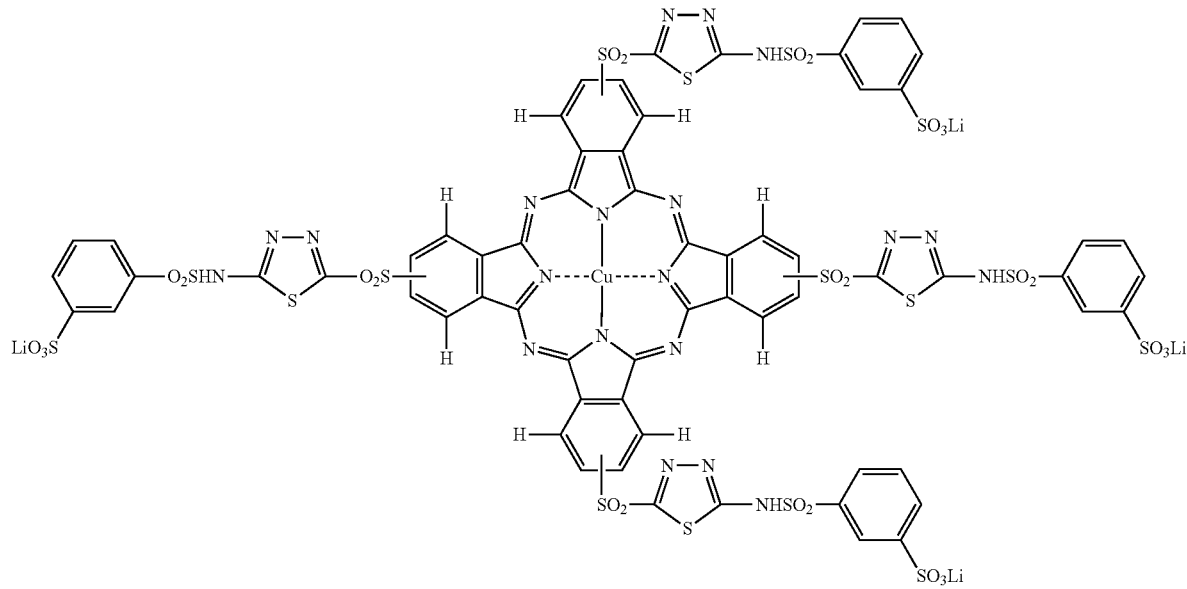

A-24

Specific examples of the compound B (compound represented by general formula (I-2)) are described without distinguishing the substitution positions. That is, the specific examples below each encompass positional isomers having different substitution positions as in (2A) to (2D) above. R in this case each independently represent a substituent (—$SO_2Z_1$ or —$SO_2Z_2$). Although a counter cation (M) of an ionic hydrophilic group (for example, —$SO_3M$ or —$CO_2M$) is described in the form of a salt, the counter cation is not limited to a single salt but may be in the form of a partial free acid (for example, M=Li ion and hydrogen atom, or Na ion and hydrogen atom) and a mixed salt (for example, M=salts of Li ion and Na ion, or salts of Na ion and $NH_4$ ion).

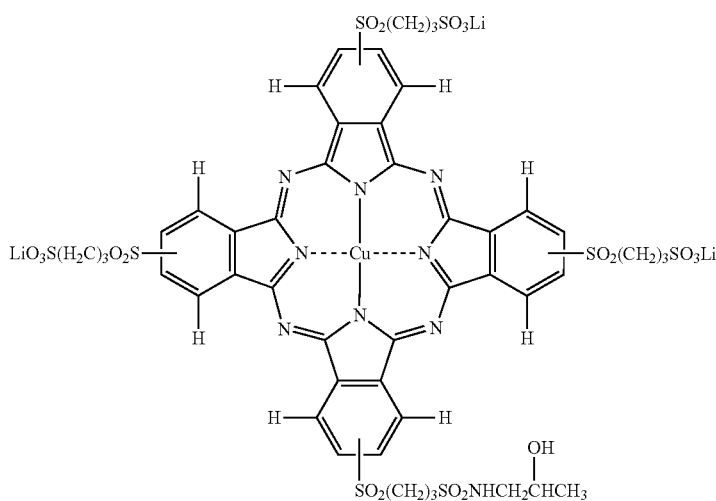

B-1

-continued
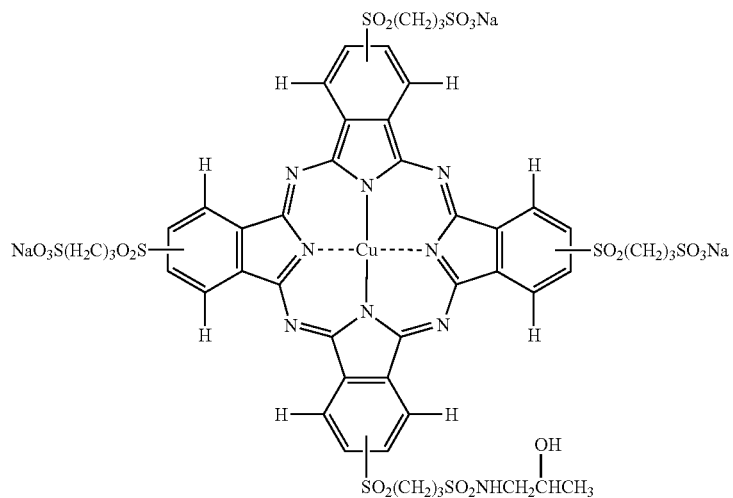
B-2
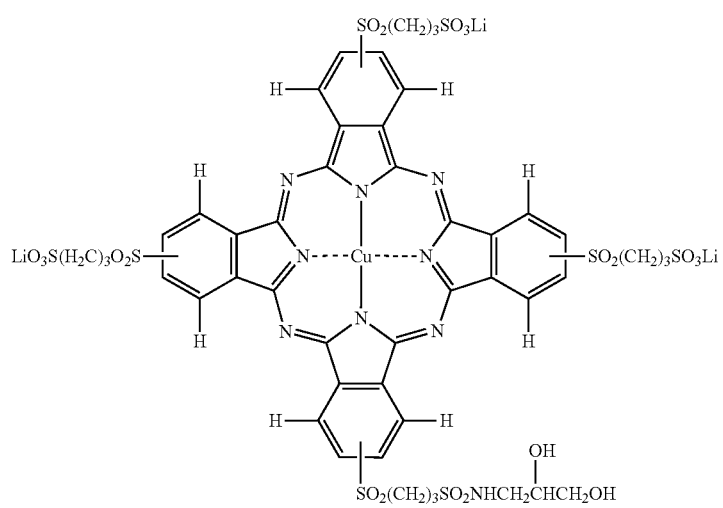
B-3
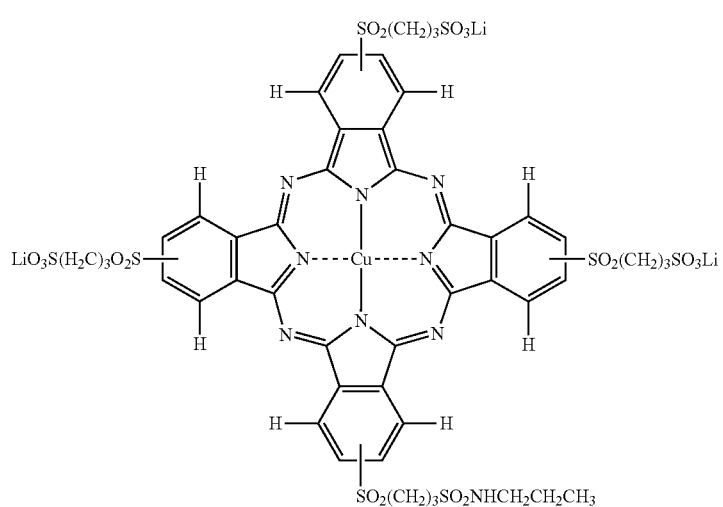
B-4

-continued
B-5
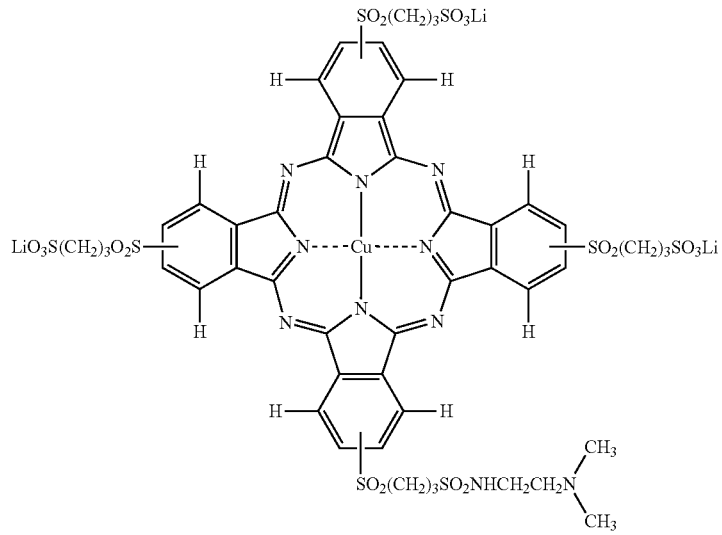
B-6
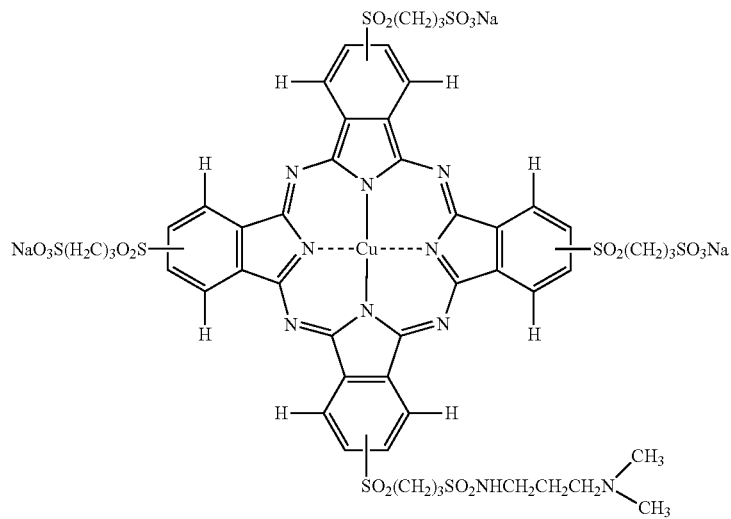
B-7
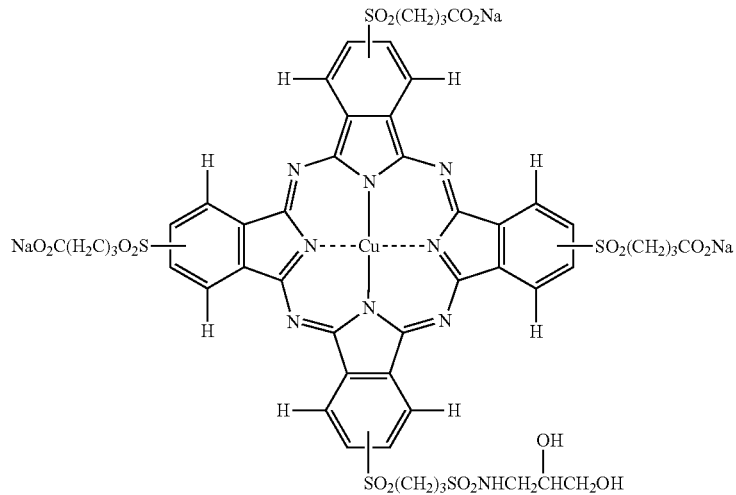

-continued
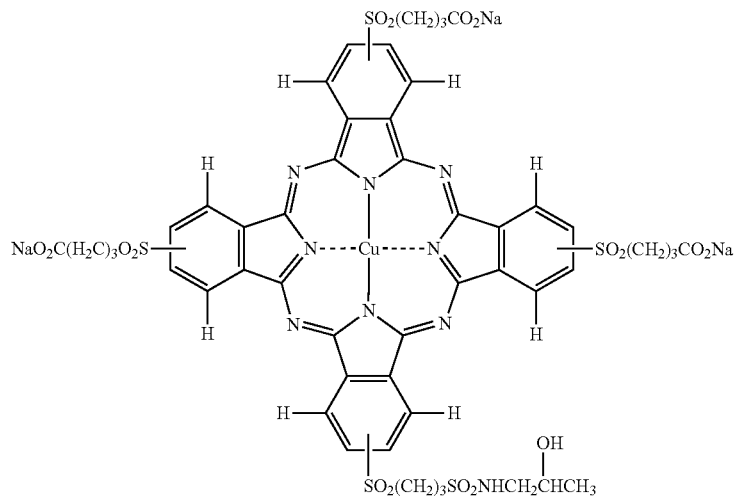
B-8
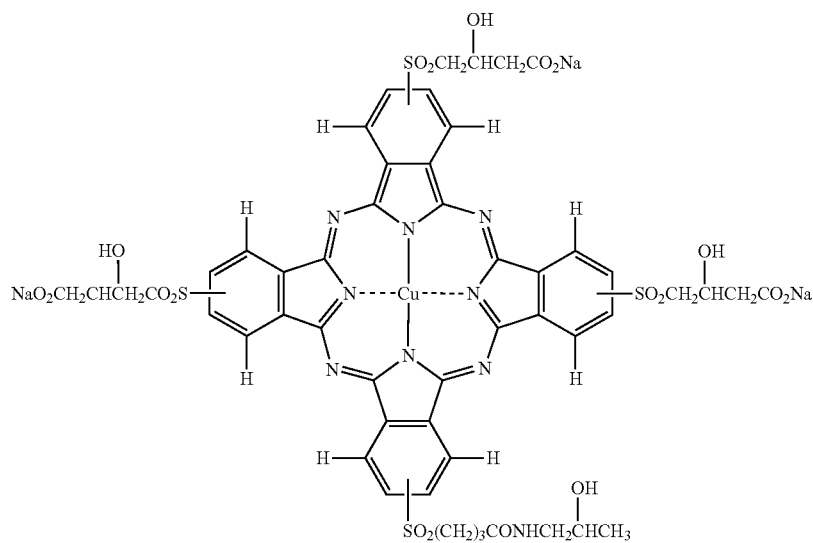
B-9
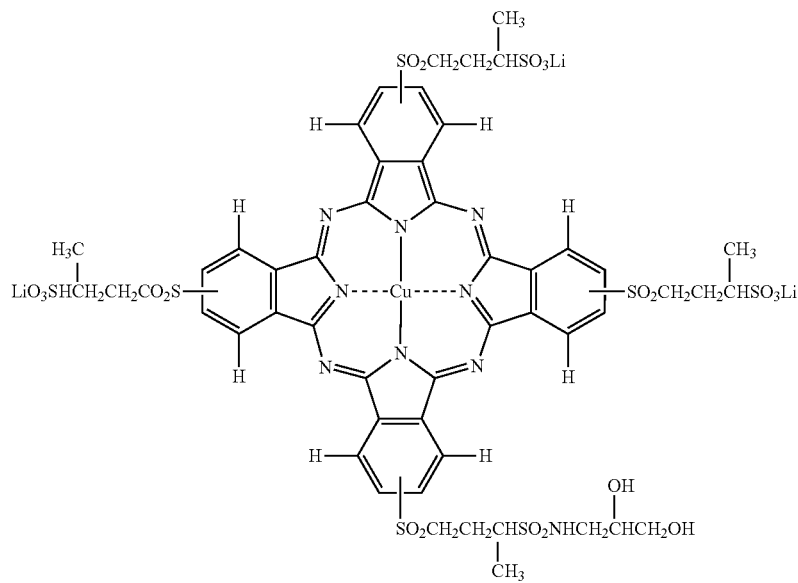
B-10

-continued
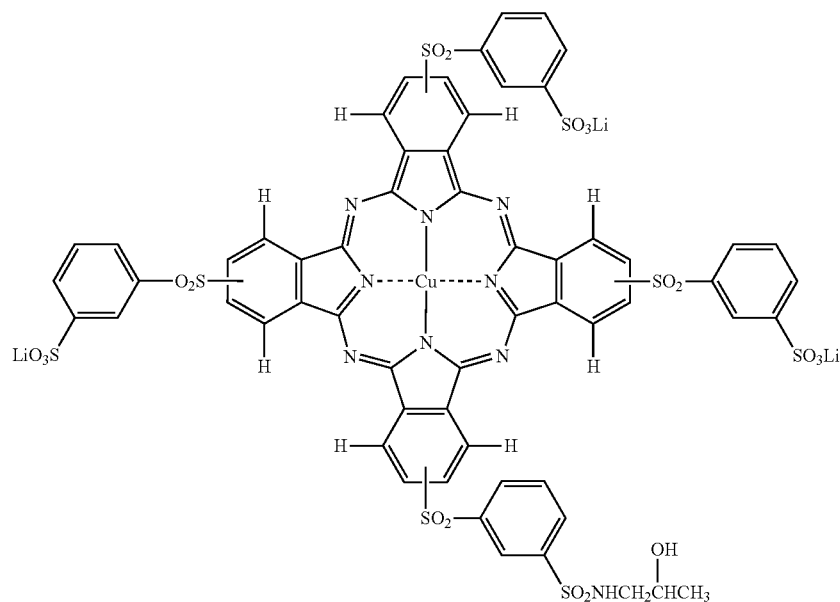
B-11
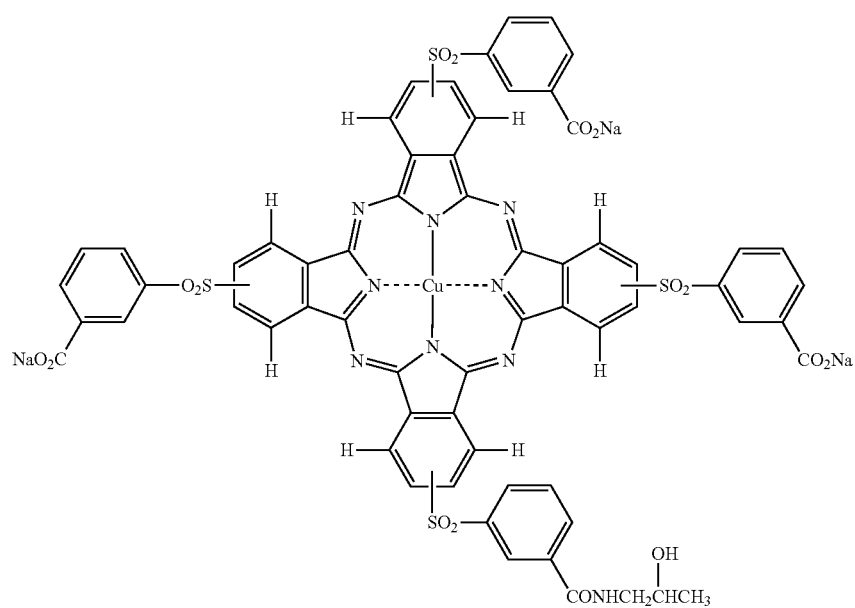
B-12

-continued
B-13
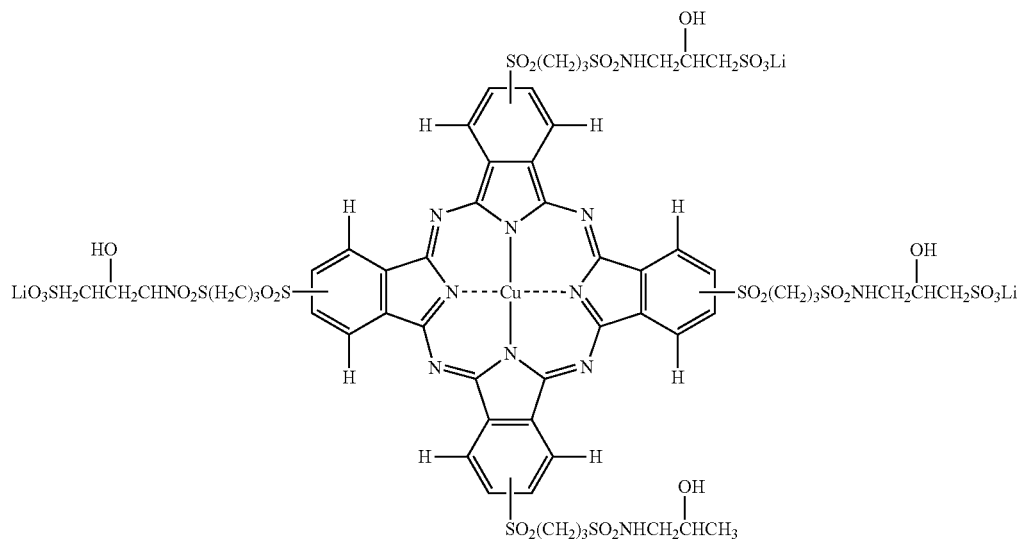
B-14
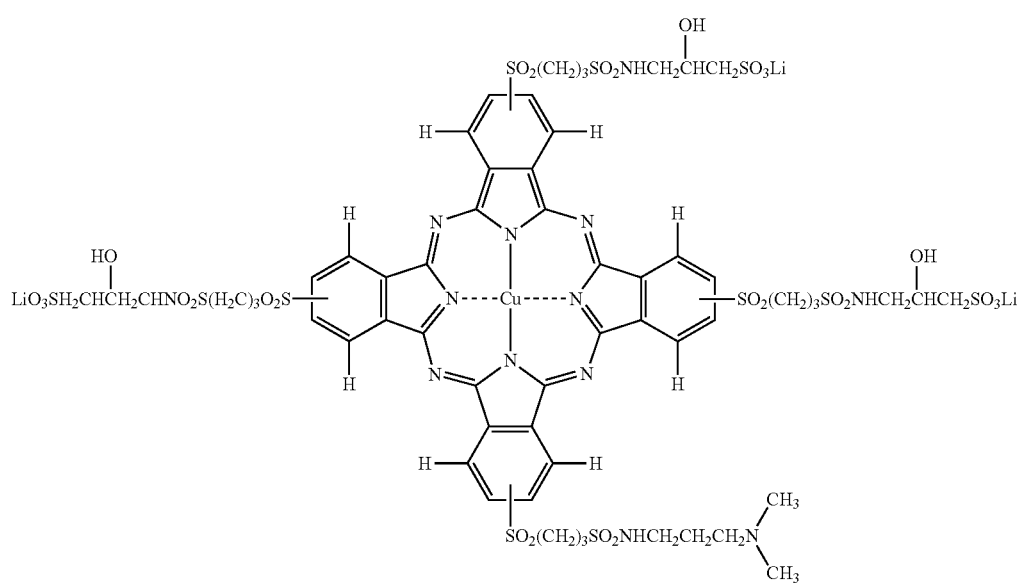
B-15
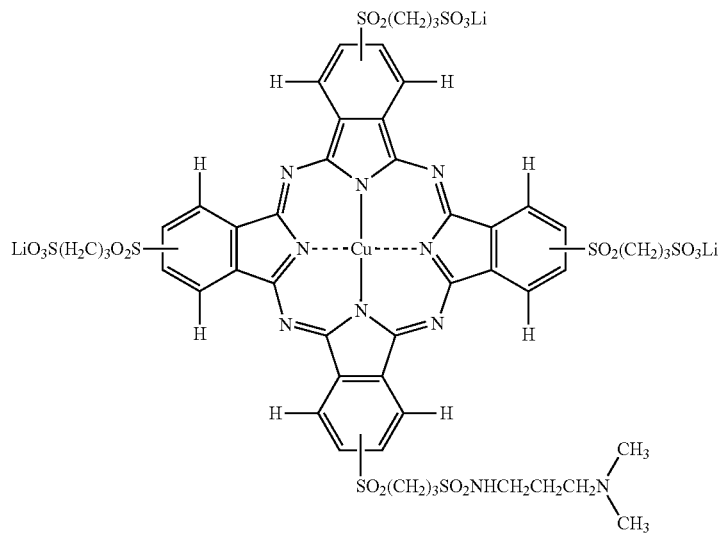

B-16
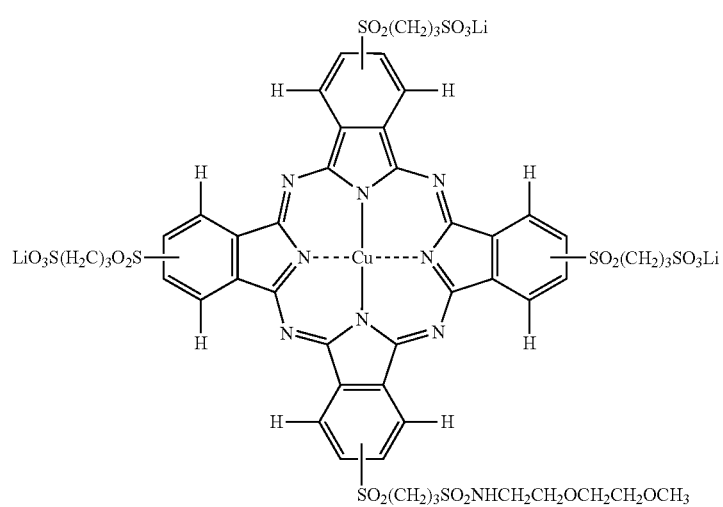
B-17
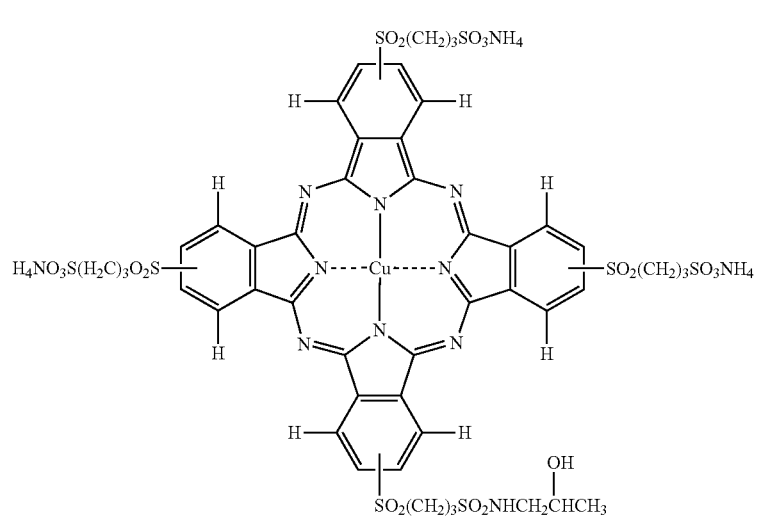
B-18
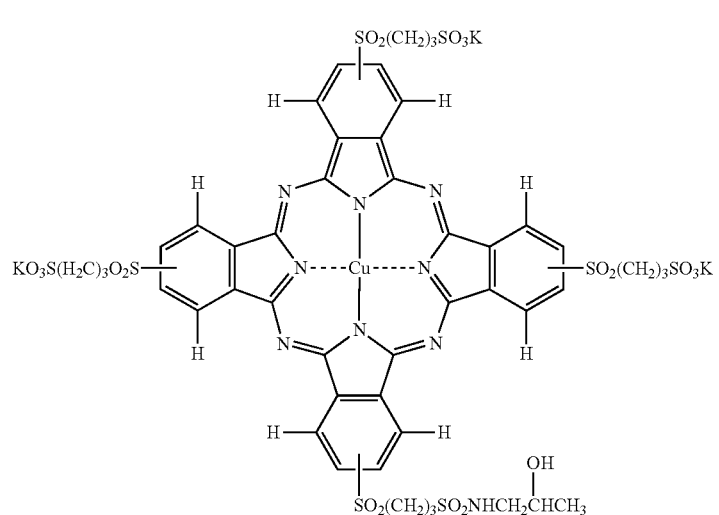

Specific examples of the compound C-I (compound represented by general formula (I-3-1)) and the compound C-II (compound represented by general formula (I-3-2)) are described without distinguishing the substitution positions. That is, the specific examples below each encompass positional isomers having different substitution positions as in (2A) to (2D) above. R in this case each independently represent a substituent (—SO$_2$Z$_1$ or —SO$_2$Z$_2$). Although a counter cation (M) of an ionic hydrophilic group (for example, —SO$_3$M or —CO$_2$M) is described in the form of a salt, the counter cation is not limited to a single salt but may be in the form of a partial free acid (for example, M=Li ion and hydrogen atom, or Na ion and hydrogen atom) and a mixed salt (for example, M=salts of Li ion and Na ion, or salts of Na ion and NH$_4$ ion).

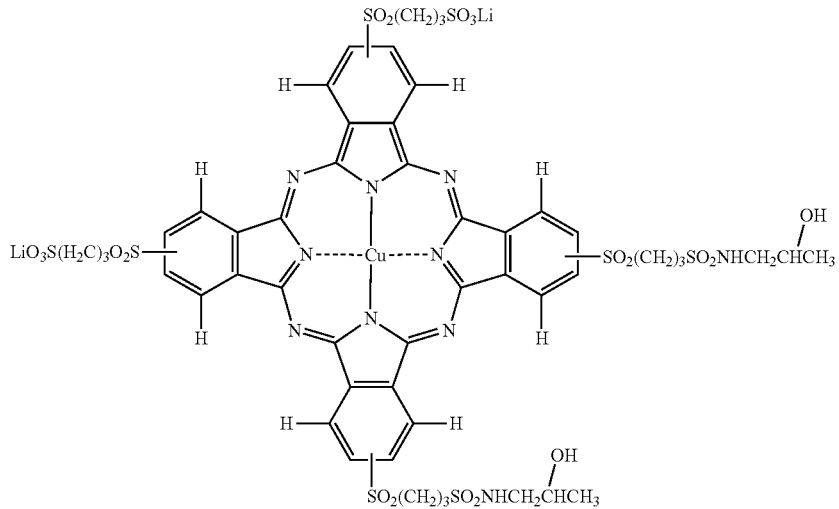

C-1-1

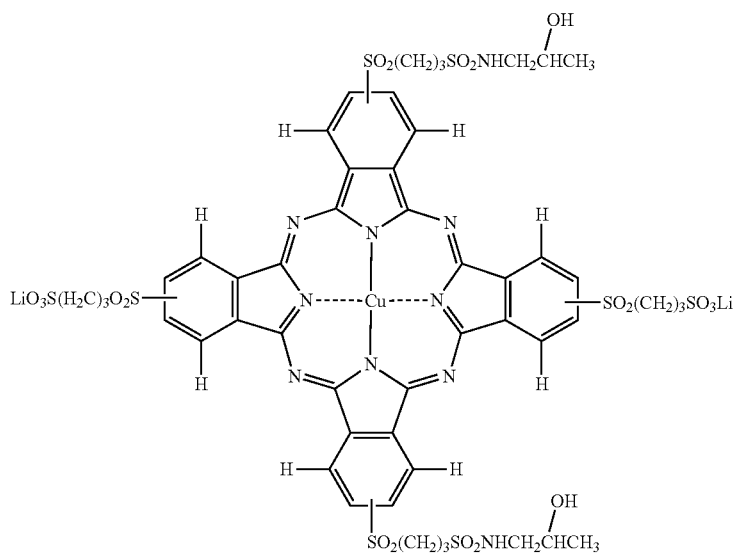

C-1-2

-continued
C-2-1
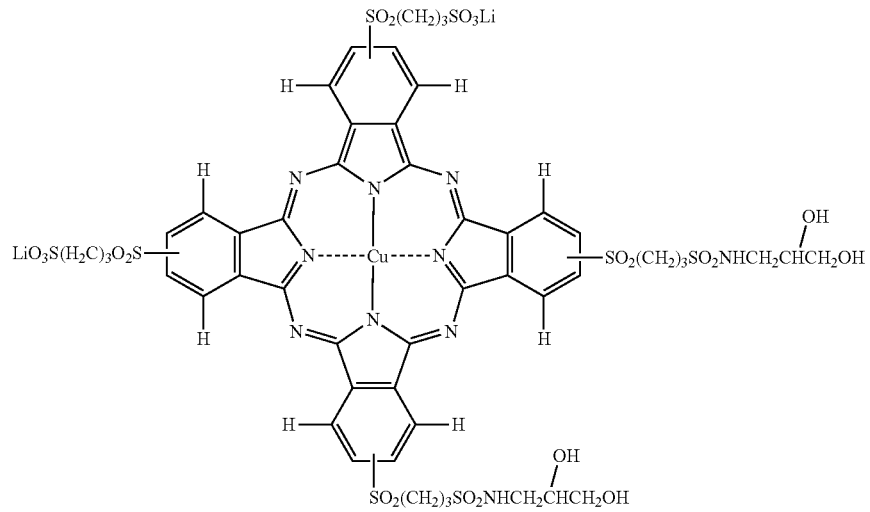
C-2-2
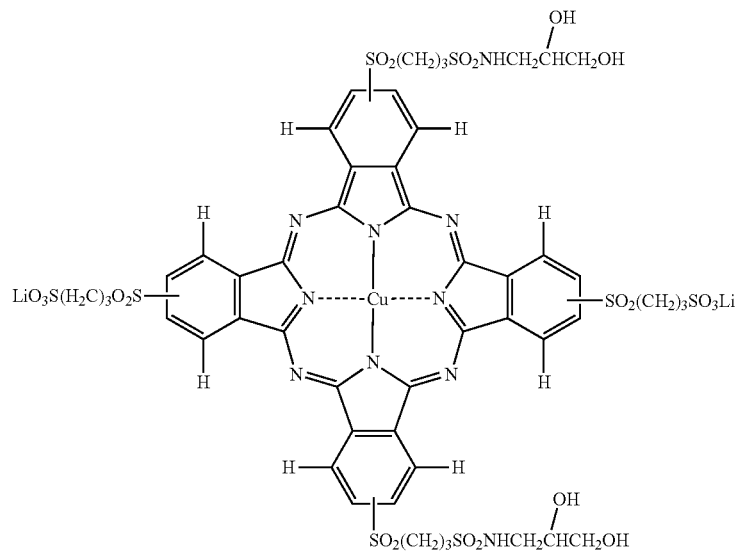
C-3-1
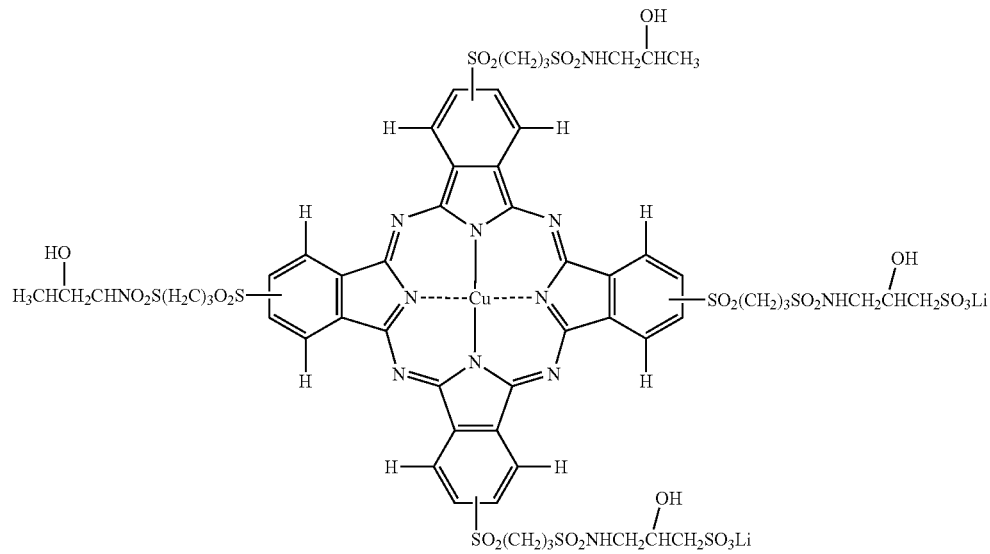

-continued
C-3-2
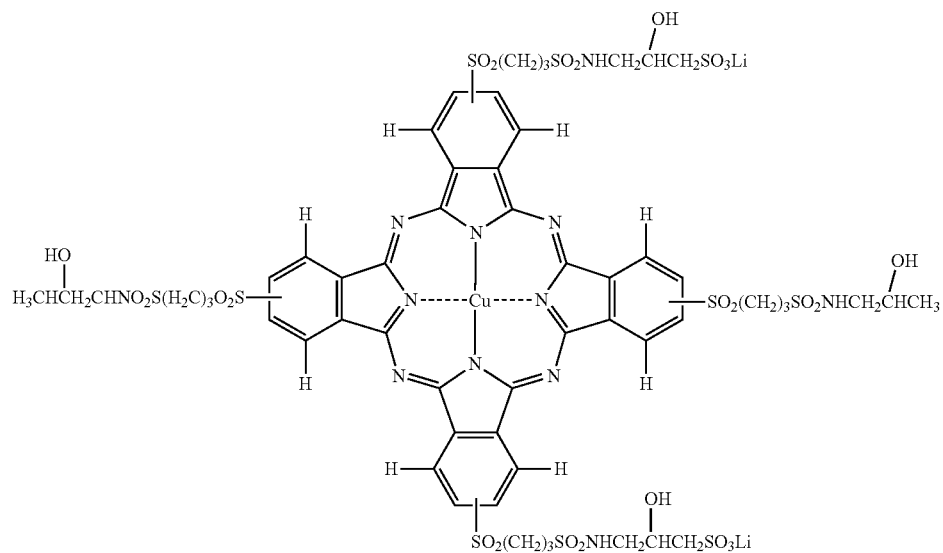
C-4-1
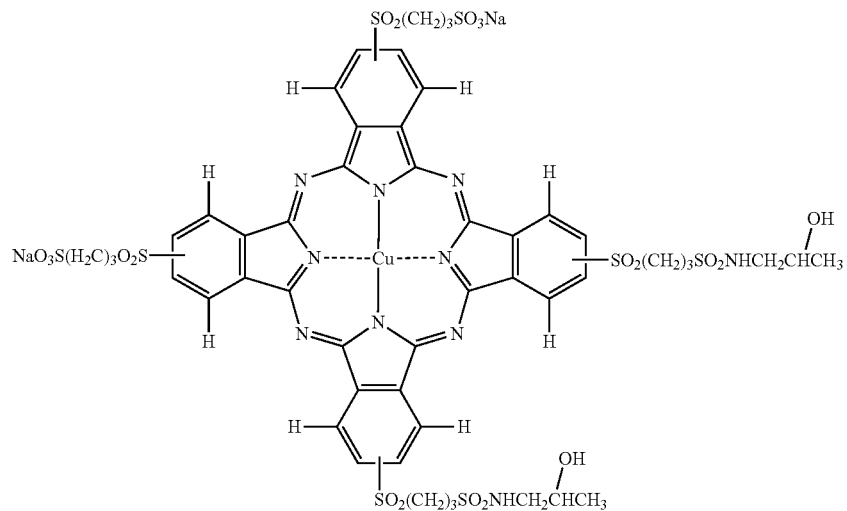
C-4-2
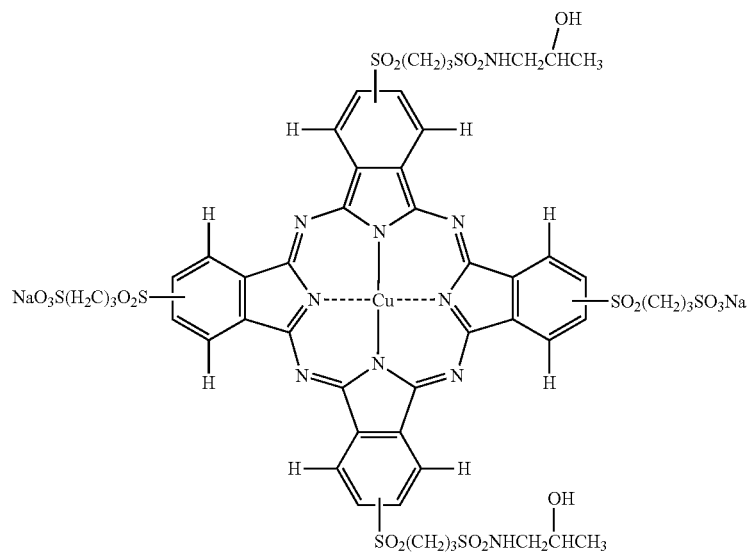

C-5-1
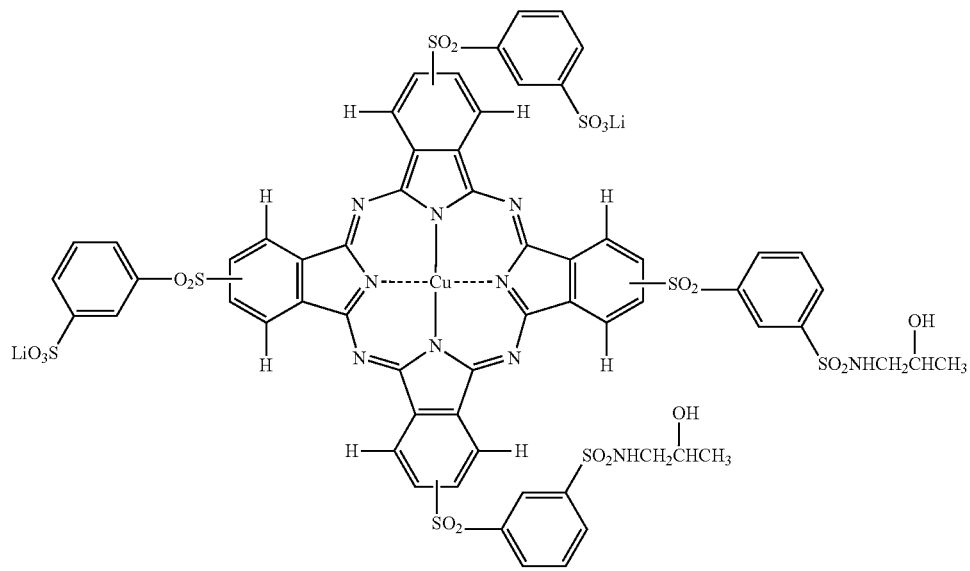
C-5-2
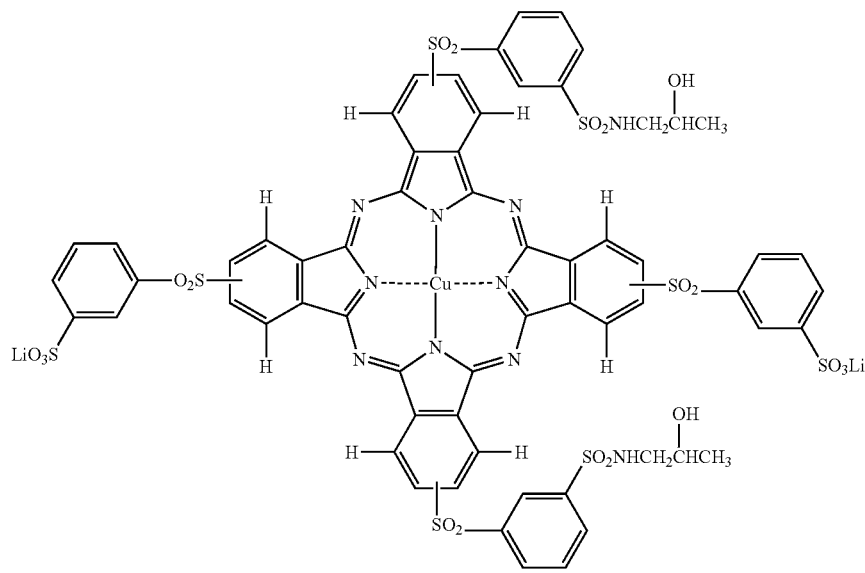
C-6-1
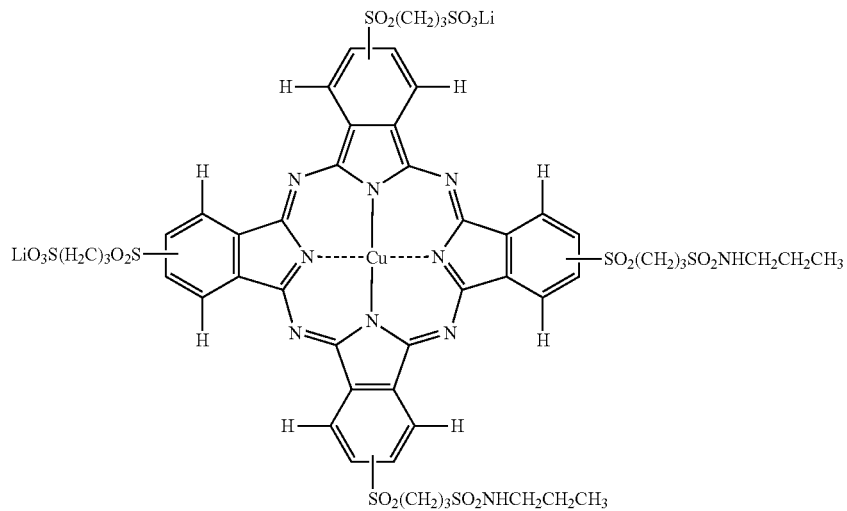

-continued
C-6-2
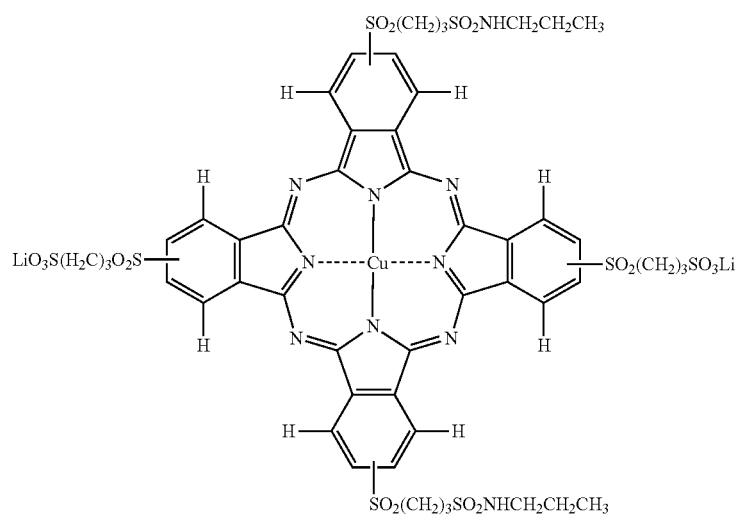
C-7-1
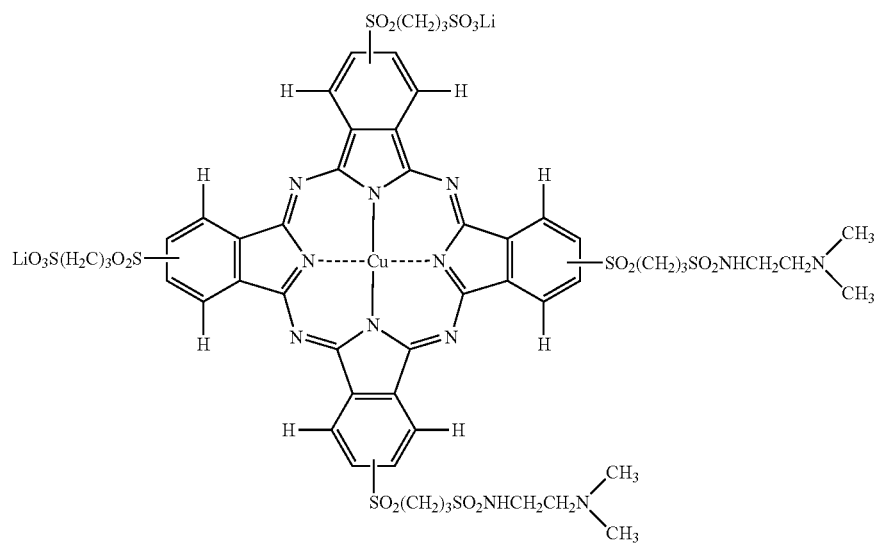
C-7-2
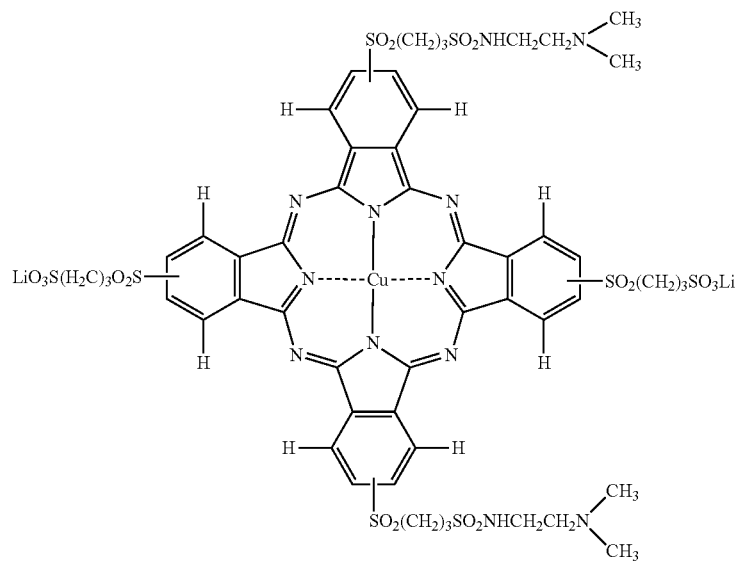

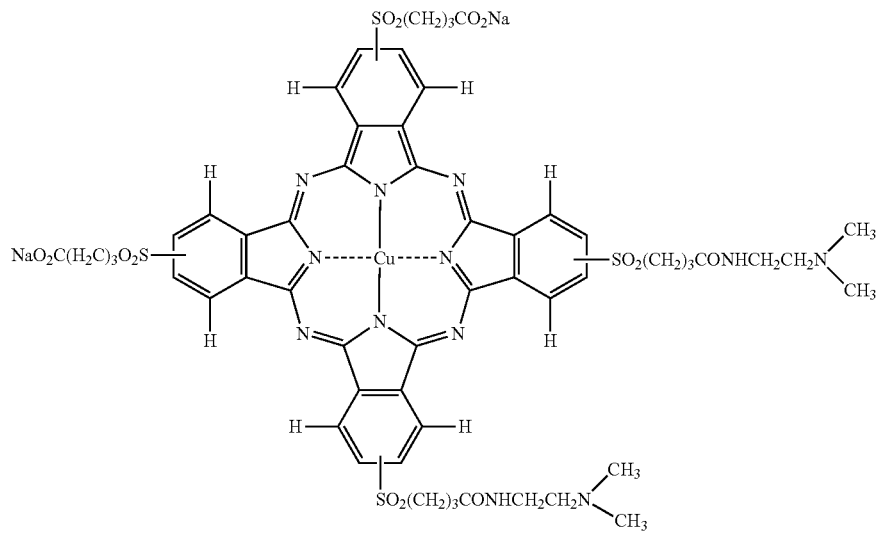
C-8-1
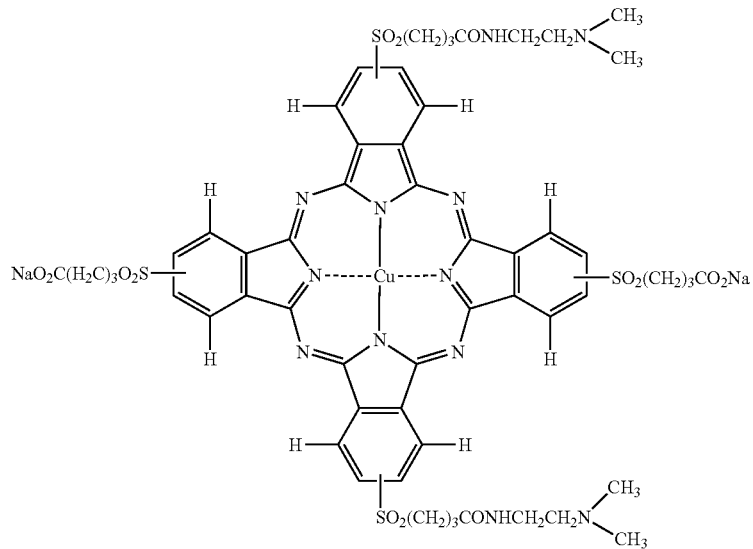
C-8-2
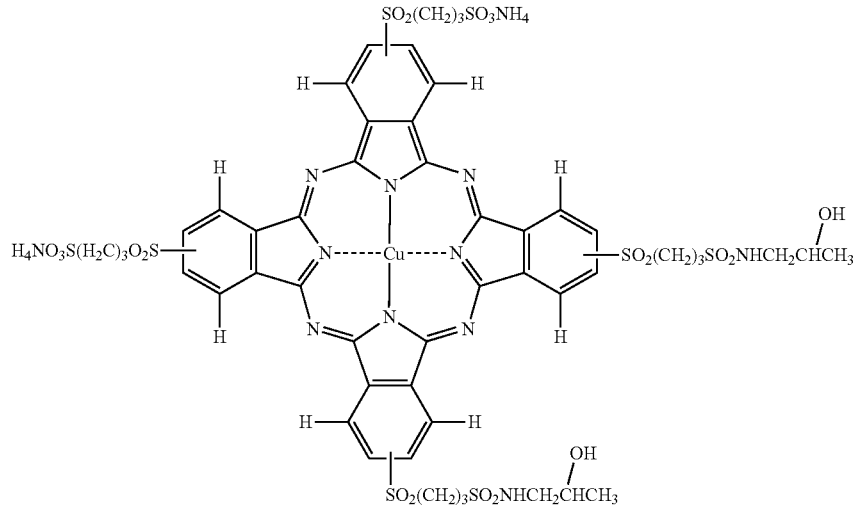
C-9-1

-continued
C-9-2
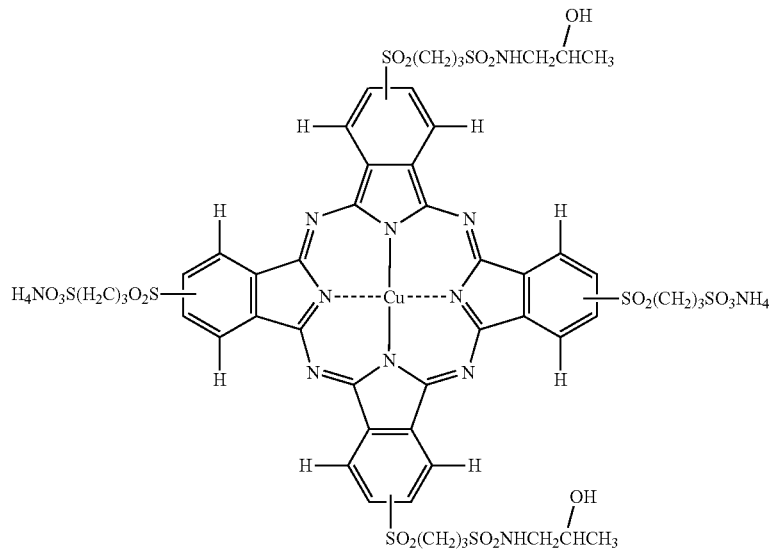
C-10-1
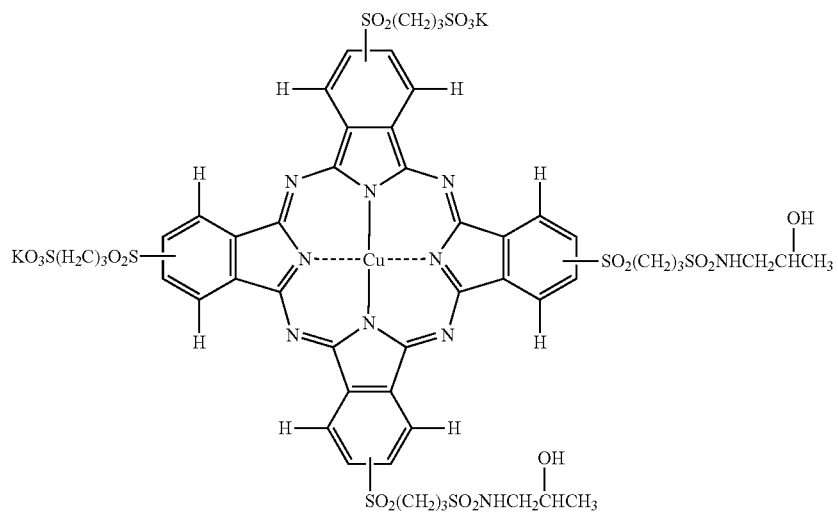
C-10-2
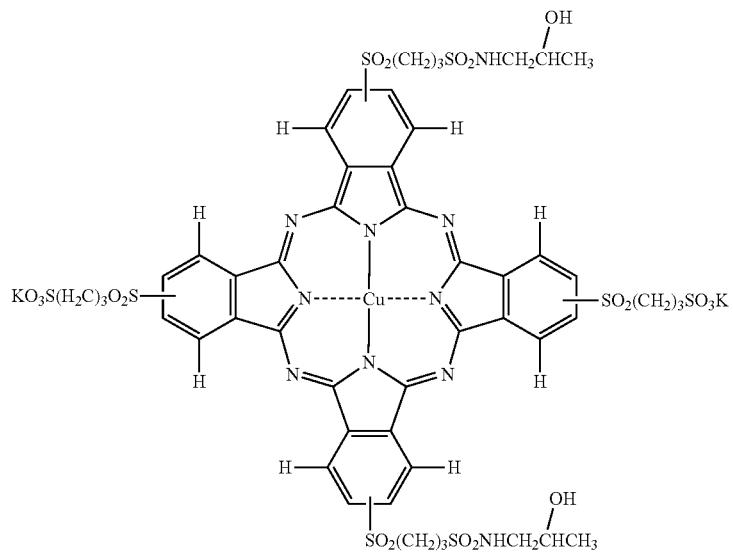

Specific examples of the compound D (compound represented by general formula (I-4)) are described without distinguishing the substitution positions. That is, the specific examples below each encompass positional isomers having different substitution positions as in (2A) to (2D) above. R in this case each independently represent a substituent (—$SO_2Z_1$ or —$SO_2Z_2$). Although a counter cation (M) of an ionic hydrophilic group (for example, —$SO_3M$ or —$CO_2M$) is described in the form of a salt, the counter cation is not limited to a single salt but may be in the form of a partial free acid (for example, M=Li ion and hydrogen atom, or Na ion and hydrogen atom) and a mixed salt (for example, M=salts of Li ion and Na ion, or salts of Na ion and $NH_4$ ion).

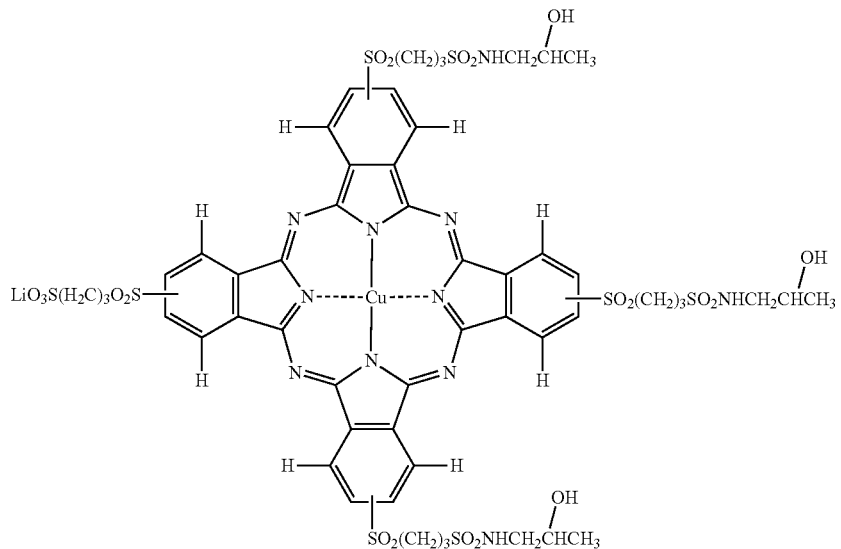

D-1

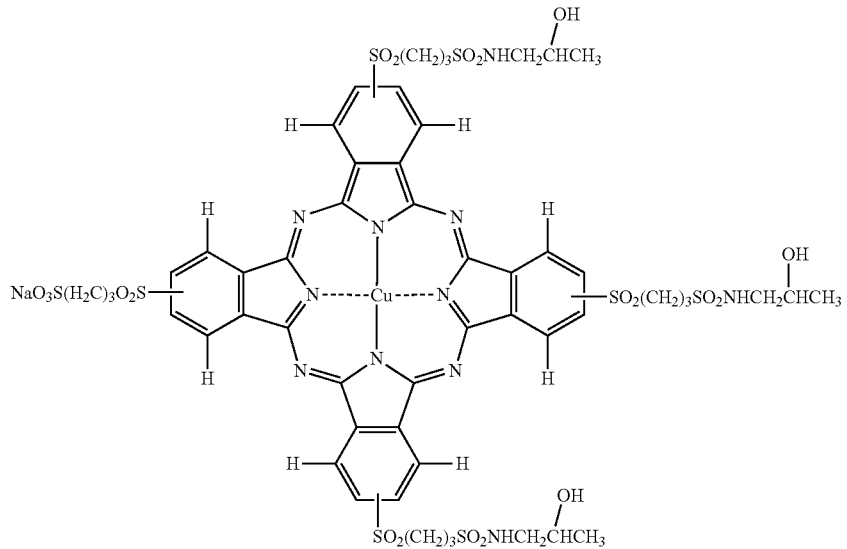

D-2

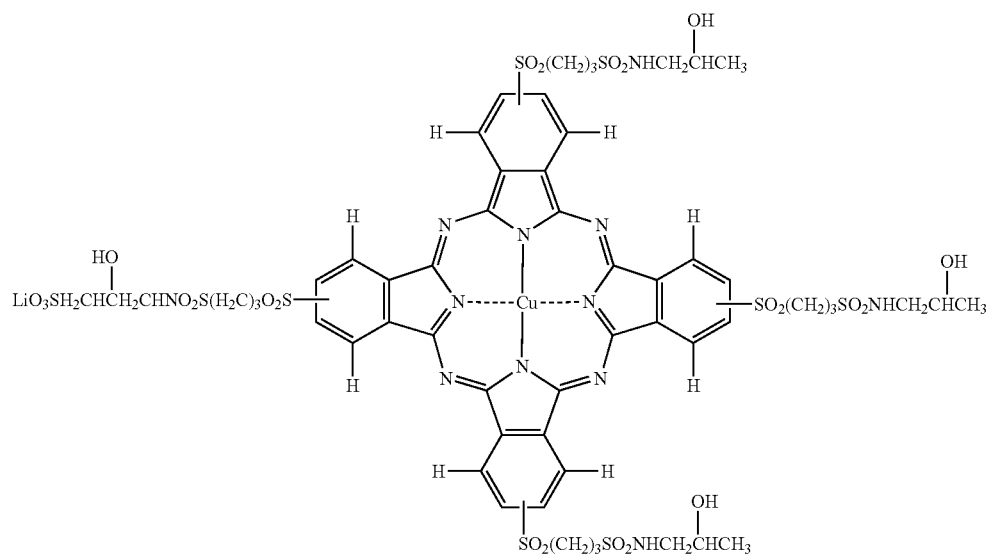
D-3
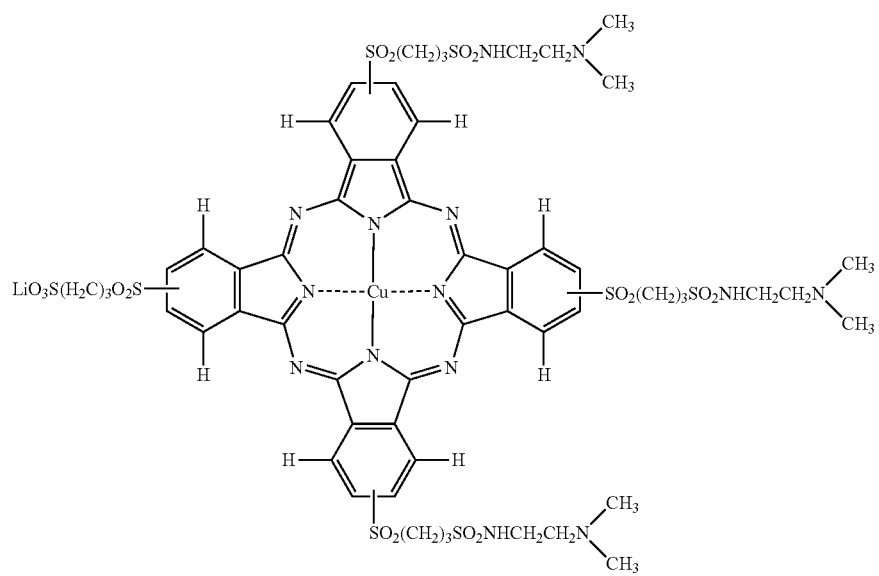
D-4

-continued
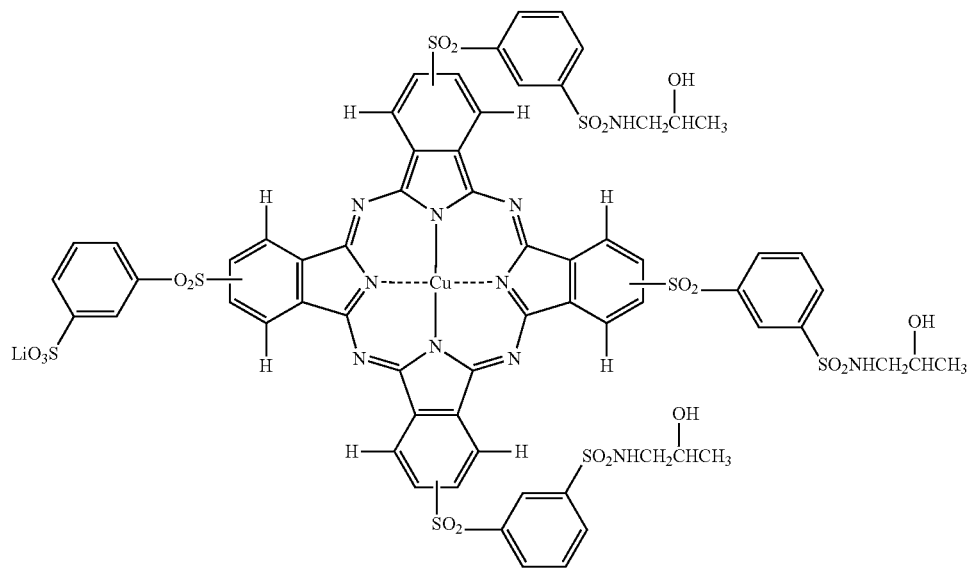
D-5
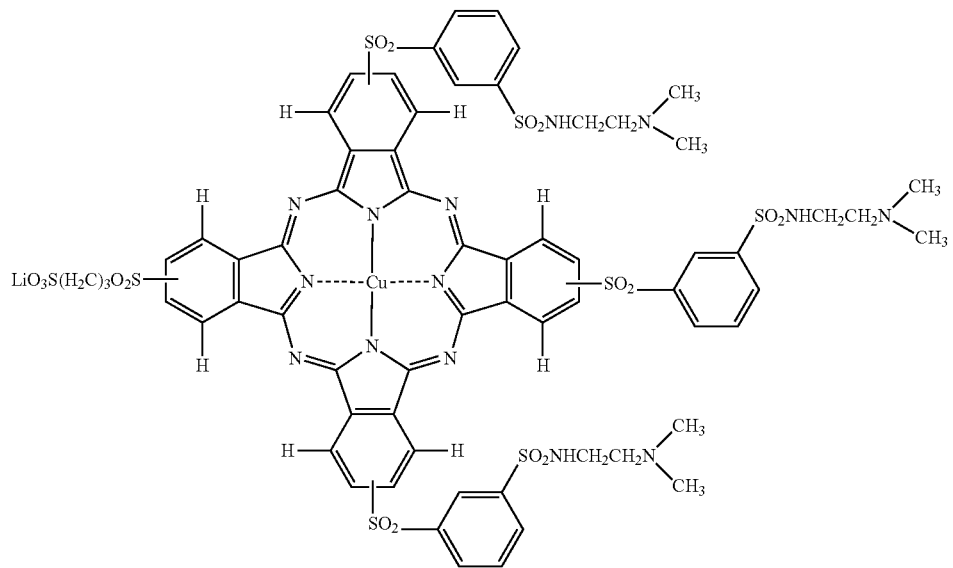
D-6

-continued
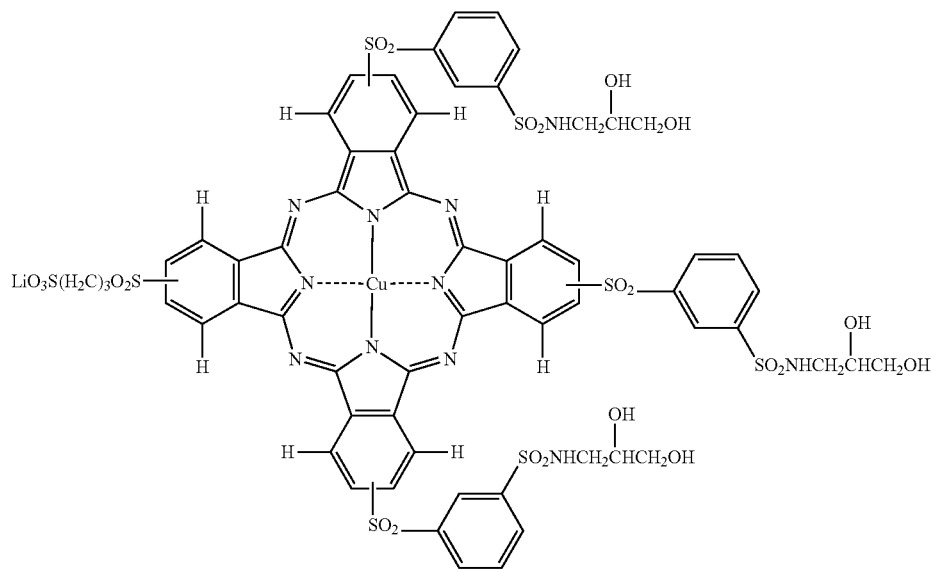
D-7
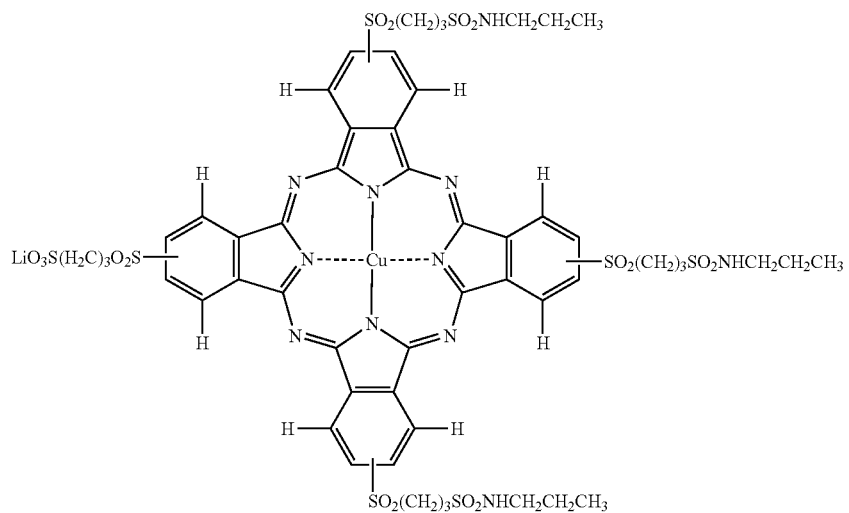
D-8
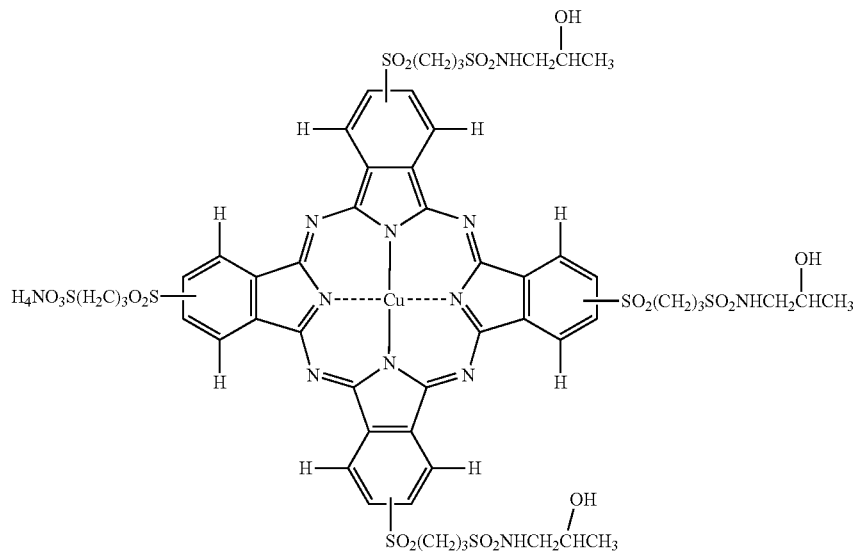
D-9

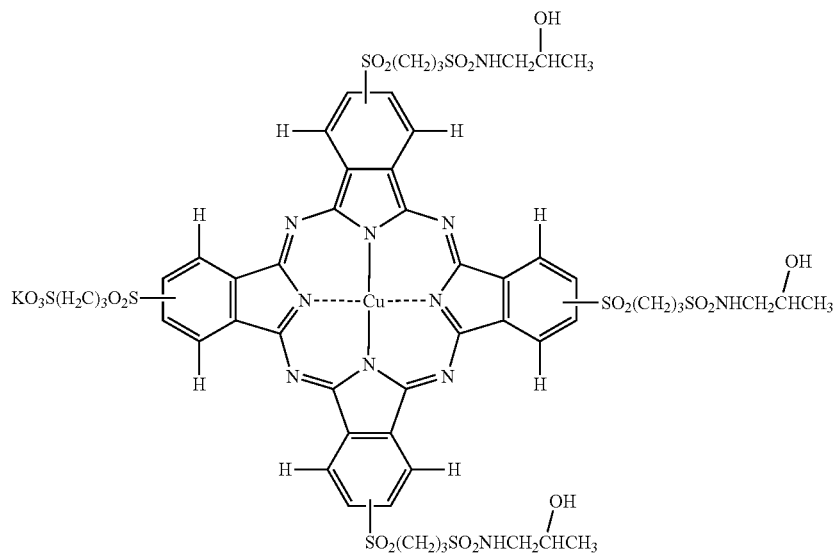
D-10
Specific examples of the compound E (compound represented by general formula (I-5)) are described without distinguishing the substitution positions. That is, the specific examples below each encompass positional isomers having different substitution positions as in (2A) to (2D) above. R in this case each represent a substituent ($-SO_2Z_2$).
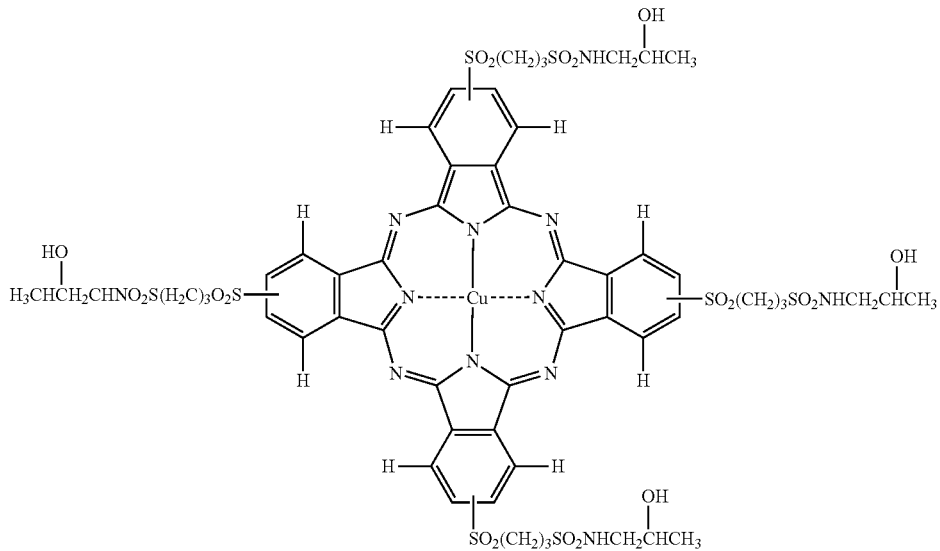
E-1

-continued
E-2
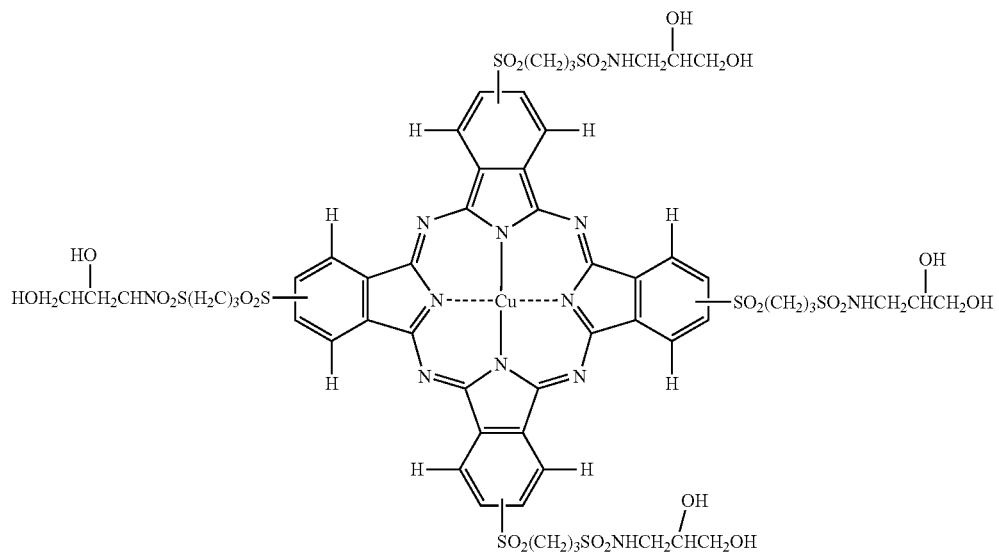
E-3
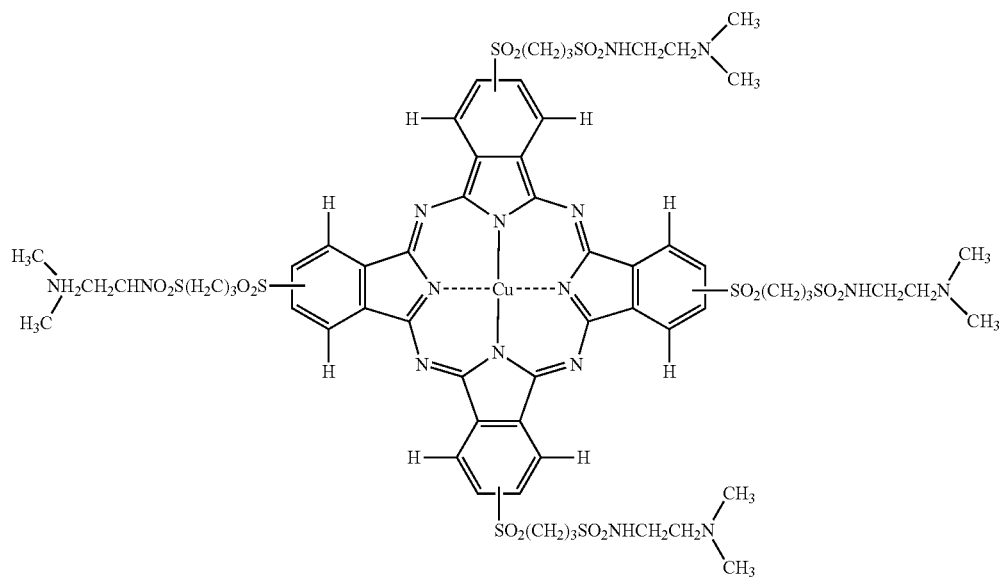
E-4
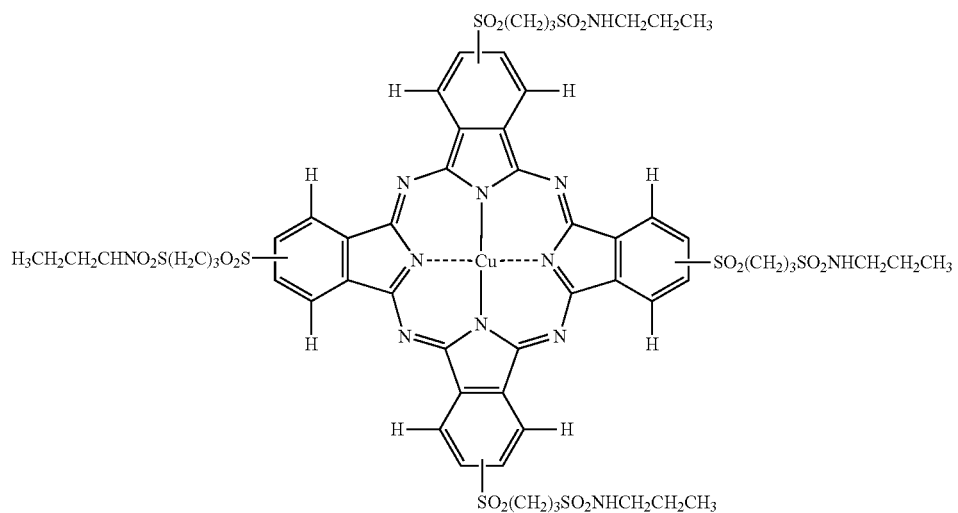

-continued
E-5
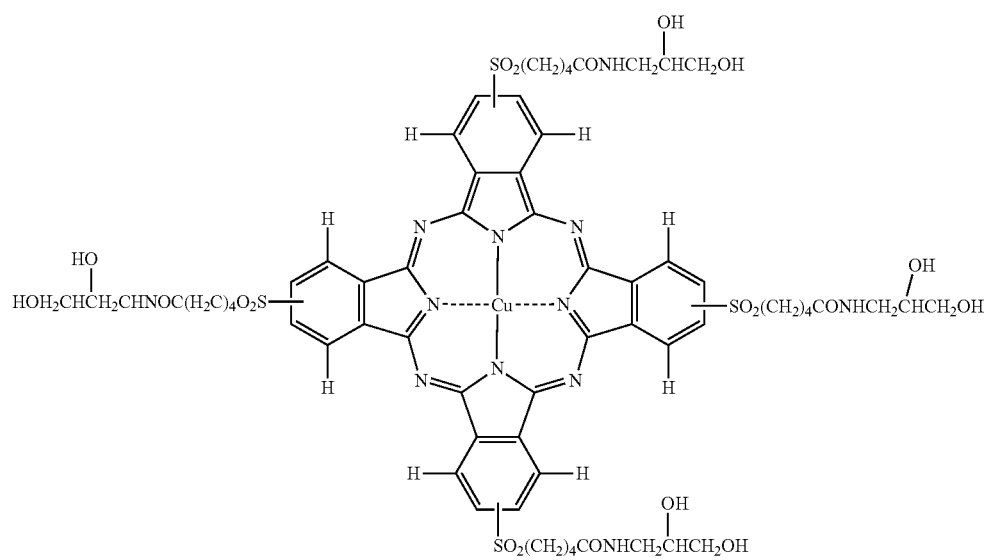
E-6
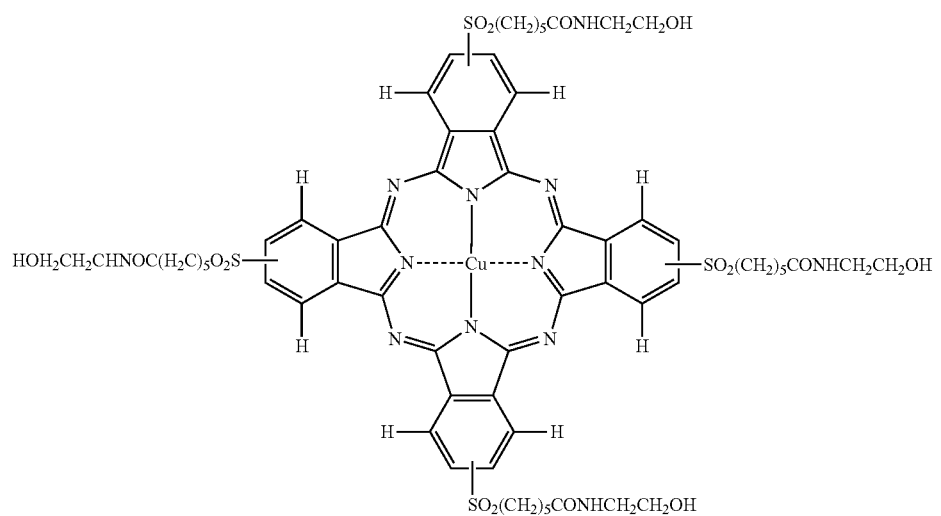
E-7
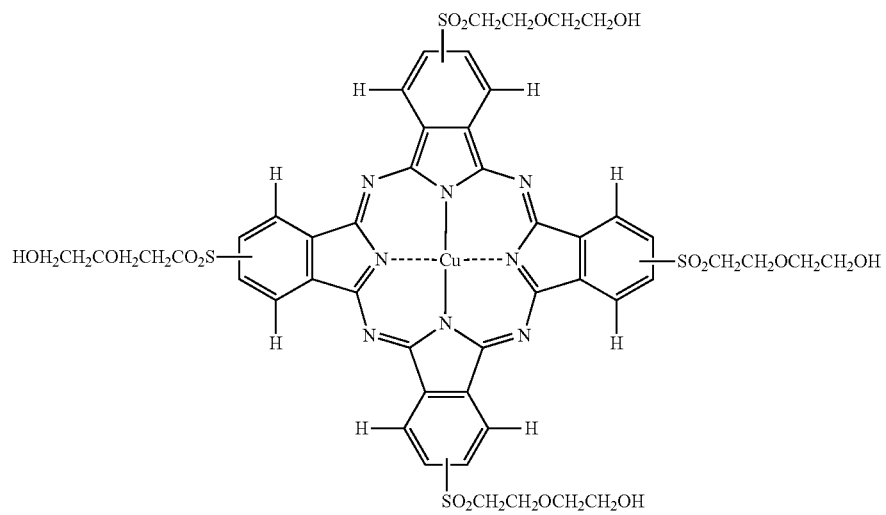

-continued
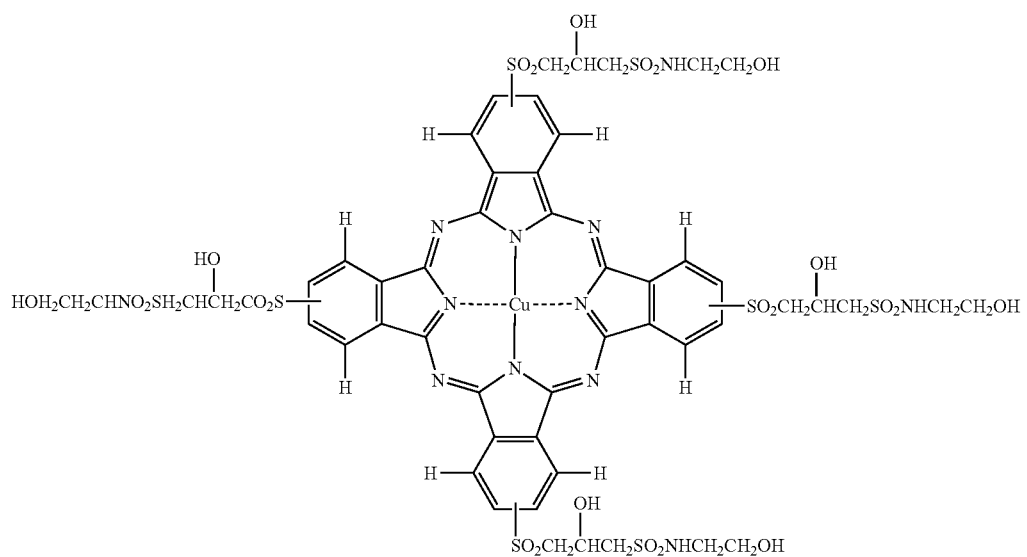
E-8
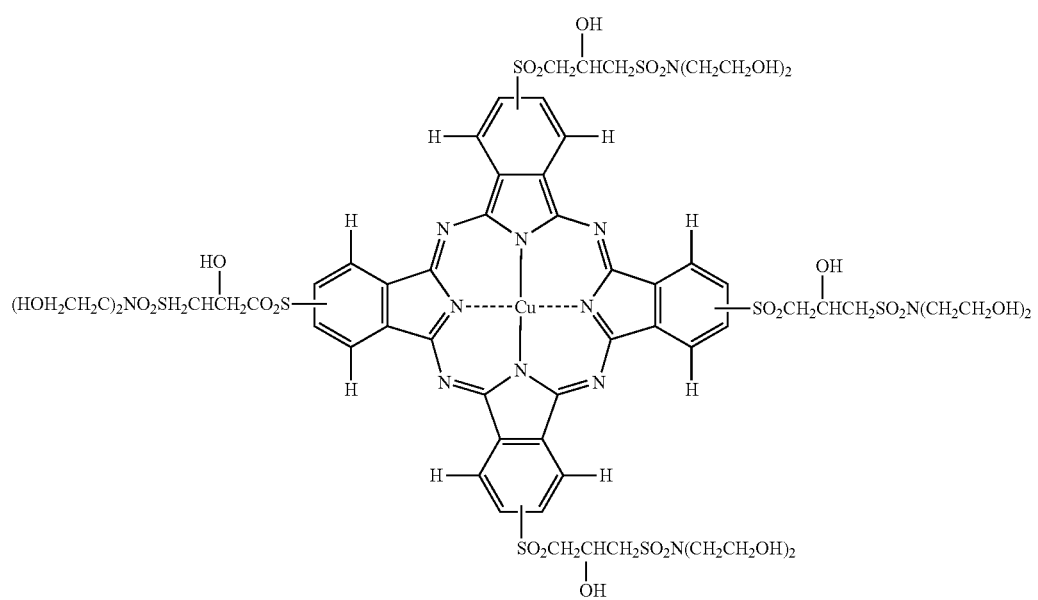
E-9

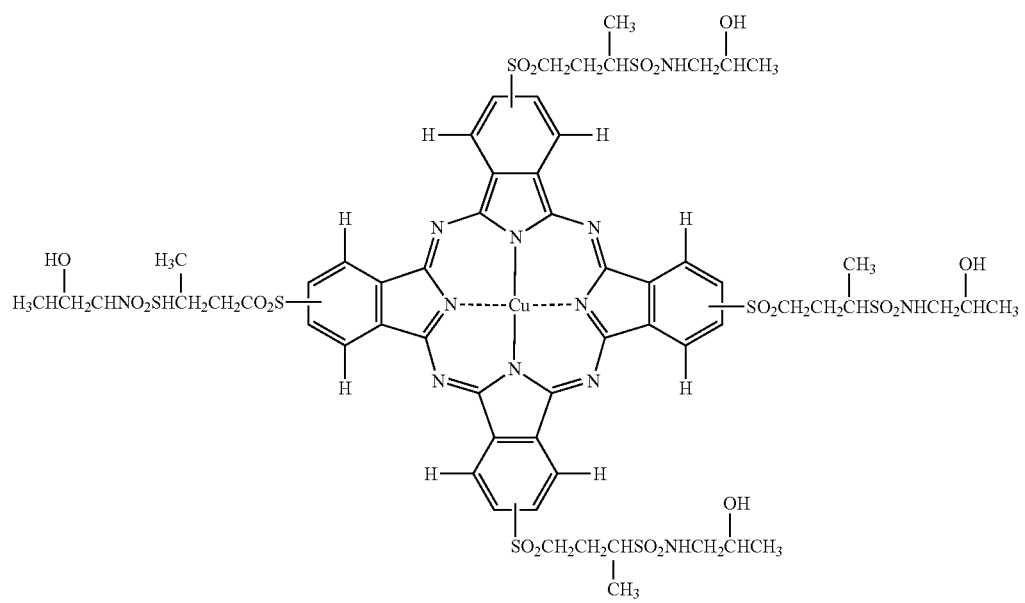
E-10
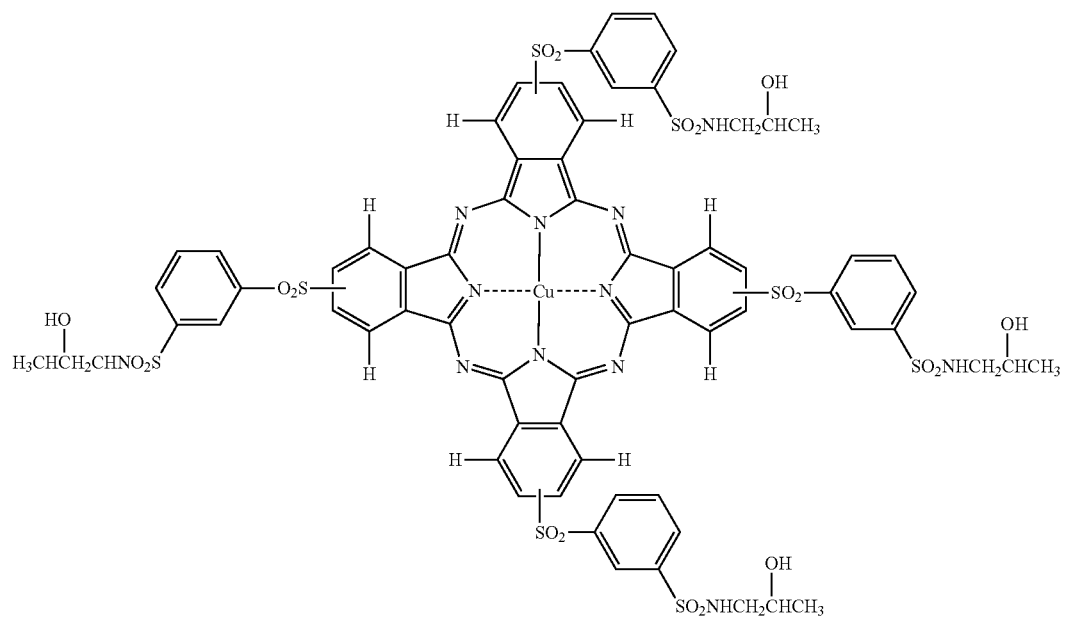
E-11

-continued

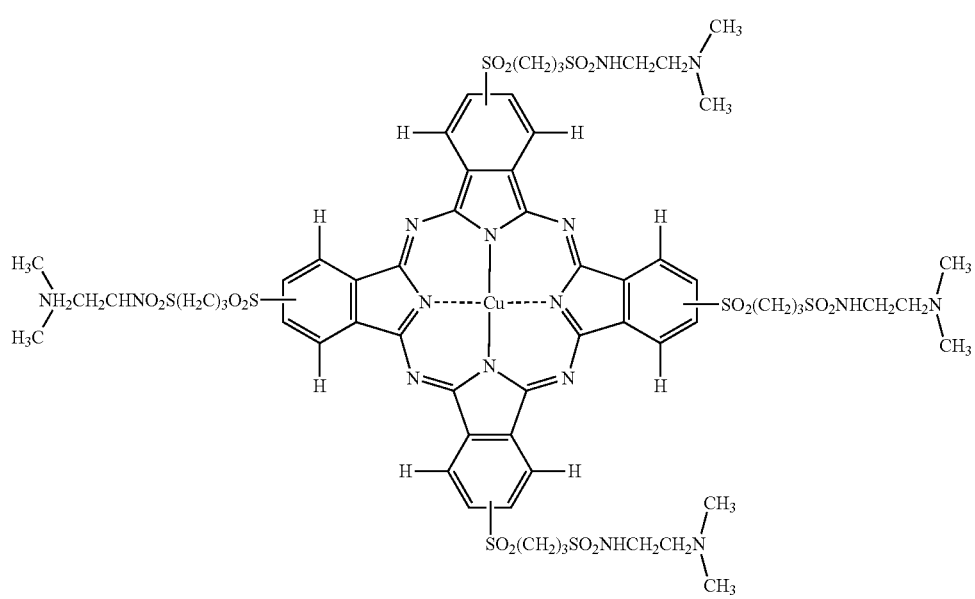

E-12

The compound A can be synthesized, isolated, and purified by employing publicly known methods (for example, methods described in Examples of JP3949385B, JP4145153B, JP4512543B, and JP4625644B) alone or in combination of two or more and further applying purification, as needed. The compound B, the compound C-I, the compound C-II, the compound D, and the compound E can also be obtained by methods similar to the methods for the compound A.

In the case where the dye ink composition according to the present invention includes the compound A to the compound D and does not include the compound E, when a mass of the compound A is represented by $W_1$, a mass of the compound B is represented by $W_2$, a sum of a mass of the compound C-I and a mass of the compound C-II is represented by $W_3$, a mass of the compound D is represented by $W_4$, and a total sum of $W_1$, $W_2$, $W_3$, and $W_4$ is represented by $W_{A1}$, (that is, when $W_1+W_2+W_3+W_4=W_{A1}$), the compounds A, B, C-I, C-II, and D being included in the dye ink composition according to the present invention, preferably, a ratio of $W_1$ to $W_{A1}$ ($\{(W_1/W_{A1})\times100\}$) is 1.0% to 45.0% by mass, a ratio of $W_2$ to $W_{A1}$ ($\{(W_2/W_{A1})\times100\}$) is 15.0% to 55.0% by mass, a ratio of $W_3$ to $W_{A1}$ ($\{(W_3/W_{A1})\times100\}$) is 10.0% to 55.0% by mass, and a ratio of $W_4$ to $W_{A1}$ ($\{(W_4/W_{A1})\times100\}$) is 1.0% to 45.0% by mass.

More preferably, the ratio of $W_1$ to $W_{A1}$ is 2.0% to 45.0% by mass, the ratio of $W_2$ to $W_{A1}$ is 15.0% to 50.0% by mass, the ratio of $W_3$ to $W_{A1}$ is 10.0% to 50.0% by mass, and the ratio of $W_4$ to $W_{A1}$ is 1.0% to 40.0% by mass.

Particularly preferably, the ratio of $W_1$ to $W_{A1}$ is 3.0% to 40.0% by mass, the ratio of $W_2$ to $W_{A1}$ is 20.0% to 50.0% by mass, the ratio of $W_3$ to $W_{A1}$ is 12.0% to 50.0% by mass, and the ratio of $W_4$ to $W_{A1}$ is 1.0% to 35.0% by mass.

Most preferably, the ratio of $W_1$ to $W_{A1}$ is 6.0% to 35.0% by mass, the ratio of $W_2$ to $W_{A1}$ is 20.0% to 45.0% by mass, the ratio of $W_3$ to $W_{A1}$ is 15.0% to 45.0% by mass, and the ratio of $W_4$ to $W_{A1}$ is 1.0% to 30.0% by mass from the viewpoints of water solubility of the dye mixture and a reduction in changes in physical property values of the solution due to external factors.

In the case where the dye ink composition according to the present invention includes the compound A to the compound D and further includes the compound E, when a mass of the compound A is represented by $W_1$, a mass of the compound B is represented by $W_2$, a sum of a mass of the compound C-I and a mass of the compound C-II is represented by $W_3$, a mass of the compound D is represented by $W_4$, a mass of the compound E is represented by $W_5$, and a total sum of $W_1$, $W_2$, $W_3$, $W_4$, and $W_5$ is represented by $W_{A2}$, (that is, when $W_1+W_2+W_3+W_4+W_5=W_{A2}$), the compounds A, B, C-I, C-II, D, and E being included in the dye ink composition according to the present invention, preferably, a ratio of $W_1$ to $W_{A2}$ ($\{(W_1/W_{A2})\times100\}$) is 0.4% to 45.0% by mass, a ratio of $W_2$ to $W_{A2}$ ($\{(W_2/W_{A2})\times100\}$) is 1.0% to 55.0% by mass, a ratio of $W_3$ to $W_{A2}$ ($\{(W_3/W_{A2})\times100\}$) is 10.0% to 55.0% by mass, a ratio of $W_4$ to $W_{A2}$ ($\{(W_4/W_{A2})\times100\}$) is 1.0% to 45.0% by mass, and a ratio of $W_5$ to $W_{A2}$ ($\{(W_5/W_{A2})\times100\}$) is 0.1% to 20.0% by mass.

More preferably, the ratio of $W_1$ to $W_{A2}$ is 1.0% to 45.0% by mass, the ratio of $W_2$ to $W_{A2}$ is 15.0% to 55.0% by mass, the ratio of $W_3$ to $W_{A2}$ is 10.0% to 55.0% by mass, the ratio of $W_4$ to $W_{A2}$ is 1.0% to 45.0% by mass, and the ratio of $W_5$ to $W_{A2}$ is 0.1% to 20.0% by mass.

Still more preferably, the ratio of $W_1$ to $W_{A2}$ is 2.0% to 45.0% by mass, the ratio of $W_2$ to $W_{A2}$ is 15.0% to 50.0% by mass, the ratio of $W_3$ to $W_{A2}$ is 10.0% to 50.0% by mass, the ratio of $W_4$ to $W_{A2}$ is 1.0% to 40.0% by mass, and the ratio of $W_5$ to $W_{A2}$ is 0.1% to 15.0% by mass.

Even still more preferably, the ratio of $W_1$ to $W_{A2}$ is 3.0% to 40.0% by mass, the ratio of $W_2$ to $W_{A2}$ is 20.0% to 50.0% by mass, the ratio of $W_3$ to $W_{A2}$ is 12.0% to 50.0% by mass, the ratio of $W_4$ to $W_{A2}$ is 1.0% to 35.0% by mass, and the ratio of $W_5$ to $W_{A2}$ is 0.1% to 12.0% by mass.

Particularly preferably, the ratio of $W_1$ to $W_{A2}$ is 5.0% to 35.0% by mass, the ratio of $W_2$ to $W_{A2}$ is 20.0% to 45.0% by mass, the ratio of $W_3$ to $W_{A2}$ is 15.0% to 45.0% by mass, the ratio of $W_4$ to $W_{A2}$ is 1.0% to 30.0% by mass, and the ratio of $W_5$ to $W_{A2}$ is 0.1% to 10.0% by mass from the viewpoints of water solubility of the dye mixture and a reduction in changes in physical property values of the solution due to external factors.

Most preferably, the ratio of $W_1$ to $W_{A2}$ is 5.0% to 30.0% by mass, the ratio of $W_2$ to $W_{A2}$ is 20.0% to 45.0% by mass, the ratio of $W_3$ to $W_{A2}$ is 15.0% to 45.0% by mass, the ratio of $W_4$ to $W_{A2}$ is 1.0% to 30.0% by mass, and the ratio of $W_5$ to $W_{A2}$ is 0.5% to 10.0% by mass from the viewpoints of water solubility of the dye mixture and a reduction in changes in physical property values of the solution due to external factors.

A mixing ratio (mass ratio) of the cyan dye mixture according to the present invention: compound A/compound B/compound C-I and compound C-II/compound D/compound E is preferably {33.00%/43.00%/22.00%/4.00%/0.00%} to {6.00%/25.05%/37.90%/25.05%/6.00%}, more preferably {32.5%/42.00%/21.00%/4.50%/0.00%} to {6.05%/25.10%/37.70%/25.10%/6.05%}, and most preferably {32.28%/41.78%/20.79%/4.75%/0.40%} to {6.25%/25.00%/37.60%/25.00%/6.25%} from the viewpoints of solubility of the phthalocyanine dyes, long-term storage stability of the ink, and the printing density on plain paper.

It is assumed that, in the dye ink composition according to the present invention, when the compound A to the compound E are used in the ratio described above, the compound A having the highest water solubility and the compound E that induces the strongest intermolecular interaction can coexist in an optimal ratio, physical properties of the resulting ink liquid can be considerably rapidly stabilized compared with inks using existing phthalocyanine dye mixtures, and consequently, physicochemical changes in physical properties of the liquid are extremely small, and high long-term storage stability can be exhibited as a dye ink composition.

From the viewpoints of the printing density on various types of image-receiving paper (ink jet paper and plain paper) and the fastness of dye color images, a ratio of $W_{A1}$ to a total mass of the dye ink composition according to the present invention ({($W_{A1}$/total mass of dye ink composition)×100}) or a ratio of $W_{A2}$ to the total mass ({($W_{A2}$/total mass of dye ink composition)×100}) is preferably 1.0% by mass or more and 8.0% by mass or less, more preferably 2.0% by mass or more and 6.0% by mass or less, still more preferably 2.5% by mass or more and 6.0% by mass or less, and particularly preferably 3.0% by mass or more and 5.5% by mass or less.

The dye ink composition according to the present invention may further include other components in addition to the compound A to the compound E.

The dye ink composition according to the present invention may include a compound represented by general formula (Cy-1) below.

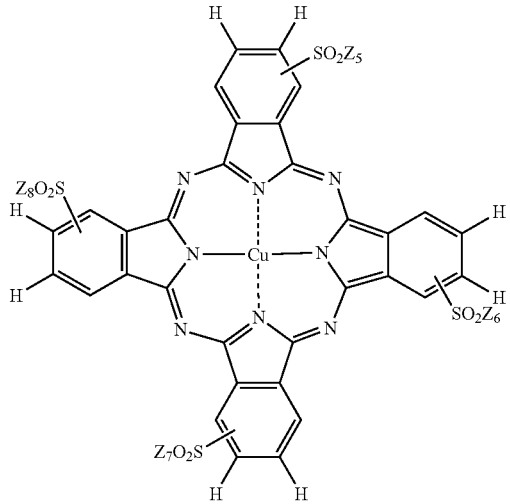

(Cy-1)

In general formula (Cy-1), $Z_5$, $Z_6$, $Z_7$, and $Z_8$ each independently represent a substituted or unsubstituted alkyl group, a substituted or unsubstituted aryl group, or a substituted or unsubstituted heterocyclic group, provided that at least one of $Z_5$, $Z_6$, $Z_7$, or $Z_8$ has a substituent that includes an ionic hydrophilic group.

The substituted or unsubstituted alkyl group, the substituted or unsubstituted aryl group, and the substituted or unsubstituted heterocyclic group represented by $Z_5$, $Z_6$, $Z_7$, and $Z_8$ in general formula (Cy-1) are the same as the substituted or unsubstituted alkyl group, the substituted or unsubstituted aryl group, and the substituted or unsubstituted heterocyclic group, respectively, in $Z_1$ in general formula (I-1) described above.

At least one of $Z_5$, $Z_6$, $Z_7$, or $Z_8$ has a substituent that includes an ionic hydrophilic group, and the ionic hydrophilic group is the same as the ionic hydrophilic group present in $Z_1$ in general formula (I-1) described above.

The compound represented by general formula (Cy-1) is a phthalocyanine dye in which substituted sulfonyl groups (—$SO_2$—$Z_5$, —$SO_2$—$Z_6$, —$SO_2$—$Z_7$, and —$SO_2$—$Z_8$) are introduced to α positions. That is, in general formula (Cy-1), —$SO_2$—$Z_5$, —$SO_2$—$Z_6$, —$SO_2$—$Z_7$, and —$SO_2$—$Z_8$ replace hydrogen atoms at α positions but do not replace hydrogen atoms at β positions.

The α positions and the β positions of the phthalocyanine skeleton are as illustrated in formula (a) above.

The compound represented by general formula (Cy-1) can be synthesized by a publicly known method (for example, methods described in JP3949385B and JP4854250B).

Specific examples of the compound represented by general formula (Cy-1) are described below, but are not limited thereto. In structural formulae of specific compounds below, each specific compound is a mixture including positional isomers (refer to (3A) to (3D) below) of substituted sulfonyl groups (Q represents —$SO_2$—$Z_5$, —$SO_2$—$Z_6$, —$SO_2$—$Z_7$, or —$SO_2$—$Z_8$). Therefore, the introduction positions of substituents are not specified, and the positional isomers are treated as the same compound. In the specific examples below, hydrogen atoms are illustrated at β positions in each structural formula to indicate that a substituted sulfonyl group replaces any hydrogen atom at an α position but does not replace a hydrogen atom at a β position.

95     96
(3A)            (3B)
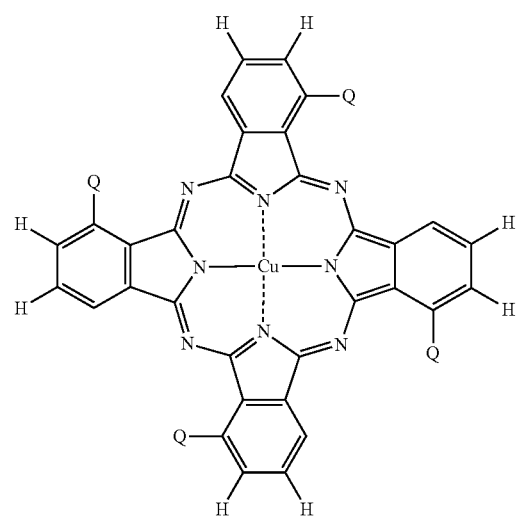  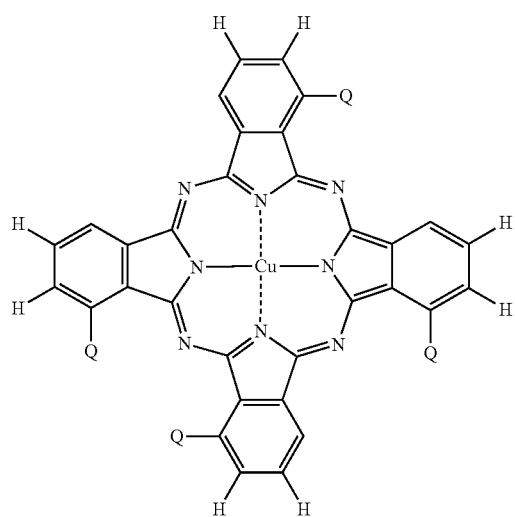
(3C)            (3D)
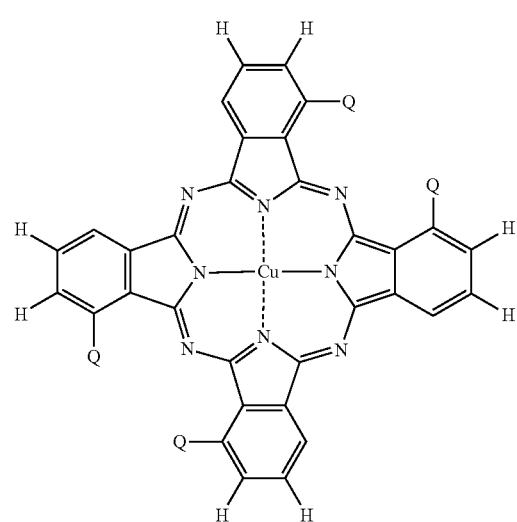  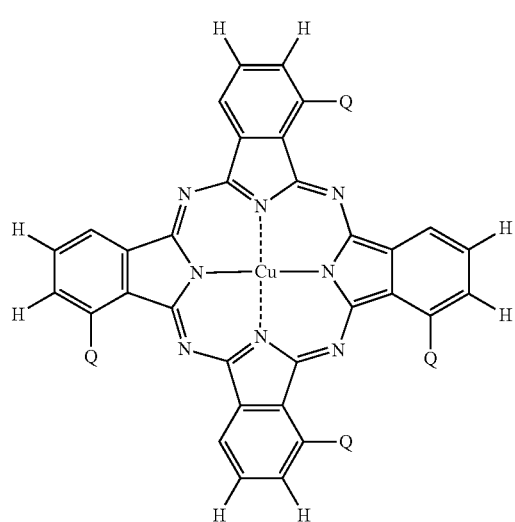
Q-1            Q-2
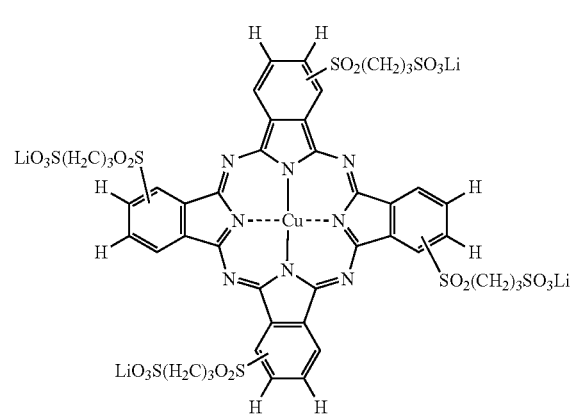  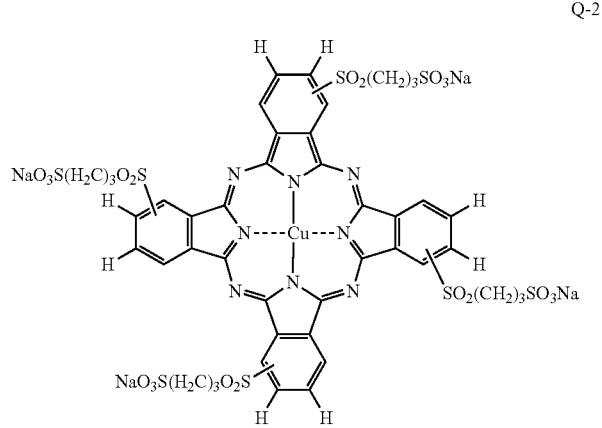

-continued
Q-3
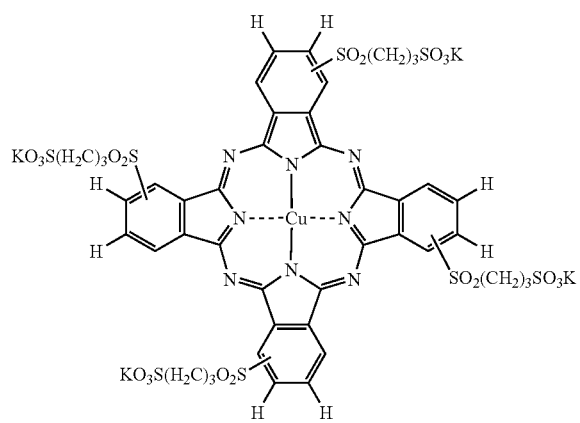
Q-4
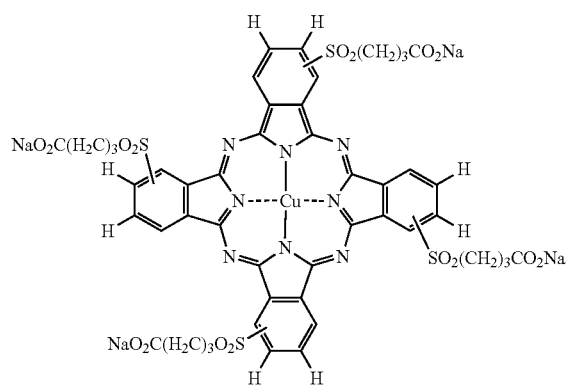
Q-5
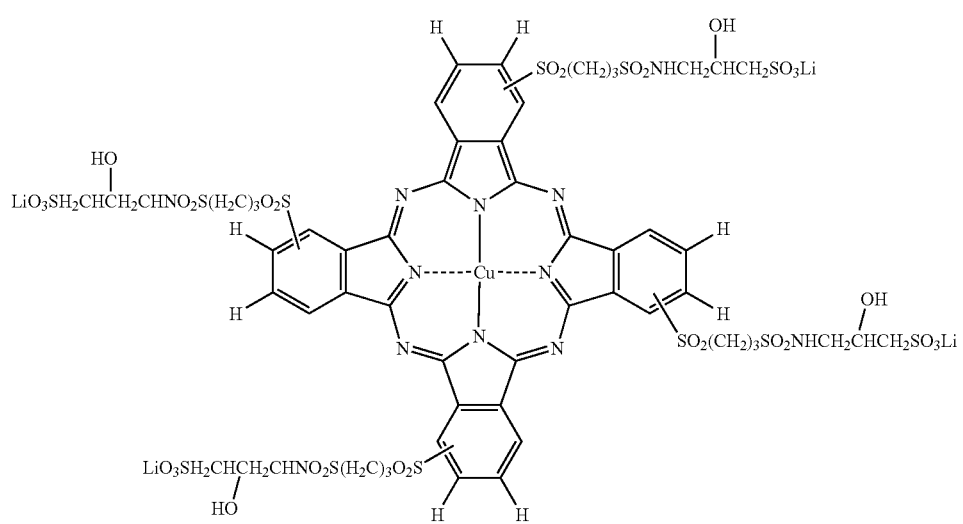

The use of the β-position substituted compound A to compound E and the α-position substituted compound represented by general formula (Cy-1) enables the adjustment of a ratio of α-position substitution and β-position substitution between molecules rather than in a molecule. Consequently, both high printing density (on plain paper and on ink jet paper) and good image durability can be achieved at a high level.

The dye ink composition according to the present invention may include a compound (toning agent) represented by any of general formulae (Cy-2) to (Cy-5) below.

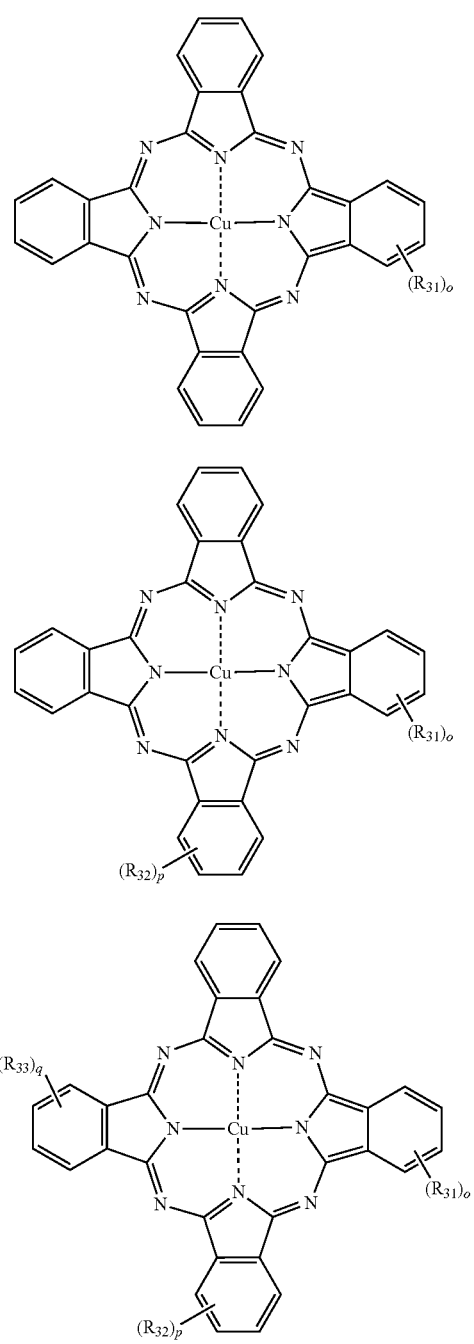

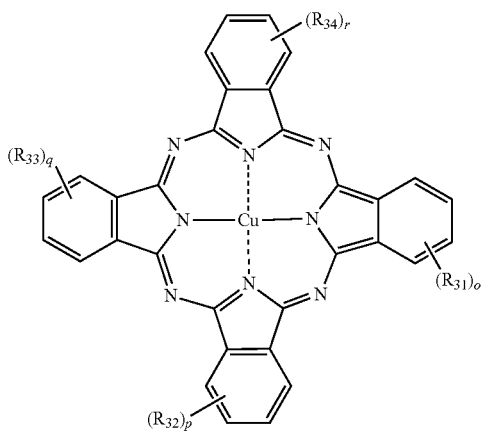

In general formulae (Cy-2) to (Cy-5), $R_{31}$, $R_{32}$, $R_{33}$, and $R_{34}$ each independently represent a substituted or unsubstituted sulfamoyl group, a substituted or unsubstituted carbamoyl group, a sulfo group, or a carboxy group; in a case where a plurality of $R_{31}$'s, $R_{32}$'s, $R_{33}$'s, or $R_{34}$'s are present, they may be the same or different; and o, p, q, and r each independently represent an integer of 1 to 4.

The compound represented by any of general formulae (Cy-2) to (Cy-5) is an α-position/β-position substitution mixture (for example, α-position/β-position≈10%/90% to 50%/50%) in which there is no selectivity of the introduction positions of substituents with regard to the α positions and the β positions of the phthalocyanine dye skeleton illustrated in formula (a) above.

In general formulae (Cy-2) to (Cy-5), $R_{31}$, $R_{32}$, $R_{33}$, and $R_{34}$ may each be independently a substituted or unsubstituted sulfamoyl group, a substituted or unsubstituted carbamoyl group, a sulfo group (—$SO_3M$), or a carboxy group (—$CO_2M$) from the viewpoints of availability of raw materials and the ease of synthesis, are preferably each independently a substituted sulfamoyl group (—$SO_2NR_{41}R_{42}$: where $R_{41}$ and $R_{42}$ each independently represent a hydrogen atom or a substituent, provided that at least one of $R_{41}$ or $R_{42}$ represents a substituent), an unsubstituted sulfamoyl group (—$SO_2NH_2$), and a sulfo group (—$SO_3M$) from the viewpoints of water solubility and image durability, and are more preferably a mixture of a substituted sulfamoyl group (—$SO_2NHR_{42}$: where $R_{42}$ represents a substituent that includes an ionic hydrophilic group), an unsubstituted sulfamoyl group (—$SO_2NH2$), and a sulfo group (—$SO_3M$) from the viewpoints of water solubility and image durability. The substituent may be an alkyl group or an aryl group. The ionic hydrophilic group is the same as the ionic hydrophilic group present in $Z_1$ in general formula (I-1) described above.

When $R_{31}$, $R_{32}$, $R_{33}$, and $R_{34}$ in general formulae (Cy-2) to (Cy-5) represent a sulfo group (—$SO_3M$) or a carboxy group (—$CO_2M$), M represents a hydrogen atom or a counter cation. The M is the same as M in —$SO_3M$ or —$CO_2M$ serving as an ionic hydrophilic group present in $Z_1$ in general formula (I-1) described above.

o, p, q, and r each independently represent an integer of 1 to 4, preferably 1 to 3, more preferably 1 to 2, and most preferably 1. A mixture of general formulae (Cy-2), (Cy-3), (Cy-4), and (Cy-5) is preferred from the viewpoint of availability of a dye serving as a coloring agent. Examples of the specific compound include C.I. Direct Blue 86, C.I. Direct Blue 87, and C.I. Direct Blue 199.

Compounds (phthalocyanine derivatives) represented by general formulae (Cy-2) to (Cy-5) can be synthesized, for example, on the basis of methods described in, for example, "Phthalocyanine—Chemistry and Function-" written by Shirai and Kobayashi, published by IPC, pp. 1 to 62 and "Phthalocyanines—Properties and Applications" written by C. C. Leznoff and A. B. P. Lever, published by VCH, pp. 1 to 54.

The dye ink composition according to the present invention may further include dyes below. Note that "C.I." is an abbreviation of "color index".

C.I. Direct Blue: 6, 22, 25, 71, 78, 90, 106, 189, 262, 264, 276, 282, 314, etc.

C.I. Acid Blue: 9, 22, 40, 59, 93, 102, 104, 113, 117, 120, 167, 185, 197, 224, 228, 229, 234, 242, 243, 249, 254, 275, 279, 283, 310, 357, etc.

When the dye ink composition according to the present invention includes, as a coloring agent, a compound represented by any of general formulae (Cy-1) to (Cy-5), another phthalocyanine dye or a partial azaphthalocyanine dye, or a triarylmethane dye in addition to the compound A to the compound E, the total content (% by mass) of all coloring agents in the dye ink composition is preferably 1.0% by mass or more and 8.0% by mass or less, more preferably 2.0% by mass or more and 6.0% by mass or less, still more preferably 3.0% by mass or more and 6.0% by mass or less, and most preferably 3.0% by mass or more and 5.5% by mass or less based on the total mass of the dye ink composition from the viewpoints of printing density, continuous ejection stability, and storage stability.

A ratio ($W_{A1}/W_B/W_C/W_D$) or ($W_{A2}/W_B/W_C/W_D$) of a total mass (total content based on the mass) $W_{A1}$ of the compound A to the compound D included in the dye ink composition according to the present invention or a total mass (total content based on the mass) $W_{A2}$ of the compound A to the compound E, a mass (content based on the mass) $W_B$ of the dye represented by general formula (Cy-1) above, a mass (content based on the mass) Wc of the dye represented by general formula (Cy-2) above, and a total mass (total content based on the mass) $W_D$ of the compounds represented by general formulae (Cy-3) to (Cy-5) above is preferably 45 to 100/0 to 35/0 to 10/0 to 10, more preferably 50 to 100/0 to 35/0 to 10/0 to 5, still more preferably 55 to 100/0 to 35/0 to 10/0 to 5, particularly preferably 60 to 100/0 to 35/0 to 10/0, and most preferably 60 to 100/0 to 30/10/0 from the viewpoints of printing density on plain paper and image fastness on ink jet paper.

When the ratio $W_{A1}/W_B/W_C/W_D$ or $W_{A2}/W_B/W_C/W_D$ is within the range described above, it is possible to obtain the effect of satisfying, at a high level, required performances such as good long-term temporal stability (e.g., change in viscosity, change in surface tension, or reduction in precipitate) of the ink, high printing density (printing density on ink jet paper and plain paper), a reduction in bronze luster, and high image durability (in particular, ozone resistance and light resistance on the ink jet dye).

The dye ink composition according to the present invention can be used as a cyan dye ink. The dye ink composition according to the present invention can be used to produce a cyan dye ink.

A cyan dye ink according to the present invention preferably has the dye ink composition according to the present invention.

Compound Represented by General Formula (II)

The dye ink composition according to the present invention preferably includes a compound represented by general formula (II) below.

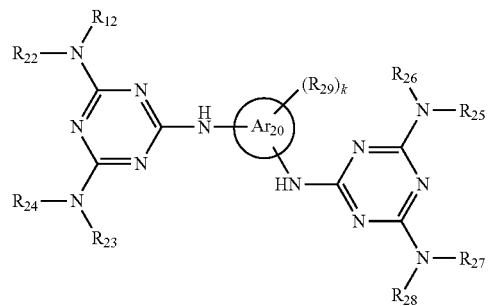

(II)

In general formula (II), $Ar_{20}$ represents a benzene ring or a naphthalene ring. $R_{21}$ to $R_{28}$ each independently represent a hydrogen atom or a substituent. $R_{21}$ and $R_{22}$ may be linked to each other to form a ring. $R_{23}$ and $R_{24}$ may be linked to each other to form a ring. $R_{25}$ and $R_{26}$ may be linked to each other to form a ring. $R_{27}$ and $R_{28}$ may be linked to each other to form a ring. $R_{29}$ represents a substituent. If $Ar_{20}$ represents a benzene ring, k represents an integer of 0 to 4. If $Ar_{20}$ represents a naphthalene ring, k represents an integer of 0 to 6. in a case where a plurality of $R_{29}$'s are present, the plurality of $R_{29}$'s may be the same or different. In a case where a plurality of $R_{29}$ are present, the plurality of $R_{29}$'s may be linked to form a ring. However, at least any one of $R_{21}$ to $R_{29}$ has a hydrophilic group.

The compound represented by general formula (II) is a compound having high planarity, and the inventors of the present invention have found that when this compound is added to the dye ink composition (phthalocyanine dye ink composition) according to the present invention, in an image immediately after being formed by the ink jet recording method, the printing density, continuous ejection stability, and storage stability are further improved by the effect of the intermolecular interaction between the dye mixture constituted by the compound A to the compound E and the compound represented by general formula (II).

The compound represented by general formula (II) is preferably a colorless, water-soluble planar compound having more than 10 delocalized π electrons in one molecule.

When the number of π electrons constituting the delocalized π-electron system increases and the π-electron system extends, compounds often have an absorption in the visible range. In the present invention, "colorless" includes a state of being very slightly colored within a range that does not affect an image. The water-soluble compound represented by general formula (II) may be a fluorescent compound, but is preferably a non-fluorescent compound, more preferably a compound having an absorption peak wavelength (λmax) of 350 nm or less, still more preferably 320 nm or less on the longest wavelength side and having a molar absorption coefficient of 10,000 or less.

The upper limit of the number of delocalized π electrons in one molecule of the compound represented by general formula (II) is not particularly limited, but is preferably 80 or less, more preferably 50 or less, and particularly preferably 30 or less. More than 10 π electrons may form a single large delocalization system or may form two or more delocalization systems. In particular, a compound having three or more aromatic rings in one molecule is preferred. The aromatic rings may be aromatic hydrocarbon rings or aromatic heterocyclic rings including heteroatoms, or may be fused together to form a single aromatic ring. Examples of the aromatic rings include a benzene ring, a naphthalene ring, an anthracene ring, a pyridine ring, a pyrimidine ring, a pyrazine ring, and a triazine ring.

The compound represented by general formula (II) is preferably water-soluble and is preferably a compound that dissolves in an amount of at least 1 g or more in 100 g of water at 20° C. The compound is more preferably a compound that dissolves in an amount of 5 g or more, and most preferably a compound that dissolves in an amount of 10 g or more.

In general formula (II), $R_{21}$ to $R_{28}$ each independently represent a hydrogen atom or a substituent. Examples of the substituent include halogen atoms, substituted or unsubstituted alkyl groups, substituted or unsubstituted alkenyl groups, substituted or unsubstituted alkynyl groups, substituted or unsubstituted aryl groups, substituted or unsubstituted heterocyclic groups, a cyano group, a hydroxy group, a nitro group, substituted or unsubstituted alkyloxy groups, substituted or unsubstituted aryloxy groups, substituted or unsubstituted heterocyclic oxy groups, substituted or unsubstituted alkylcarbonyl groups, substituted or unsubstituted alkylcarbonyloxy groups, substituted or unsubstituted alkyloxycarbonyl groups, substituted or unsubstituted arylcarbonyl groups, substituted or unsubstituted arylcarbonyloxy groups, substituted or unsubstituted aryloxycarbonyl groups, substituted or unsubstituted carbamoyl groups, substituted or unsubstituted carbamoyloxy groups, substituted or unsubstituted amino groups, substituted or unsubstituted mercapto groups, substituted or unsubstituted alkylthio groups, substituted or unsubstituted arylthio groups, substituted or unsubstituted heterocyclic thio groups, substituted or unsubstituted sulfamoyl groups, substituted or unsubstituted alkylsulfinyl groups, substituted or unsubstituted arylsulfinyl groups, substituted or unsubstituted alkylsulfonyl groups, substituted or unsubstituted arylsulfonyl groups, substituted or unsubstituted phosphino groups, substituted or unsubstituted phosphinyl groups, substituted or unsubstituted silyl groups, substituted or unsubstituted silyloxy groups, and ionic hydrophilic groups. When these substituents can further have at least one substituent, groups having, as the additional substituent, a substituent selected from the group consisting of the aforementioned substituents are also included in the examples of the substituent.

$R_{21}$ to $R_{28}$ preferably each independently represent a hydrogen atom or a substituted or unsubstituted alkyl group. The alkyl group is preferably an alkyl group having 1 to 12 carbon atoms, more preferably an alkyl group having 1 to 8 carbon atoms, and most preferably an alkyl group having 1 to 6 carbon atoms. The alkyl group preferably has, as a substituent, a hydrophilic group described later from the viewpoint of preservation stability of the dye ink composition.

$R_{21}$ and $R_{22}$, $R_{23}$ and $R_{24}$, $R_{25}$ and $R_{26}$, and $R_{27}$ and $R_{28}$ may each be linked to each other to form a ring. The ring is not particularly limited, may be an aromatic ring or a non-aromatic ring, and is preferably a five-membered ring or a six-membered ring. The ring may include a heteroatom (such as an oxygen atom, a nitrogen atom, or a sulfur atom) besides the nitrogen atoms to which $R_{21}$ to $R_{28}$ are linked.

$R_{29}$ represents a substituent, and examples of the substituent are the same as those that have been described as the substituent when $R_{21}$ to $R_{28}$ each represent a substituent.

$R_{29}$ preferably represents an ionic hydrophilic group or a substituted or unsubstituted alkyl group. The alkyl group is preferably an alkyl group having 1 to 12 carbon atoms, more preferably an alkyl group having 1 to 8 carbon atoms, and most preferably an alkyl group having 1 to 6 carbon atoms.

In a case where a plurality of $R_{29}$'s are present, the plurality of $R_{29}$'s may be the same or different. In a case where a plurality of $R_{29}$'s are present, the plurality of $R_{29}$'s may be linked to form a ring. The ring is not particularly limited, may be an aromatic ring or a non-aromatic ring, and is preferably a five-membered ring or a six-membered ring. The ring may include a heteroatom (such as an oxygen atom, a nitrogen atom, or a sulfur atom).

At least any one of $R_{21}$ to $R_{29}$ has a hydrophilic group. In the case of a compound having three or more aromatic rings in one molecule, the compound particularly preferably has at least two hydrophilic groups linked to the aromatic rings in the molecule.

The hydrophilic groups can be easily selected as substituents from the I/O calculated value of {O: organic value} and {I: inorganic value} outlined in Shin Yuuki Gainen Zu-Kiso to Ouyo- (New edition of Organic conceptual diagram—Fundamentals and applications-) (SANKYO SHUPPAN Co., Ltd.), the log P value (usually, the partition coefficient P of molecules in the 1-octanol/water system), which is widely used as the value of the hydrophobic parameter of compounds in the fields of chemistry/medical and pharmaceutical science, or the calculated value thereof, i.e., the C log P value, and the acid dissociation constant (pKa value) of a functional group. The hydrophilic groups are also preferably "strongly hydrophilic groups" and "groups that are not very strongly hydrophilic" in the description of "hydrophilic groups" of Kagaku Daijiten (Encyclopedic dictionary of chemistry), Fourth edition, (KYORITSU SHUPPAN Co., Ltd.). Since the dye ink composition (ink jet ink) according to the present invention is preferably used in a basic form, a hydrophilic group that has a high acid dissociation constant (pKa value) and that is not very strongly hydrophilic is also applicable. Specifically, such a group may be $-NH_2$, $-OH$, or $-CO_2H$ (or an alkali metal salt of a carboxy group).

Examples of more preferred hydrophilic groups include, but are not limited to, a hydroxy group, alkylcarbonylamino groups, arylcarbonylamino groups, alkylsulfonylamino groups, arylsulfonylamino groups, and quaternary ammonium groups, in addition to ionic hydrophilic groups. The hydrophilic group is preferably an ionic hydrophilic group, more preferably a sulfo group ($-SO_3M$) or a carboxy group ($-CO_2M$), and most preferably a sulfo group ($-SO_3M$).

The ionic hydrophilic group is the same as the ionic hydrophilic group present in $Z_1$ in general formula (I-1) described above.

M represents a hydrogen atom or a counter cation. The M is the same as M in $-SO_3M$ or $-CO_2M$ serving as an ionic hydrophilic group present in $Z_1$ in general formula (I-1) described above.

The compound represented by general formula (II) preferably has 1 to 10 hydrophilic groups and more preferably has 2 to 8 hydrophilic groups in one molecule.

The compound represented by general formula (II) preferably has 2 to 6 ionic hydrophilic groups and more preferably has 2 to 4 ionic hydrophilic groups in one molecule.

At least any one of $R_{21}$ to $R_{29}$ in general formula (II) preferably has an ionic hydrophilic group and more preferably has $-SO_3M$. Still more preferably, 2 to 6 of $R_{21}$ to $R_{29}$ have $-SO_3M$, and particularly preferably, 2 to 4 of $R_{21}$ to $R_{29}$ have $-SO_3M$.

In general formula (II), $Ar_{20}$ represents a benzene ring or a naphthalene ring and preferably represents a benzene ring.

If $Ar_{20}$ represents a benzene ring, k represents an integer of 0 to 4 and is preferably an integer of 0 to 2, and more preferably 0 or 1.

If $Ar_{20}$ represents a naphthalene ring, k represents an integer of 0 to 6 and is preferably an integer of 0 to 4, more preferably an integer of 0 to 2, and still more preferably 0 or 1.

Specific examples of the compound represented by general formula (II) are described below, but are not limited thereto. Although a counter cation (M) of an ionic hydrophilic group (for example, $-SO_3M$ or $-CO_2M$) is described in the form of a salt, the counter cation is not limited to a single salt but may be in the form of a partial free acid (for example, M=Li ion and hydrogen atom, or Na ion and hydrogen atom) and a mixed salt (for example, M=salts of Li ion and Na ion, or salts of Na ion and $NH_4$ ion).

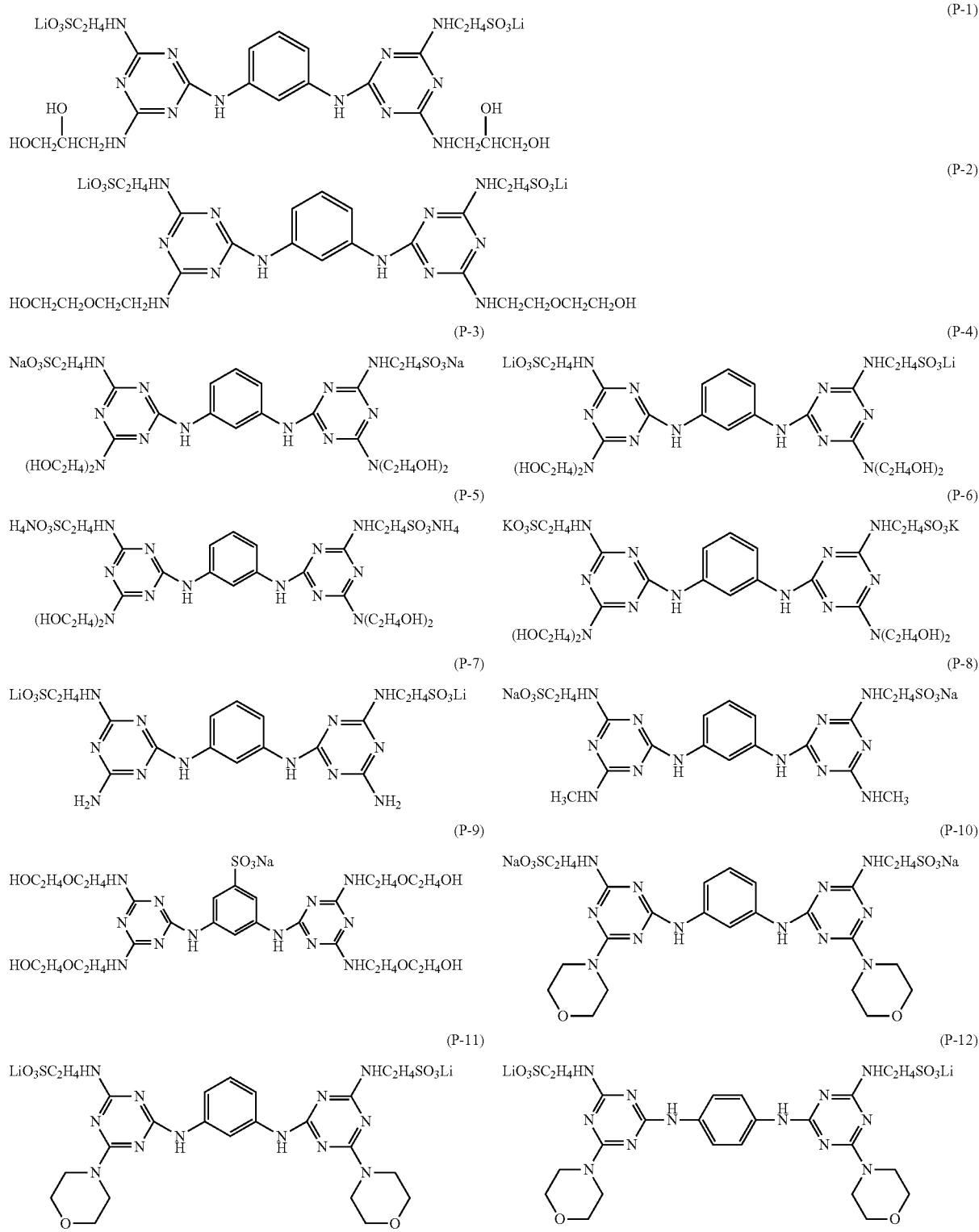

-continued
(P-13)
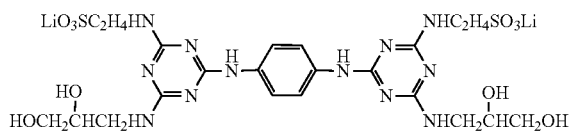
(P-14)
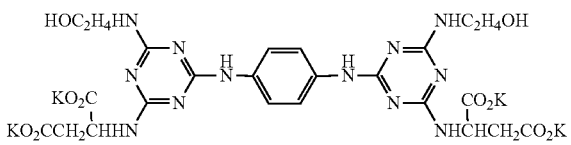
(P-15)
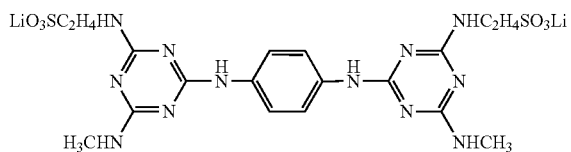
(P-16)
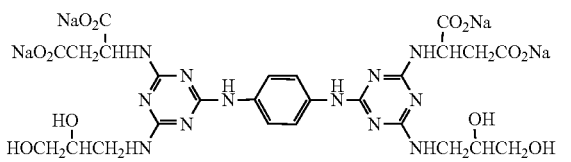
(P-17)
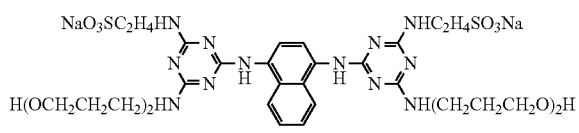
(P-18)
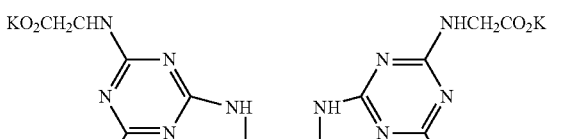
(P-19)
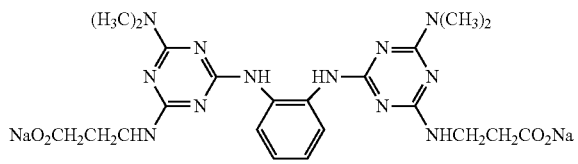
(P-20)
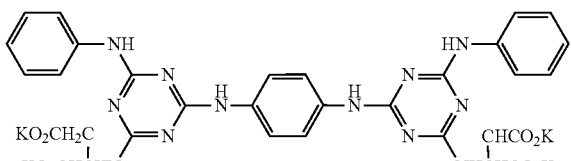
(P-21)
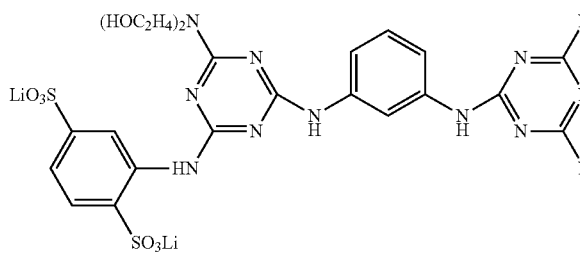
(P-22)
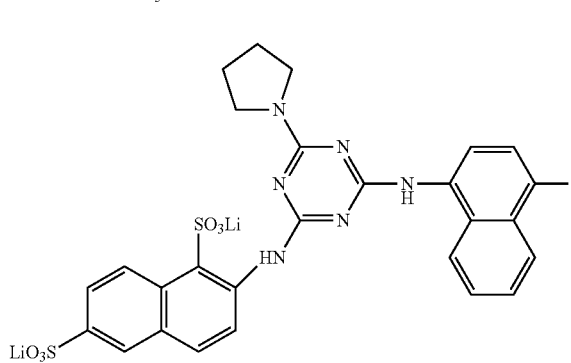
(P-23)
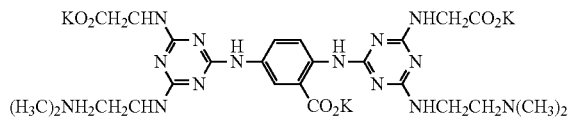
(P-24)
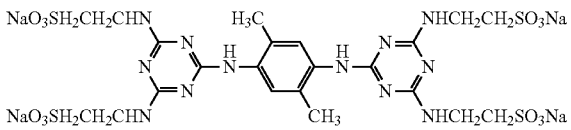

(P-25)
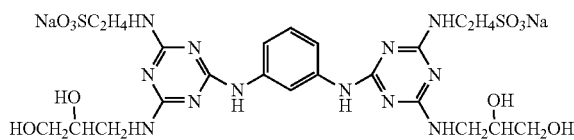

(P-26)
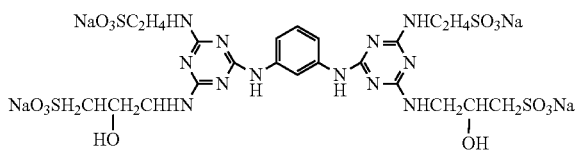

The content of the compound represented by general formula (II) in the dye ink composition according to the present invention is preferably 0.1% to 10.0% by mass, more preferably 0.3% to 5.0% by mass, still more preferably 0.5% to 4.0% by mass, particularly preferably 0.5% to 3.5% by mass, even still more preferably 0.5% to 3.0% by mass, and most preferably 0.5% to 2.5% by mass with respect to the total mass of the dye ink composition. When the content of the compound represented by general formula (II) is within the range described above, while continuous ejection reliability of the dye ink composition is ensured, the intermolecular interaction between the compound A to the compound E and the compound represented by general formula (II) that coexist in the dye ink composition is enhanced after the formation of a printed article to thereby reduce association between phthalocyanine dye molecules, and thus the printing density (in particular, printing density on plain paper) is dramatically improved, and furthermore, the image durability (in particular, ozone resistance and light resistance) can also be satisfied.

The compound represented by general formula (II) can be synthesized by a publicly known method (for example, a method described in JP4686151B).

Chelating Agent

The dye ink composition according to the present invention may include a chelating agent.

The chelating agent (also referred to as a "chelator") is a compound that binds to an inorganic or metal cation (particularly preferably, a polyvalent cation) to produce a chelate compound.

In the present invention, the chelating agent has a function of preventing the formation and growth (that is, functions as a solubilizing agent) of insoluble, precipitated foreign matter in the dye ink composition, the foreign matter being derived from an inorganic or metal cation (in particular, a polyvalent cation).

When the dye ink composition according to the present invention includes a chelating agent, the generation of precipitated foreign matter can be reduced even in long-term preservation of the dye ink composition. Consequently, when an image is printed with an ink jet printer by using an ink for ink jet recording, the ink including the dye ink composition after long-term preservation, ink clogging in a nozzle or the like is less likely to occur, and a printed article with a high quality can be obtained.

Recently, inks for ink jet recording have been experiencing a change from cartridge inks to large-volume ink-tank models, and further improvements have been required for storage stability in long-term preservation (printing density and continuous ejection stability of inks after long-term preservation). When the dye ink composition according to the present invention includes a chelating agent, the storage stability in long-term preservation can be further improved.

The chelating agent may be any solubilizing agent that forms a complex with a cation present in the dye ink composition by a chelating action to exhibit the effect of reducing the generation and growth of precipitated foreign matter in the dye ink composition, and various types of such chelating agents can be used alone or in combination of two or more thereof. The chelating agent is preferably a water-soluble compound.

Examples of the chelating agent include ethylenediaminetetraacetic acid (EDTA) and salts thereof (e.g., EDTA-4 sodium (tetrasodium salt) and EDTA-4 lithium (tetralithium salt)), picolinic acid and salts thereof (e.g., picolinic acid sodium salt), quinolinic acid and salts thereof (e.g., quinolinic acid sodium salt), 1,10-phenanthroline, 8-hydroxyquinoline, 3-hydroxy-2,2'-iminodisuccinic acid tetrasodium salt, methylglycinediacetic acid (MGDA) and salts thereof, L-glutamic acid diacetic acid (GLDA) and salts thereof, L-aspartic acid diacetic acid (ASDA) and salts thereof, hydroxyethyliminodiacetic acid (HIDA) and salts thereof, 3-hydroxy-2,2'-iminodisuccinic acid (HIDS) and salts thereof, dicarboxymethyl glutamic acid (CMGA) and salts thereof, and (S,S)-ethylenediaminedisuccinic acid (EDDS) and salts thereof. The salts among the above chelating agents are preferably, for example, salts of ammonium, amine, or the like besides salts of a monovalent metal such as sodium, potassium, or lithium. Among the above chelating agents, these exhibit a chelating action that is less likely to decrease with respect to a change in the pH of the dye ink composition. Therefore, the chelating action is exhibited in a wider pH range, and for example, it is possible to further improve the response of the chelating action to a change in the pH of the dye ink composition, such as a change with time.

The content of the chelating agent is preferably 0.001% by mass or more and 1.1% by mass or less, more preferably 0.001% by mass or more and 0.5% by mass or less, still more preferably 0.001% by mass or more and 0.3% by mass or less, and particularly preferably 0.001% by mass or more and 0.1% by mass or less based on the total mass of the dye ink composition. If the content is 0.001% by mass or more, the chelating action can be effectively exhibited. If the content is 1.1% by mass or less, it is possible to suppress an excessive increase in the viscosity of the dye ink composition and an excessive increase in the pH thereof due to the addition of the chelating agent.

A ratio of the chelating agent to the coloring agent (content of chelating agent based on mass:content of coloring agent based on mass) in the dye ink composition is preferably in the range of 0.0001:1 to 0.15:1 (chelating agent/coloring agent is preferably from 0.0001 to 0.15). The ratio is more preferably in the range of 0.0001:1 to 0.01:1, and still more preferably in the range of 0.0002:1 to 0.005:1.

A metal that is likely to form a metal salt is a metal that can be mixed during the manufacturing process of a dye or a metal that can be included in an ink container of a dye ink composition and eluted into the dye ink composition. The ratio described above is preferred because the generation of foreign matter that causes clogging of an ink jet head can be effectively suppressed. In addition, the ratio described above is preferred because the chelating action can be effectively exhibited, and an excessive increase in the viscosity of the dye ink composition and an excessive increase in the pH thereof can be suppressed.

An example of the use of the dye ink composition according to the present invention is an image recording material for forming an image. Specific examples thereof include, besides a recording material for an ink jet process described in detail below, a thermal recording material, a pressure-sensitive recording material, a recording material for an electrophotographic process, a transfer-type silver halide photosensitive material, a printing ink, and a recording pen. The use of the dye ink composition is preferably a recording material for an ink jet process, a thermal recording material, or a recording material for an electrophotographic process, and more preferably a recording material for an ink jet process.

The dye ink composition according to the present invention is applicable to a color filter for recording and reproducing a color image used in a solid-state imaging element such as a charge-coupled device (CCD) or a display such as a liquid crystal display (LCD) or a plasma display panel (PDP), or a dyeing solution for dyeing various fibers.

The dye ink composition according to the present invention can be used in such a manner that physical properties, such as solubility, dispersibility, and thermal mobility, suitable for the use thereof are adjusted by the substituents.

The dye ink composition according to the present invention is particularly suitable for a dye ink for ink jet recording.

A dye ink for ink jet recording according to the present invention has the dye ink composition according to the present invention.

The dye ink composition according to the present invention can be produced by using, as a medium, water, further using a lipophilic medium or an aqueous medium, as needed, and dissolving and/or dispersing a coloring agent, a toning agent, and an additive in the media.

Examples of the water include pure water such as deionized water, ion-exchange water, ultrafiltered water, reverse osmosis water, and distilled water; and ultrapure water.

The dye ink composition according to the present invention can include the following organic solvents in addition to water. Examples of organic solvents include alcohols (e.g., methanol, ethanol, propanol, isopropanol, butanol, isobutanol, sec-butanol, t-butanol, pentanol, hexanol, cyclohexanol, and benzyl alcohol); polyhydric alcohols (e.g., ethylene glycol, diethylene glycol, triethylene glycol, polyethylene glycol, propylene glycol, dipropylene glycol, polypropylene glycol, butylene glycol, hexanediol, pentanediol, glycerin, hexanetriol, and thiodiglycol); glycol derivatives (e.g., ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monoethyl ether, triethylene glycol monobutyl ether, and ethylene glycol monophenyl ether); amines (e.g., ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine, and tetramethylpropylenediamine); and other polar solvents (e.g., formamide, N,N-dimethylformamide, N,N-dimethylacetamide, dimethyl sulfoxide, sulfolane, 2-pyrrolidone, N-methyl-2-pyrrolidone, N-vinyl-2-pyrrolidone, 2-oxazolidone, ethylene urea, 1,3-dimethyl-2-imidazolidinone, acetonitrile, and acetone). Two or more organic solvents may be used in combination.

When the dye ink composition according to the present invention includes an organic solvent, the content of the organic solvent is preferably 10% to 55% by mass, more preferably 20% to 50% by mass, and still more preferably 30% to 45% by mass based on the total mass of the dye ink composition.

In the dye ink composition according to the present invention, the water content is preferably 40% to 80% by mass, more preferably 45% to 70% by mass, and still more preferably 50% to 60% by mass based on the total mass of the dye ink composition from the viewpoints of continuous ejection stability and storage stability of the ink.

The dye ink composition according to the present invention can optionally include other additives as long as the effects of the present invention are not impaired.

Examples of the other additives include publicly known additives (described in JP2003-306623A) such as anti-drying agents (humectants), anti-fading agents, emulsion stabilizers, penetration enhancing agents, ultraviolet absorbers, preservatives, fungicides, pH adjusting agents, surface tension adjusting agents, anti-foaming agents, viscosity modifiers, dispersing agents, dispersion stabilizers, anticorrosives, and betaines. These additives can be added directly to the dye ink composition. The preservatives that can be used may be the same as preservatives included in an aqueous dye solution according to the present invention described later.

Examples of the surface tension adjusting agents include nonionic, cationic, and anionic surfactants. Preferred examples of the surfactants include anionic surfactants such as fatty acid salts, alkyl sulfate ester salts, alkyl benzene sulfonates, alkyl naphthalene sulfonates, dialkyl sulfosuccinates, alkyl phosphate ester salts, naphthalene sulfonic acid formalin condensates, and polyoxyethylene alkyl sulfate ester salts; and nonionic surfactants such as polyoxyethylene alkyl ethers, polyoxyethylene alkyl allyl ethers, polyoxyethylene fatty acid esters, sorbitan fatty acid esters, polyoxyethylene sorbitan fatty acid esters, polyoxyethylene alkyl amines, glycerin fatty acid esters, and oxyethylene oxypropylene block copolymers. SURFYNOL (registered trademark) series, which are acetylene-based polyoxyethylene oxide surfactants manufactured by Nissin Chemical Industry Co., Ltd., are also preferably used. In addition, for example, an amine oxide amphoteric surfactant such as N,N-dimethyl-N-alkylamine oxide is also preferable. Furthermore, the agents described as surfactants on pages (37) to (38) of JP1984-157636A (JP-S59-157636A) and the research disclosure No. 308119 (1989) can also be used.

Physical Properties of Dye Ink Composition

The surface tension of the dye ink composition according to the present invention is preferably 10 mN/m or more and 60 mN/m or less, more preferably 20 mN/m or more and 60 mN/m or less, and still more preferably 30 mN/m or more and 40 mN/m or less, at 25° C.

When the dye ink composition according to the present invention has a surface tension within the range described above, it is possible to effectively suppress the occurrence of, for example, misdirected ejection (deviation of a landing point of an ink) due to wetting near ejection ports caused when the dye ink composition is used in an ink jet process. The surface tension of the ink can be adjusted by appropriately determining the contents of the surfactant and the like in the dye ink composition. The pH of the dye ink composition according to the present invention is preferably adjusted to a desired value so as to achieve good ejection properties when the dye ink composition is used in an ink jet recording apparatus. The dye ink composition according to the present invention preferably has a viscosity of 1.0 mPa·s or more and 5.0 mPa·s or less, at 25° C.

Ink Jet Recording Method

An ink jet recording method according to the present invention has a step of ejecting a dye ink for ink jet recording according to the present invention with a recording head for an ink jet process. More specifically, the ink jet recording method according to the present invention is a recording method in which energy is provided to the dye ink for ink jet recording according to the present invention to form an image on a publicly known image-receiving material, that is, plain paper, resin coat paper, ink jet paper described in, for example, JP1996-169172A (JP-H08-169172A), JP1996-27693A (JP-H08-27693A), JP1990-276670A (JP-H02-276670A), JP1995-276789A (JP-H07-276789A), JP1997-323475A (JP-H09-323475A), JP1987-238783A (JP-S62-238783A), JP1998-153989A (JP-H10-153989A), JP1998-217473A (JP-H10-217473A), JP1998-235995A (JP-H10-235995A), JP1998-337947A (JP-H10-337947A), and JP1998-217597A (JP-H10-217597A), a film, paper for common use in electrophotography, a textile, glass, metal, ceramic, or the like.

In the formation of an image, a polymer latex compound may be added for the purpose of providing glossiness and water resistance and improving weather resistance.

The recording process of the ink jet recording method according to the present invention is not limited, and any publicly known process is employed. Examples thereof include a charge control process of utilizing an electrostatic attraction force to eject an ink; a drop-on-demand process (pressure pulse process) using vibration pressure of a piezo element; an acoustic ink jet process including converting electric signals into acoustic beams and applying the acoustic beams to an ink to eject the ink by utilizing the radiation pressure; and a thermal ink jet process including heating an ink to form bubbles and utilizing the generated pressure. The ink jet recording process includes a process including ejecting a plurality of droplets of a low-concentration ink called a photo ink with a small volume, a process in which the image quality is improved by using a plurality of inks having substantially the same hue but different densities, and a process of using a colorless, transparent ink.

In the ink jet recording method according to the present invention, an image can be recorded on a recording medium by ejecting a dye ink for ink jet recording, the dye ink including the above-described dye ink composition according to the present invention, with a recording head for an ink jet process. In addition to the above-described dye ink composition (preferably, a cyan dye ink composition) according to the present invention, a magenta ink composition, a yellow ink composition, and a black ink composition can be used as an ink set.

Since the dye ink composition and the dye ink for ink jet recording according to the present invention have good storage stability, they are applicable to ink jet printers mounting large-volume ink-tanks.

Aqueous Dye Solution

An aqueous dye solution according to the present invention is an aqueous dye solution including a preservative, the aqueous dye solution including a compound A represented by general formula (I-1) below; a compound B represented by general formula (I-2) below; at least one of a compound C-I represented by general formula (I-3-1) below or a compound C-II represented by general formula (I-3-2) below; and a compound D represented by general formula (I-4) below, wherein when a mass of the compound A is represented by $W_1$, a mass of the compound B is represented by $W_2$, a sum of a mass of the compound C-I and a mass of the compound C-II is represented by $W_3$, a mass of the compound D is represented by $W_4$, and a total sum of $W_1$, $W_2$, $W_3$, and $W_4$ is represented by $W_{A1}$ a ratio of $W_{A1}$ to a total mass of the aqueous dye solution is 8% to 15% by mass.

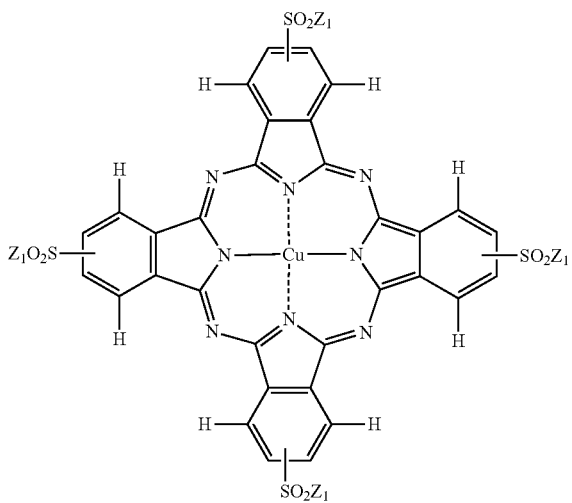

(I-1)

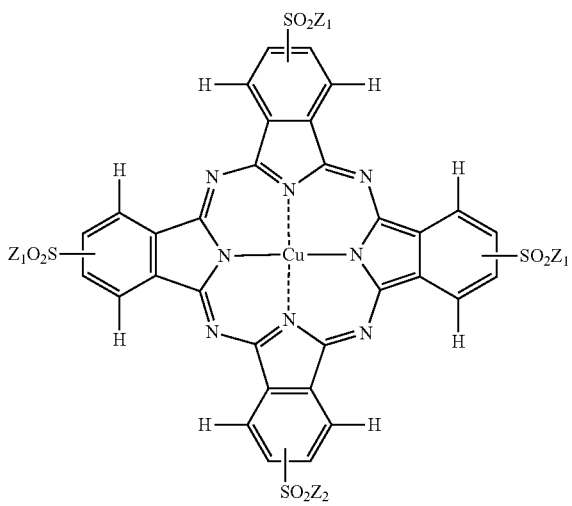

(I-2)

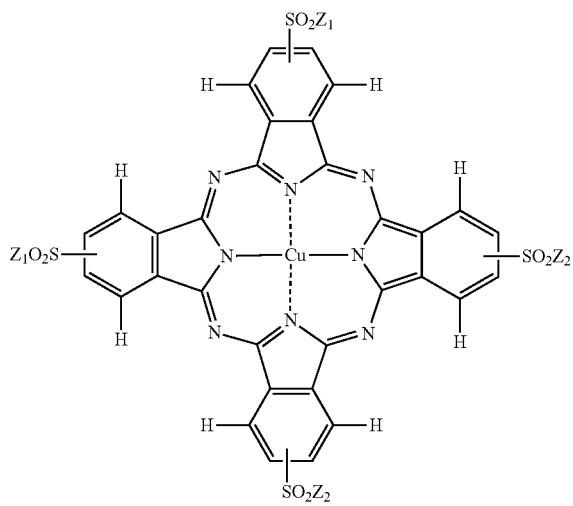

(I-3-1)

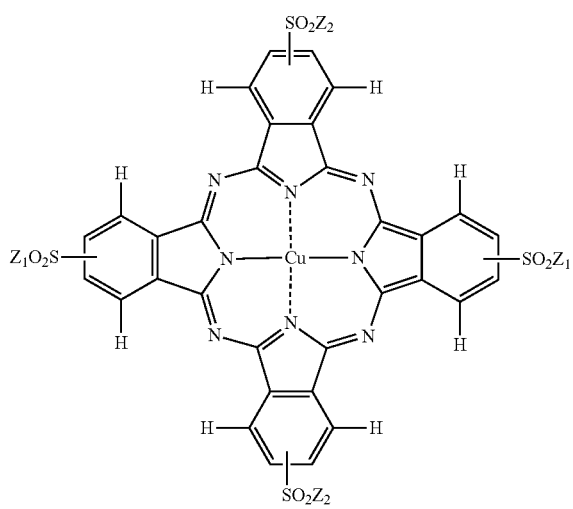

(I-3-2)

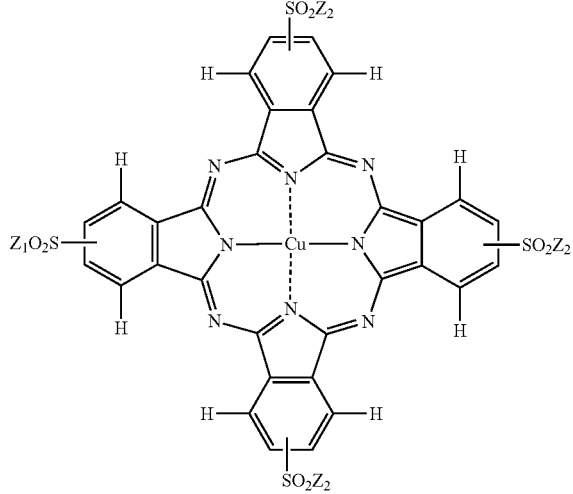

(I-4)

In general formulae (I-1), (I-2), (I-3-1), (I-3-2), and (I-4), each $Z_1$ represents an alkyl group, aryl group, or heterocyclic group having a substituent that includes at least one ionic hydrophilic group. The plurality of $Z_1$'s in general formulae (I-1), (I-2), (I-3-1), and (I-3-2) may be the same or different.

In general formulae (I-2), (I-3-1), (I-3-2), and (I-4), each $Z_2$ represents a substituted or unsubstituted alkyl group, a substituted or unsubstituted aryl group, or a substituted or unsubstituted heterocyclic group, provided that each $Z_2$ does not have an ionic hydrophilic group. The plurality of $Z_2$'s in general formulae (I-3-1), (I-3-2), and (I-4) may be the same or different.

The aqueous dye solution according to the present invention is preferably the aqueous dye solution further including a compound E represented by general formula (I-5) below, wherein when a mass of the compound E is represented by $W_5$ and a total sum of $W_1$, $W_2$, $W_3$, $W_4$, and $W_5$ is represented by $W_{A2}$, a ratio of $W_{A2}$ to the total mass of the aqueous dye solution is 8% to 15% by mass.

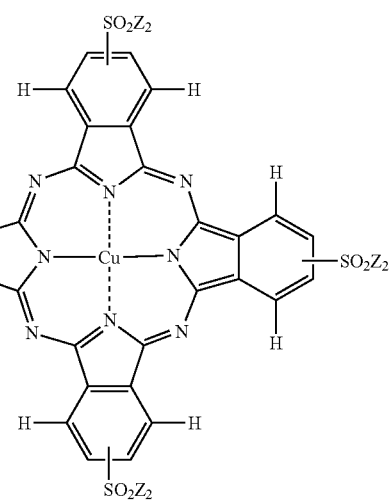

(I-5)

In general formula (I-5), each $Z_2$ is as defined in general formulae (I-2), (I-3-1), (I-3-2), and (I-4). The plurality of $Z_2$'s may be the same or different.

The compound A to the compound E in the aqueous dye solution according to the present invention are the same as those in the foregoing dye ink composition according to the present invention.

In the aqueous dye solution according to the present invention, the ratio of $W_{A1}$ to the total mass of the aqueous dye solution ($\{(W_{A1}/\text{total mass of aqueous dye solution})\times 100\}$) or the ratio of $W_{A2}$ to the total mass of the aqueous dye solution ($\{(W_{A2}/\text{total mass of aqueous dye solution})\times 100\}$) is 8% to 15% by mass, preferably 10% to 15% by mass, and more preferably 10% to 12% by mass. Since the aqueous dye solution according to the present invention includes the compound A to the compound D or the compound A to the compound E in a high concentration, the dye ink composition according to the present invention can be easily prepared by diluting the aqueous dye solution according to the present invention with a solvent (water and at least one of the aforementioned organic solvents).

Preservative

Next, the preservative will be described.

In the present invention, the preservative refers to an agent having a function of preventing microorganisms, in particular, bacteria and fungi (mold) from generating and growing.

The use of the preservative in the aqueous dye solution according to the present invention enables generation of mold to be reduced even when the aqueous dye solution is preserved for a long period of time. Consequently, when an image is printed with an ink jet printer by using an ink for ink jet recording, the ink including the aqueous dye solution after long-term preservation, ink clogging in a nozzle or the like is less likely to occur, and a printed article with a high quality can be obtained.

Various preservatives can be used as the preservative in the present invention.

Example of the preservative include inorganic preservative including heavy-metal ions and organic preservatives. Examples of the organic preservatives that can be used include quaternary ammonium salts (such as tetrabutylammonium chloride, cetylpyridinium chloride, and benzyltrimethylammonium chloride), phenols (such as phenol, cresol, butylphenol, xylenol, and bisphenol), phenoxy ether derivatives (such as phenoxyethanol), heterocyclic compounds (such as benzotriazole, 1,2-benzisothiazolin-3-one, sodium dehydroacetate, and PROXEL (registered trademark) series manufactured by LONZA), alkane diols (such as pentylene glycol (1,2-pentanediol), isopentyldiol (3-methyl-1,3-butanediol), hexanediol (1,2-hexanediol), and caprylyl glycol (1,2-octanediol)), acid amides, carbamic acid, carbamates, amidines/guanidines, pyridines (such as sodium pyridinethione-1-oxide), diazines, triazines, pyrroles/imidazoles, oxazoles/oxazines, thiazoles/thiadiazines, thioureas, thiosemicarbazides, dithiocarbamates, sulfides, sulfoxides, sulfones, sulfamides, antibiotic substances (such as penicillin and tetracycline), aromatic carboxylic acids and salts thereof (such as sodium benzoate), and aromatic carboxylic acid esters and salts thereof (such as p-hydroxybenzoic acid ethyl ester).

The preservative is preferably at least one selected from the group consisting of heterocyclic compounds, phenols, phenoxy ether derivatives, and alkane diols, and more preferably a heterocyclic compound.

Preservatives described in, for example, Bokin Bobai Handbook (Antibacterial and antifungal handbook) (GIHODO SHUPPAN Co., Ltd.: 1986) and Bokin-bobai-zai Jiten (Encyclopedia of antibacterial and antifungal agents) (edited by encyclopedia editorial committee of The Society for Antibacterial and Antifungal Agents, Japan) can also be used as the preservatives.

Various compounds having, for example, an oil-soluble structure or a water-soluble structure can be used as these compounds; however, these compounds are preferably water-soluble compounds.

The aqueous dye solution according to the present invention may include two or more preservatives.

The heterocyclic compound is preferably a thiazole compound or a benzotriazole compound.

Thiazole compounds particularly function as fungicides among preservatives.

Examples of thiazole compounds include benzisothiazoline, isothiazoline, 1,2-benzisothiazolin-3-one, 5-chloro-2-methyl-4-isothiazolin-3-one, 2-(thiocyanomethylthio)benzothiazole, 2-mercaptobenzothiazole, and 3-allyloxy-1,2-benzisothiazole-1,1-oxide. PROXEL (registered trademark) series (such as BDN, BD20, GXL, LV, XL2, XL2(s), and Ultra 10) manufactured by LONZA can also be used as the thiazole fungicides.

Benzotriazole compounds particularly function as anti-corrosives among preservatives and can prevent, for example, formation of rust, one cause of which is contact of a metal material (in particular, 42 alloy (nickel-iron alloy containing 42% nickel)) constituting an ink jet head with an ink. Examples of benzotriazole compounds include 1H-benzotriazole, 4-methyl-1H-benzotriazole, 5-methyl-1H-benzotriazole, sodium salts thereof, and potassium salts thereof.

The preservative in the aqueous dye solution according to the present invention can be used in a wide content range. The content of the preservative is preferably 0.001% to 10% by mass, more preferably 0.005% to 2.0% by mass, still more preferably 0.01% to 0.5% by mass, and particularly preferably 0.01% to 0.1% by mass based on the total amount of the aqueous dye solution. When the content of the preservative is 0.001% to 10% by mass, the effect of the preservative can be more efficiently obtained, and generation of a precipitate can be reduced.

The aqueous dye solution according to the present invention may further include a chelating agent. The chelating agent that can be used is the same as that described as the chelating agent that may be included in the above-described dye ink composition according to the present invention.

The aqueous dye solution according to the present invention preferably further includes the above-described compound represented by general formula (II). The compound represented by general formula (II) is the same as that in the above-described dye ink composition according to the present invention.

EXAMPLES

Hereafter, the present invention will be described in detail with reference to Synthesis Examples and Examples; however, the present invention is not limited to these Examples.

The compound A, the compound B, the compound C-I, the compound C-II, the compound D, and the compound E in the present invention can be synthesized, isolated, and purified by employing publicly known methods (for example, methods described in Detailed Description and Examples of JP3949385B, JP4145153B, JP4190187B, JP4512543B, JP4625644B, and JP4854250B) alone or in combination of two or more, and further applying a reverse osmosis membrane purification method and a gel filtration chromatography purification method, as needed.

In Synthesis Examples 1 to 3, λmax is a maximal absorption wavelength, and ε value means a molar absorption coefficient at the maximal absorption wavelength. The above physical property values of dye solutions were measured by using, as an instrumental analyzer, a UV-Vis spectrophotometer (UV-3100PC) manufactured by Shimadzu Corporation.

A synthesis example of A-1, which is a specific example of the compound A, will be described below.

Synthesis Example 1

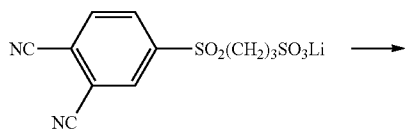

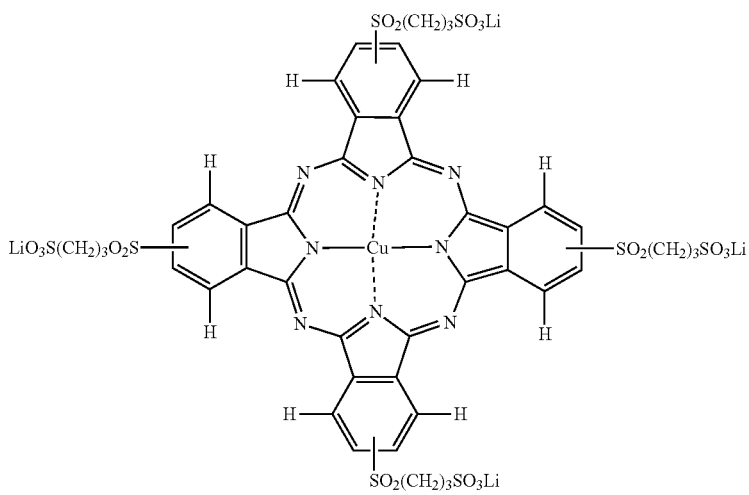

To a liquid mixture of 0.7 mL of acetic acid, 12 mL of triethyl orthoacetate, and 60 mL of diethylene glycol, 14.3 g of a phthalocyanine dye intermediate (phthalonitrile derivative) synthesized by the method described in Examples of JP4625644B was suspended, 0.6 g of copper(II) chloride was then added, the internal temperature was then increased to 100° C. and stirring was performed at the same temperature for three hours, the internal temperature was then decreased to 20° C. by cooling, and a precipitated crude product was filtered, washed with 200 mL of isopropanol, and dried at 70° C. for 12 hours. The dried crude crystals were dissolved in 100 mL of ion-exchange water, and 1.0 mol/L-LiOH aq. was then added at 25° C. until the pH of the resulting aqueous crude dye solution reached 7.0. Subsequently, the aqueous solution was filtered at the same temperature to remove dust. The resulting aqueous solution of a crude component 1 was purified by gel permeation chromatography (SEPHADEX™ LH-20 support, swollen with ion-exchange water: manufactured by Pharmacia) to obtain a specific example (A-1) of the compound A. According to the measurement results of a visible spectrum of the obtained A-1 in an aqueous solution, λmax=629 nm (ε value≈70500). According to the measurement results of a visible absorption spectrum of A-1 in an H$_2$O/DMF≈2/98 (wt %/wt %) solution, λmax=677.0 nm and ε value=181,550. DMF represents N,N-dimethylformamide.

A synthesis example of E-1, which is a specific example of the compound E, will be described below.

Synthesis Example 2

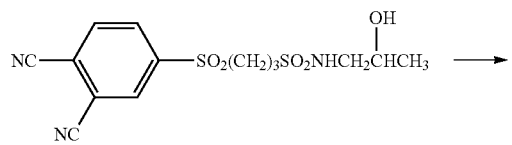

-continued

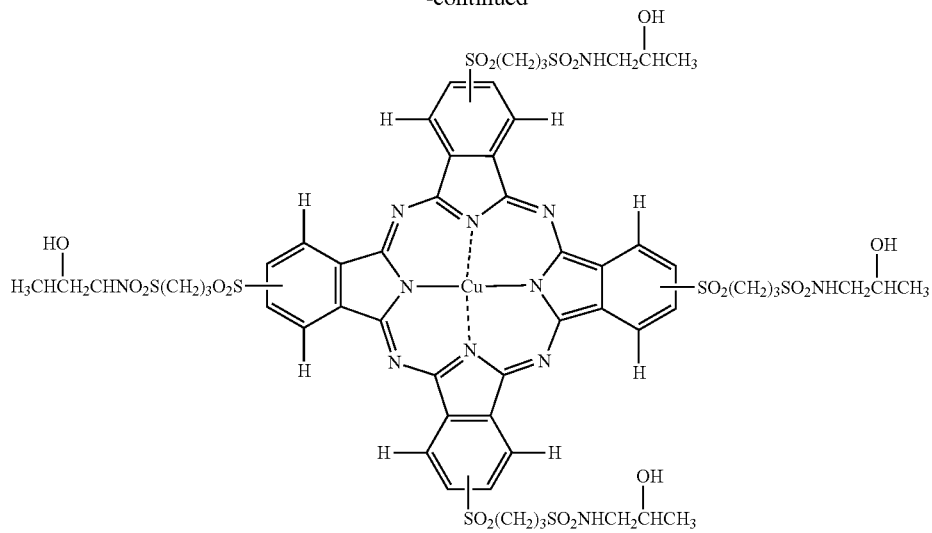

To a liquid mixture of 0.7 mL of acetic acid, 12 mL of triethyl orthoacetate, and 60 mL of diethylene glycol, 16.6 g of a phthalocyanine dye intermediate (phthalonitrile derivative) synthesized by the method described in Examples of JP4625644B was suspended, 0.6 g of copper(II) chloride was then added, the internal temperature was then increased to 100° C. and stirring was performed at the same temperature for three hours, the internal temperature was then decreased to 20° C. by cooling, and a precipitated crude product was filtered, washed with 200 mL of isopropanol, and dried at 70° C. for 12 hours. The dried crude crystals were dissolved in 100 mL of ion-exchange water, and 1.0 mol/L-LiOH aq. was then added at 25° C. until the pH of the resulting aqueous crude dye solution reached 7.0. Subsequently, the aqueous solution was filtered at the same temperature to remove dust. The resulting aqueous solution of a crude component 2 was purified by gel permeation chromatography (SEPHADEX™ LH-20 support, swollen with methanol: manufactured by Pharmacia) to obtain a specific example (E-1) of the compound E. According to the measurement results of a visible absorption spectrum of the obtained E-1 in an $H_2O$/DMF 2/98 (wt %/wt %) solution, λmax=676.0 nm and ε value=173,000. DMF represents N,N-dimethylformamide.

Synthesis Example 3

D-1, which is a specific example of the compound D, was synthesized by combining Synthesis Example 1, Synthesis Example 2, and the aforementioned publicly known documents and was isolated and purified. According to the measurement results of a visible absorption spectrum of the obtained D-1 in an aqueous solution, λmax=607.0 nm and ε value ≈43,000. According to the measurement results of a visible absorption spectrum of D-1 in an $H_2O$/DMF≈2/98 (wt %/wt %) solution, λmax=670.7 nm and ε value=17,100. DMF represents N,N-dimethylformamide.

Example A

Example 1

Preparation of Dye Ink Composition 1

Deionized water was added to a mixture including components below in the corresponding amounts below up to a total weight of 90 g, and the resulting mixture was then stirred for one hour while the temperature was held at 30° C. to 40° C. Subsequently, the pH was adjusted to 9.0 with a 10 mol/L aqueous lithium hydroxide solution, filtration was performed under reduced pressure with a microfilter having an average pore size of 0.25 and the filtration device was then washed with 10 g of deionized water to collect an ink residue. Ten grams of the deionized water used for collecting the ink residue was added to 90 g of the mixture that had been previously filtered to prepare a dye ink composition 1 (100 g).

| | |
|---|---|
| A-1 | 1.63 g |
| B-1 | 2.11 g |
| C-1-1 and C-1-2 | 1.05 g |
| D-1 | 0.24 g |
| E-1 | 0.02 g |
| Preservative | 0.11 g |
| Organic solvent | 26.92 g |
| Surfactant | 1.00 g |

A-1 corresponds to the compound A, B-1 corresponds to the compound B, C-1-1 corresponds to the compound C-I, C-1-2 corresponds to the compound C-II, D-1 corresponds to the compound D, and E-1 corresponds to the compound E.

The above preservative is PROXEL (registered trademark) XL2(s) manufactured by LONZA.

The above surfactant is SURFYNOL (registered trademark) 465 manufactured by Nissin Chemical Industry Co., Ltd.

The above organic solvent is a mixed solvent including compounds below in the corresponding amounts below.

| | |
|---|---|
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |

Examples 2 to 4

Dye ink compositions 2 to 4 (100 g each) were prepared as in Example 1 except that mixtures including components shown in Table 1 below in the corresponding amounts shown in Table 1 below were used. The preservative, the organic solvent, and the surfactant are the same as those in Example 1.

Examples 5 to 10

Dye ink compositions 5 to 10 (100 g each) were prepared as in Example 1 except that mixtures including components shown in Table 1 below in the corresponding amounts shown in Table 1 below were used and a 10 mol/L aqueous sodium hydroxide solution was used instead of the 10 mol/L aqueous lithium hydroxide solution. The preservative, the organic solvent, and the surfactant are the same as those in Example 1.

TABLE 1

| | | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Compound A | Type | A-1 | A-1 | A-1 | A-1 | A-12 | A-12 | A-12 | A-12 | A-12 | A-12 |
| | Amount | 1.63 | 0.31 | 0.31 | 0.31 | 1.63 | 0.31 | 0.31 | 0.15 | 0.19 | 0.38 |
| Compound B | Type | B-1 | B-1 | B-1 | B-1 | B-2 | B-2 | B-2 | B-2 | B-2 | B-2 |
| | Amount | 2.11 | 1.25 | 1.25 | 1.25 | 2.11 | 1.25 | 1.25 | 0.63 | 0.75 | 1.50 |
| Compound C-I | Type | C-1-1 | C-1-1 | C-1-1 | C-1-1 | C-4-1 | C-4-1 | C-4-1 | C-4-1 | C-4-1 | C-4-1 |
| Compound C-II | | C-1-2 | C-1-2 | C-1-2 | C-1-2 | C-4-2 | C-4-2 | C-4-2 | C-4-2 | C-4-2 | C-4-2 |
| | Amount | 1.05 | 1.88 | 1.88 | 1.88 | 1.05 | 1.88 | 1.88 | 0.94 | 1.13 | 2.26 |
| Compound D | Type | D-1 | D-1 | D-1 | D-1 | D-2 | D-2 | D-2 | D-2 | D-2 | D-2 |
| | Amount | 0.24 | 1.25 | 1.25 | 1.25 | 0.24 | 1.25 | 1.25 | 0.63 | 0.75 | 1.50 |
| Compound E | Type | E-1 | E-1 | E-1 | E-1 | E-1 | E-1 | E-1 | E-1 | E-1 | E-1 |
| | Amount | 0.02 | 0.31 | 0.31 | 0.31 | 0.02 | 0.31 | 0.31 | 0.15 | 0.19 | 0.38 |
| Compound represented by general formula (II) | Type | — | — | (P-4) | (P-4) | (P-3) | (P-3) | (P-3) | (P-3) | (P-3) | (P-3) |
| | Amount | 0.00 | 0.00 | 0.50 | 0.50 | 0.50 | 0.50 | 0.50 | 0.50 | 0.50 | 0.50 |
| Chelating agent | Type | — | — | — | EDTA4Li | — | — | EDTA4Na | EDTA4Na | EDTA4Na | EDTA4Na |
| | Amount | 0.00 | 0.00 | 0.00 | 0.05 | 0.00 | 0.00 | 0.05 | 0.05 | 0.05 | 0.05 |
| Preservative | Amount | 0.11 | 0.11 | 0.11 | 0.11 | 0.11 | 0.11 | 0.11 | 0.11 | 0.11 | 0.11 |
| Organic solvent | Amount | 26.92 | 26.92 | 26.92 | 26.92 | 26.92 | 26.92 | 26.92 | 26.92 | 26.92 | 26.92 |
| Surfactant | Amount | 1.00 | 1.00 | 1.00 | 1.00 | 1.00 | 1.00 | 1.00 | 1.00 | 1.00 | 1.00 |

Unit of amount: g

Examples 11 to 26

Dye ink compositions 11 to 26 (100 g each) were prepared as in Example 1 except that mixtures including components shown in Tables 2 to 3 below in the corresponding amounts shown in Tables 2 to 3 below were used. The preservative, the organic solvent, and the surfactant are the same as those in Example 1.

Examples 27 to 30

Dye ink compositions 27 to 30 (100 g each) were prepared as in Example 1 except that mixtures including components shown in Table 3 below in the corresponding amounts shown in Table 3 below were used and a 10 mol/L aqueous sodium hydroxide solution was used instead of the 10 mol/L aqueous lithium hydroxide solution. The preservative, the organic solvent, and the surfactant are the same as those in Example 1.

TABLE 2

| | | Example 11 | Example 12 | Example 13 | Example 14 | Example 15 | Example 16 | Example 17 | Example 18 | Example 19 | Example 20 | Example 21 | Example 22 |
|---|---|---|---|---|---|---|---|---|---|---|---|---|---|
| Compound A | Type | A-16 | A-16 | A-16 | A-1 | A-1 | A-1 | A-1 | A-11 | A-11 | A-11 | A-1 | A-1 |
| | Amount | 0.31 | 0.31 | 0.31 | 1.63 | 0.31 | 0.31 | 0.31 | 0.31 | 0.31 | 0.31 | 0.31 | 0.31 |
| Compound B | Type | B-13 | B-13 | B-13 | B-4 | B-4 | B-4 | B-4 | B-11 | B-11 | B-11 | B-15 | B-15 |
| | Amount | 1.25 | 1.25 | 1.25 | 2.11 | 1.25 | 1.25 | 1.25 | 1.25 | 1.25 | 1.25 | 1.25 | 1.25 |

TABLE 2-continued

|  |  | Example 11 | Example 12 | Example 13 | Example 14 | Example 15 | Example 16 | Example 17 | Example 18 | Example 19 | Example 20 | Example 21 | Example 22 |
|---|---|---|---|---|---|---|---|---|---|---|---|---|---|
| Compound C-I | Type | C-3-1 | C-3-1 | C-3-1 | C-6-1 | C-6-1 | C-6-1 | C-6-1 | C-5-1 | C-5-1 | C-5-1 | C-7-1 | C-7-1 |
| Compound C-II |  | C-3-2 | C-3-2 | C-3-2 | C-6-2 | C-6-2 | C-6-2 | C-6-2 | C-5-2 | C-5-2 | C-5-2 | C-7-2 | C-7-2 |
|  | Amount | 1.88 | 1.88 | 1.88 | 1.05 | 1.88 | 1.88 | 1.88 | 1.88 | 1.88 | 1.88 | 1.88 | 1.88 |
| Compound D | Type | D-3 | D-3 | D-3 | D-8 | D-8 | D-8 | D-8 | D-5 | D-5 | D-5 | D-5 | D-4 |
|  | Amount | 1.25 | 1.25 | 1.25 | 0.24 | 1.25 | 1.25 | 1.25 | 1.25 | 1.25 | 1.25 | 1.25 | 1.25 |
| Compound E | Type | E-1 | E-1 | E-1 | E-4 | E-4 | E-4 | E-4 | E-11 | E-11 | E-11 | E-3 | E-3 |
|  | Amount | 0.31 | 0.31 | 0.31 | 0.02 | 0.31 | 0.31 | 0.31 | 0.31 | 0.31 | 0.31 | 0.31 | 0.31 |
| Compound represented by general formula (II) | Type | — | (P-4) | (P-4) | — | — | (P-4) | (P-4) | — | (P-4) | (P-4) | (P-4) | (P-4) |
|  | Amount | 0.00 | 0.50 | 0.50 | 0.00 | 0.00 | 0.50 | 0.50 | 0.00 | 0.50 | 0.50 | 0.50 | 0.50 |
| Chelating agent | Type | — | — | EDTA4Li | — | — | — | EDTA4Li | — | — | EDTA4Li | — | EDTA4Li |
|  | Amount | 0.00 | 0.00 | 0.05 | 0.00 | 0.00 | 0.00 | 0.05 | 0.00 | 0.00 | 0.05 | 0.00 | 0.05 |
| Preservative | Amount | 0.11 | 0.11 | 0.11 | 0.11 | 0.11 | 0.11 | 0.11 | 0.11 | 0.11 | 0.11 | 0.11 | 0.11 |
| Organic solvent | Amount | 26.92 | 26.92 | 26.92 | 26.92 | 26.92 | 26.92 | 26.92 | 26.92 | 26.92 | 26.92 | 26.92 | 26.92 |
| Surfactant | Amount | 1.00 | 1.00 | 1.00 | 1.00 | 1.00 | 1.00 | 1.00 | 1.00 | 1.00 | 1.00 | 1.00 | 1.00 |

Unit of amount: g

TABLE 3

|  |  | Example 23 | Example 24 | Example 25 | Example 26 | Example 27 | Example 28 | Example 29 | Example 30 |
|---|---|---|---|---|---|---|---|---|---|
| Compound A | Type | A-1 | A-1 | A-1 | A-1 | A-12 | A-12 | A-12 | A-12 |
|  | Amount | 1.46 | 0.28 | 0.28 | 0.28 | 0.28 | 0.28 | 0.28 | 0.28 |
| Compound B | Type | B-1 | B-1 | B-1 | B-1 | B-2 | B-2 | B-2 | B-2 |
|  | Amount | 1.90 | 1.13 | 1.13 | 1.13 | 1.13 | 1.13 | 1.13 | 1.13 |
| Compound C-I | Type | C-1-1 | C-1-1 | C-1-1 | C-1-1 | C-4-1 | C-4-1 | C-4-1 | C-4-1 |
| Compound C-II |  | C-1-2 | C-1-2 | C-1-2 | C-1-2 | C-4-2 | C-4-2 | C-4-2 | C-4-2 |
|  | Amount | 0.94 | 1.68 | 1.68 | 1.68 | 1.68 | 1.68 | 1.68 | 1.68 |
| Compound D | Type | D-1 | D-1 | D-1 | D-1 | D-2 | D-2 | D-2 | D-2 |
|  | Amount | 0.22 | 1.13 | 1.13 | 1.13 | 1.13 | 1.13 | 1.13 | 1.13 |
| Compound E | Type | E-1 | E-1 | E-1 | E-1 | E-1 | E-1 | E-1 | E-1 |
|  | Amount | 0.02 | 0.28 | 0.28 | 0.28 | 0.28 | 0.28 | 0.28 | 0.28 |
| Cyan dye | Type | Q-1 | Q-1 | Q-1 | Q-1 | Q-2 | Q-2 | DB199 | AB9 |
|  | Amount | 0.51 | 0.50 | 0.50 | 0.50 | 0.50 | 0.50 | 0.50 | 0.50 |
| Compound represented by general formula (II) | Type | — | — | (P-4) | (P-4) | (P-3) | (P-3) | (P-3) | (P-3) |
|  | Amount | 0.00 | 0.00 | 0.50 | 0.50 | 0.50 | 0.50 | 0.50 | 0.50 |
| Chelating agent | Type | — | — | — | EDTA4Li | — | EDTA4Na | EDTA4Na | EDTA4Na |
|  | Amount | 0.00 | 0.00 | 0.00 | 0.05 | 0.00 | 0.05 | 0.05 | 0.05 |
| Preservative | Amount | 0.11 | 0.11 | 0.11 | 0.11 | 0.11 | 0.11 | 0.11 | 0.11 |
| Organic solvent | Amount | 26.92 | 26.92 | 26.92 | 26.92 | 26.92 | 26.92 | 26.92 | 26.92 |
| Surfactant | Amount | 1.00 | 1.00 | 1.00 | 1.00 | 1.00 | 1.00 | 1.00 | 1.00 |

Unit of amount: g

Examples 31 to 33

Dye ink compositions 31 to 33 (100 g each) were prepared as in Example 1 except that mixtures including components shown in Table 4 below in the corresponding amounts shown in Table 4 below were used. The preservative, the organic solvent, and the surfactant are the same as those in Example 1. In Example 33, A-1 and A-16 were used as the compound A in combination at a mass ratio of 1:1 (0.28 g of A-1 and 0.28 g of A-16 were used).

TABLE 4

|  |  | Example 31 | Example 32 | Example 33 |
|---|---|---|---|---|
| Compound A | Type | A-1 | A-1 | A-1 + A-16 (1:1) |
|  | Amount | 1.64 | 0.30 | 0.28 + 0.28 |
| Compound B | Type | B-1 | B-1 | B-1 |
|  | Amount | 2.12 | 1.35 | 1.13 |
| Compound C-I | Type | C-1-1 | C-1-1 | C-1-1 |
| Compound C-II |  | C-1-2 | C-1-2 | C-1-2 |
|  | Amount | 1.05 | 2.00 | 1.68 |
| Compound D | Type | D-1 | D-1 | D-1 |
|  | Amount | 0.24 | 1.35 | 1.13 |
| Compound E | Type | — | — | — |
|  | Amount | 0.00 | 0.00 | 0.00 |
| Cyan dye | Type | — | — | — |
|  | Amount | 0.00 | 0.00 | 0.00 |
| Compound represented by general formula (II) | Type | (P-4) | (P-4) | (P-4) |
|  | Amount | 0.50 | 0.50 | 0.50 |

TABLE 4-continued

|  |  | Example 31 | Example 32 | Example 33 |
|---|---|---|---|---|
| Chelating agent | Type | EDTA4Li | EDTA4Li | EDTA4Li |
|  | Amount | 0.05 | 0.05 | 0.05 |
| Preservative | Amount | 0.11 | 0.11 | 0.11 |
| Organic solvent | Amount | 26.92 | 26.92 | 26.92 |
| Surfactant | Amount | 1.00 | 1.00 | 1.00 |

Unit of amount: g

The compound A, the compound B, the compound C-I, the compound C-II, the compound D, and the compound E, and the compound represented by general formula (II) that were used are those described above.

EDTA4Li represents a tetralithium salt of ethylenediaminetetraacetic acid.

EDTA4Na represents a tetrasodium salt of ethylenediaminetetraacetic acid.

Q-1 and Q-2 used as cyan dyes are compounds each represented by general formula (Cy-1) and are those described above. DB199 is C.I. Direct Blue 199 and is a compound represented by any of general formulae (Cy-2) to (Cy-5). AB9 is C.I. Acid Blue 9 and is a compound that does not correspond to any of general formulae (Cy-1) to (Cy-5).

With regard to the dye ink compositions 1 to 30 prepared in Examples 1 to 30, $(W_1/W_{A2}) \times 100$, $(W_2/W_{A2}) \times 100$, $(W_3/W_{A2}) \times 100$, $(W_4/W_{A2}) \times 100$, and $(W_5/W_{A2}) \times 100$ are shown in Tables 5 to 7 below, where $W_1$ represents the mass of the compound A, $W_2$ represents the mass of the compound B, $W_3$ represents the sum of the mass of the compound C-I and the mass of the compound C-II, $W_4$ represents the mass of the compound D, $W_5$ represents the mass of the compound E, and $W_{A2}$ represents the total sum of $W_1$, $W_2$, $W_3$, $W_4$, and $W_5$, the compounds A, B, C-I, C-II, D, and E being included in each dye ink composition.

$(W_{A2}/W_A) \times 100$ and $(W_P/W_A) \times 100$ are also shown in Tables 5 to 7 below, where $W_A$ represents the total mass of each of the dye ink compositions 1 to 30, and $W_P$ represents the content of the compound represented by general formula (II) in each of the dye ink compositions 1 to 30.

All "%" described in Tables 5 to 7 below are percentages based on the mass (that is, "% by mass").

TABLE 5

|  | Example 1 | Example 2 | Example 3 | Example 4 | Example 5 | Example 6 | Example 7 | Example 8 | Example 9 | Example 10 |
|---|---|---|---|---|---|---|---|---|---|---|
| $(W_1/W_{A2}) \times 100$ | 32.28% | 6.20% | 6.20% | 6.20% | 32.28% | 6.20% | 6.20% | 6.00% | 6.31% | 6.31% |
| $(W_2/W_{A2}) \times 100$ | 41.78% | 25.00% | 25.00% | 25.00% | 41.78% | 25.00% | 25.00% | 25.20% | 24.92% | 24.92% |
| $(W_3/W_{A2}) \times 100$ | 20.79% | 37.60% | 37.60% | 37.60% | 20.79% | 37.60% | 37.60% | 37.60% | 37.54% | 37.54% |
| $(W_4/W_{A2}) \times 100$ | 4.75% | 25.00% | 25.00% | 25.00% | 4.75% | 25.00% | 25.00% | 25.20% | 24.92% | 24.92% |
| $(W_5/W_{A2}) \times 100$ | 0.40% | 6.20% | 6.20% | 6.20% | 0.40% | 6.20% | 6.20% | 6.00% | 6.31% | 6.31% |
| $(W_{A2}/W_A) \times 100$ | 5.05% | 5.00% | 5.00% | 5.00% | 5.05% | 5.00% | 5.00% | 2.50% | 3.01% | 6.02% |
| $(W_P/W_A) \times 100$ | 0.00% | 0.00% | 0.50% | 0.50% | 0.50% | 0.50% | 0.50% | 0.50% | 0.50% | 0.50% |

TABLE 6

|  | Example 11 | Example 12 | Example 13 | Example 14 | Example 15 | Example 16 | Example 17 | Example 18 | Example 19 | Example 20 | Example 21 | Example 22 |
|---|---|---|---|---|---|---|---|---|---|---|---|---|
| $(W_1/W_{A2}) \times 100$ | 6.20% | 6.20% | 6.20% | 32.28% | 6.20% | 6.20% | 6.20% | 6.20% | 6.20% | 6.20% | 6.20% | 6.20% |
| $(W_2/W_{A2}) \times 100$ | 25.00% | 25.00% | 25.00% | 41.78% | 25.00% | 25.00% | 25.00% | 25.00% | 25.00% | 25.00% | 25.00% | 25.00% |
| $(W_3/W_{A2}) \times 100$ | 37.60% | 37.60% | 37.60% | 20.79% | 37.60% | 37.60% | 37.60% | 37.60% | 37.60% | 37.60% | 37.60% | 37.60% |
| $(W_4/W_{A2}) \times 100$ | 25.00% | 25.00% | 25.00% | 4.75% | 25.00% | 25.00% | 25.00% | 25.00% | 25.00% | 25.00% | 25.00% | 25.00% |
| $(W_5/W_{A2}) \times 100$ | 6.20% | 6.20% | 6.20% | 0.40% | 6.20% | 6.20% | 6.20% | 6.20% | 6.20% | 6.20% | 6.20% | 6.20% |
| $(W_{A2}/W_A) \times 100$ | 5.00% | 5.00% | 5.00% | 5.05% | 5.00% | 5.00% | 5.00% | 5.00% | 5.00% | 5.00% | 5.00% | 5.00% |
| $(W_P/W_A) \times 100$ | 0.00% | 0.50% | 0.50% | 0.00% | 0.00% | 0.50% | 0.50% | 0.00% | 0.50% | 0.50% | 0.50% | 0.50% |

TABLE 7

|  | Example 23 | Example 24 | Example 25 | Example 26 | Example 27 | Example 28 | Example 29 | Example 30 |
|---|---|---|---|---|---|---|---|---|
| $(W_1/W_{A2}) \times 100$ | 32.16% | 6.22% | 6.22% | 6.22% | 6.22% | 6.22% | 6.22% | 6.22% |
| $(W_2/W_{A2}) \times 100$ | 41.85% | 25.11% | 25.11% | 25.11% | 25.11% | 25.11% | 25.11% | 25.11% |
| $(W_3/W_{A2}) \times 100$ | 20.70% | 37.33% | 37.33% | 37.33% | 37.33% | 37.33% | 37.33% | 37.33% |
| $(W_4/W_{A2}) \times 100$ | 4.85% | 25.11% | 25.11% | 25.11% | 25.11% | 25.11% | 25.11% | 25.11% |
| $(W_5/W_{A2}) \times 100$ | 0.44% | 6.22% | 6.22% | 6.22% | 6.22% | 6.22% | 6.22% | 6.22% |
| $(W_{A2}/W_A) \times 100$ | 4.54% | 4.50% | 4.50% | 4.50% | 4.50% | 4.50% | 4.50% | 4.50% |
| $(W_P/W_A) \times 100$ | 0.00% | 0.00% | 0.50% | 0.50% | 0.50% | 0.50% | 0.50% | 0.50% |

With regard to the dye ink compositions 31 to 33 prepared in Examples 31 to 33, $(W_1/W_{A1})\times100$, $(W_2/W_{A1})\times100$, $(W_3/W_{A1})\times100$, $(W_4/W_{A1})\times100$, and $(W_5/W_{A1})\times100$ are shown in Table 8 below, where $W_1$ represents the mass of the compound A, $W_2$ represents the mass of the compound B, $W_3$ represents the sum of the mass of the compound C-I and the mass of the compound C-II, $W_4$ represents the mass of the compound D, and $W_{A1}$ represents the total sum of $W_1$, $W_2$, $W_3$, and $W_4$, the compounds A, B, C-I, C-II, and D being included in each dye ink composition.

$(W_{A1}/W_A)\times100$ and $(W_P/W_A)\times100$ are also shown in Table 8 below, where $W_A$ represents the total mass of each of the dye ink compositions 31 to 33, and $W_P$ represents the content of the compound represented by general formula (II) in each of the dye ink compositions 31 to 33.

ing amounts shown in Table 9 below were used. The preservative, the organic solvent, and the surfactant are the same as those in Example 1.

Comparative Examples 6 to 10

Comparative dye ink compositions r6 to r10 (100 g each) were prepared as in Example 1 except that mixtures including components shown in Table 9 below in the corresponding amounts shown in Table 9 below were used and a 10 mol/L aqueous sodium hydroxide solution was used instead of the 10 mol/L aqueous lithium hydroxide solution. The preservative, the organic solvent, and the surfactant are the same as those in Example 1.

TABLE 9

| | | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 | Comparative Example 10 |
|---|---|---|---|---|---|---|---|---|---|---|---|
| Compound A | Type | — | — | — | — | — | — | — | — | — | — |
| | Amount | 0.00 | 0.00 | 0.00 | 0.00 | 0.00 | 0.00 | 0.00 | 0.00 | 0.00 | 0.00 |
| Compound B | Type | — | — | B-1 | B-1 | B-1 | B-2 | B-2 | B-2 | B-2 | B-2 |
| | Amount | 0.00 | 0.00 | 1.50 | 1.50 | 1.35 | 1.50 | 1.50 | 1.50 | 1.50 | 1.50 |
| Compound C-I | Type | — | — | C-1-1 | C-1-1 | C-1-1 | C-4-1 | C-4-1 | C-4-1 | C-4-1 | C-4-1 |
| Compound C-II | | — | — | C-1-2 | C-1-2 | C-1-2 | C-4-2 | C-4-2 | C-4-2 | C-4-2 | C-4-2 |
| | Amount | 0.00 | 0.00 | 2.00 | 2.00 | 1.80 | 2.00 | 2.00 | 2.00 | 2.00 | 2.00 |
| Compound D | Type | — | — | D-1 | D-1 | D-1 | D-2 | D-2 | D-2 | D-2 | D-2 |
| | Amount | 0.00 | 0.00 | 1.50 | 1.50 | 1.35 | 1.50 | 1.50 | 1.50 | 1.50 | 1.50 |
| Compound E | Type | E-1 | E-1 | — | — | — | — | — | — | — | — |
| | Amount | 5.00 | 5.00 | 0.00 | 0.00 | 0.00 | 0.00 | 0.00 | 0.00 | 0.00 | 0.00 |
| Cyan dye | Type | — | — | — | — | Q-1 | — | — | Q-2 | DB199 | AB9 |
| | Amount | 0.00 | 0.00 | 0.00 | 0.00 | 0.50 | 0.00 | 0.00 | 0.50 | 0.50 | 0.50 |
| Compound represented by general formula (II) | Type | (P-4) | (P-4) | (P-4) | (P-4) | (P-4) | (P-3) | (P-3) | (P-3) | (P-3) | (P-3) |
| | Amount | 0.50 | 0.50 | 0.50 | 0.50 | 0.50 | 0.50 | 0.50 | 0.50 | 0.50 | 0.50 |
| Chelating agent | Type | — | EDTA4Li | — | EDTA4Li | EDTA4Li | — | EDTA4Na | EDTA4Na | EDTA4Na | EDTA4Na |
| | Amount | 0.00 | 0.05 | 0.00 | 0.05 | 0.05 | 0.00 | 0.05 | 0.05 | 0.05 | 0.05 |
| Preservative | Amount | 0.11 | 0.11 | 0.11 | 0.11 | 0.11 | 0.11 | 0.11 | 0.11 | 0.11 | 0.11 |
| Organic solvent | Amount | 26.92 | 26.92 | 26.92 | 26.92 | 26.92 | 26.92 | 26.92 | 26.92 | 26.92 | 26.92 |
| Surfactant | Amount | 1.00 | 1.00 | 1.00 | 1.00 | 1.00 | 1.00 | 1.00 | 1.00 | 1.00 | 1.00 |

Unit of amount: g

All "%" described in Tables 8 below are percentages based on the mass (that is, "% by mass").

TABLE 8

| | Example 31 | Example 32 | Example 33 |
|---|---|---|---|
| $(W_1/W_{A1})\times100$ | 32.5% | 6.0% | 12.4% |
| $(W_2/W_{A1})\times100$ | 42.0% | 27.0% | 25.1% |
| $(W_3/W_{A1})\times100$ | 20.8% | 40.0% | 37.3% |
| $(W_4/W_{A1})\times100$ | 4.8% | 27.0% | 25.1% |
| $(W_5/W_{A1})\times100$ | 0.0% | 0.0% | 0.0% |
| $(W_{A1}/W_A)\times100$ | 5.1% | 5.0% | 4.5% |
| $(W_P/W_A)\times100$ | 0.5% | 0.5% | 0.5% |

Comparative Examples 1 to 5

Comparative dye ink compositions r1 to r5 (100 g each) were prepared as in Example 1 except that mixtures including components shown in Table 9 below in the corresponding amounts shown in Table 9 below were used. The preservative, the organic solvent, and the surfactant are the same as those in Example 1.

$(W_1/W_{A2})\times100$, $(W_2/W_{A2})\times100$, $(W_3/W_{A2})\times100$, $(W_4/W_{A2})\times100$, and $(W_5/W_{A2})\times100$ are shown in Table 10 below, where $W_1$ represents the mass of the compound A, $W_2$ represents the mass of the compound B, $W_3$ represents the sum of the mass of the compound C-I and the mass of the compound C-II, $W_4$ represents the mass of the compound D, $W_5$ represents the mass of the compound E, and $W_{A2}$ represents the total sum of $W_1$, $W_2$, $W_3$, $W_4$, and $W_5$, the compounds A, B, C-I, C-II, D, and E being included in each of the comparative dye ink compositions r1 to r2 prepared in Comparative Examples 1 to 2.

$(W_{A2}/W_A)\times100$ and $(W_P/W_A)\times100$ are also shown in Table 10 below, where $W_A$ represents the total mass of each of the comparative dye ink compositions r1 to r2, and $W_P$ represents the content of the compound represented by general formula (II) in each of the comparative dye ink compositions r1 to r2.

$(W_1/W_{A1})\times100$, $(W_2/W_{A1})\times100$, $(W_3/W_{A1})\times100$, $(W_4/W_{A1})\times100$, and $(W_5/W_{A1})\times100$ are shown in Table 10 below, where $W_1$ represents the mass of the compound A, $W_2$ represents the mass of the compound B, $W_3$ represents the sum of the mass of the compound C-I and the mass of the compound C-II, $W_4$ represents the mass of the compound D, and $W_{A1}$ represents the total sum of $W_1$, $W_2$, $W_3$, and $W_4$, the compounds A, B, C-I, C-II, and D being included in each of the comparative dye ink compositions r3 to r10 prepared in Comparative Examples 3 to 10.

$(W_{A1}/W_A) \times 100$ and $(W_P/W_A) \times 100$ are also shown in Table 10 below, where $W_A$ represents the total mass of each of the comparative dye ink compositions r3 to r10, and $W_P$ represents the content of the compound represented by general formula (II) in each of the comparative dye ink compositions r3 to r10.

All "%" described in Table 10 below are percentages based on the mass (that is, "% by mass").

In Table 10 below, "$W_{AX}$" related to Comparative Examples 1 to 2 represents "$W_{A2}$", and "$W_{AX}$" related to Comparative Examples 3 to 10 represents "$W_{A1}$".

TABLE 10

| | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 | Comparative Example 10 |
|---|---|---|---|---|---|---|---|---|---|---|
| $(W_1/W_{AX}) \times 100$ | 0.0% | 0.0% | 0.0% | 0.0% | 0.0% | 0.0% | 0.0% | 0.0% | 0.0% | 0.0% |
| $(W_2/W_{AX}) \times 100$ | 0.0% | 0.0% | 30.0% | 30.0% | 30.0% | 30.0% | 30.0% | 30.0% | 30.0% | 30.0% |
| $(W_3/W_{AX}) \times 100$ | 0.0% | 0.0% | 40.0% | 40.0% | 40.0% | 40.0% | 40.0% | 40.0% | 40.0% | 40.0% |
| $(W_4/W_{AX}) \times 100$ | 0.0% | 0.0% | 30.0% | 30.0% | 30.0% | 30.0% | 30.0% | 30.0% | 30.0% | 30.0% |
| $(W_5/W_{AX}) \times 100$ | 100.0% | 100.0% | 0.0% | 0.0% | 0.0% | 0.0% | 0.0% | 0.0% | 0.0% | 0.0% |
| $(W_{AX}/W_A) \times 100$ | 5.0% | 5.0% | 5.0% | 5.0% | 4.5% | 5.0% | 5.0% | 5.0% | 5.0% | 5.0% |
| $(W_P/W_A) \times 100$ | 0.5% | 0.5% | 0.5% | 0.5% | 0.5% | 0.5% | 0.5% | 0.5% | 0.5% | 0.5% |

Image Recording and Evaluation

Image recording was performed as follows by using the dye ink compositions prepared above, and the evaluation was performed.

In each of Examples and Comparative Examples, each dye ink composition was used alone as a cyan dye ink (dye ink for ink jet recording) to form a cyan single-color image.

The dye ink composition was loaded in an ink cartridge, and images that were recorded on photo paper (ink jet paper) (Photo Paper <Glossy> manufactured by SEIKO EPSON CORPORATION) and plain paper (Xerox P paper: manufactured by Fuji Xerox Co., Ltd.) with an ink jet printer (PM-700C; manufactured by SEIKO EPSON CORPORATION) were used for evaluation.

Printing Density (Color Developability)

A solid image (an image printed at an applied voltage of 100%) was recorded by using each dye ink composition with the combination of the ink jet printer and the recording paper described above.

The printing density of the formed solid image was measured with a reflection densitometer (trade name: X-Rite 310TR, manufactured by X-Rite Inc.), and each cyan single-color image was evaluated in the following five grades in terms of printing density (optical density) determined when a red filter was used. It is desirable that the evaluation below be B or higher for each of the ink jet paper and the plain paper.

(Ink Jet Paper)
A: 2.0 or more
B: 1.8 or more and less than 2.0
C: 1.7 or more and less than 1.8
D: 1.6 or more and less than 1.7
E: less than 1.6

(Plain Paper)
A: 0.90 or more
B: 0.85 or more and less than 0.90
C: 0.80 or more and less than 0.85
D: 0.75 or more and less than 0.80
E: less than 0.75

Table 11 below shows the results.

TABLE 11

| | Printing density | |
|---|---|---|
| | Plain paper | Ink jet paper |
| Example 1 | B | A |
| Example 2 | A | A |
| Example 3 | A | A |
| Example 4 | A | A |
| Example 5 | B | A |
| Example 6 | A | A |
| Example 7 | A | A |

TABLE 11-continued

| | Printing density | |
|---|---|---|
| | Plain paper | Ink jet paper |
| Example 8 | B | B |
| Example 9 | A | A |
| Example 10 | A | A |
| Example 11 | A | A |
| Example 12 | A | A |
| Example 13 | A | A |
| Example 14 | B | A |
| Example 15 | B | A |
| Example 16 | A | A |
| Example 17 | A | A |
| Example 18 | A | A |
| Example 19 | A | A |
| Example 20 | A | A |
| Example 21 | A | A |
| Example 22 | A | A |
| Example 23 | A | A |
| Example 24 | A | A |
| Example 25 | A | A |
| Example 26 | A | A |
| Example 27 | A | A |
| Example 28 | A | A |
| Example 29 | A | A |
| Example 30 | A | A |
| Example 31 | A | A |
| Example 32 | A | A |
| Example 33 | A | A |
| Comparative Example 1 | D | D |
| Comparative Example 2 | D | D |
| Comparative Example 3 | C | C |
| Comparative Example 4 | C | C |
| Comparative Example 5 | B | C |
| Comparative Example 6 | C | C |
| Comparative Example 7 | C | C |
| Comparative Example 8 | B | C |
| Comparative Example 9 | B | C |
| Comparative Example 10 | A | C |

The above results show that the dye ink compositions of Examples 1 to 30, which include the compound A to the compound E, and the dye ink compositions of Examples 31 to 33, which include the compound A to the compound D, can form, in both cases of the ink jet paper and the plain paper, an image having a higher printing density than the dye ink compositions of Comparative Examples 1 to 2, which include the compound E but include none of the compound A to the compound D.

The results also show that the dye ink compositions of Examples 1 to 33 can form, in the case of the ink jet paper, an image having a higher printing density than the dye ink compositions of Comparative Examples 3 to 10, which include the compound B to the compound D but include neither the compound A nor the compound E.

In particular, the comparison between Example 15 and Example 16 shows that when the dye ink composition includes the compound represented by general formula (II), the printing density in the case of the plain paper can be improved.

Continuous Ejection Stability of Ink

Each of the dye ink compositions (dye inks for ink jet recording) was loaded in an ink cartridge for an ink jet printer (trade name: PM-700C, manufactured by SEIKO EPSON CORPORATION), the cartridge was installed in the ink jet printer, and ejection of the ink from all nozzles was confirmed. Subsequently, an image was output on 100 sheets with A4 size (ink jet paper, Photo Paper <Glossy> manufactured by SEIKO EPSON CORPORATION), and continuous ejection stability was evaluated in accordance with the criteria below.

A: No print irregularity occurs from start to end of printing.
B: Output with print irregularity occurs on 1 sheet or more and less than 3 sheets.
C: Output with print irregularity occurs on 3 sheets or more and less than 10 sheets.
D: Output with print irregularity occurs on 10 sheets or more and less than 15 sheets.
E: Output with print irregularity occurs on 15 sheets or more.

The test of the continuous ejection stability was performed immediately after the preparation of each dye ink composition.

In Table 12 below, the results obtained in the cases where a dye ink composition immediately after the preparation was used are shown in the column of "Immediately after preparation of ink".

The evaluation of the continuous ejection stability is desirably B or higher, and more desirably A.

Storage Stability

With regard to each of the dye ink compositions (dye inks for ink jet recording), the evaluation of storage stability of the ink was performed, as a forced test, after the ink was preserved at 60° C. and a relative humidity of 50% for 4 weeks, after the ink was preserved at 60° C. and a relative humidity of 50% for 10 weeks, and after the ink was preserved at 60° C. and a relative humidity of 50% for 15 weeks.

The storage stability was evaluated in three grades. When substantially the same performance as that of the dye ink composition immediately after ink preparation was maintained (when the same evaluation results were obtained in all the printing density on the plain paper, the printing density on the ink jet paper, and the continuous ejection stability), the dye ink composition was evaluated as A. When the performance was degraded in one of the evaluation items (the printing density on the plain paper, the printing density on the ink jet paper, and the continuous ejection stability) after the forced test, the dye ink composition was evaluated as B. When the performance was degraded in two or more items after the forced test, the dye ink composition was evaluated as C.

It is desirable that the evaluation of the storage stability be A after the preservation at 60° C. and a relative humidity of 50% for 4 weeks, it is more desirable that the evaluation of the storage stability be A after the preservation at 60° C. and a relative humidity of 50% for 10 weeks, and it is most desirable that the evaluation of the storage stability be A after the preservation at 60° C. and a relative humidity of 50% for 15 weeks.

Table 12 below shows the results.

TABLE 12

| | Ink continuous ejection stability | Storage stability (Forced test) | | |
|---|---|---|---|---|
| | Immediately after preparation of ink | After 4 weeks | After 10 weeks | After 15 weeks |
| Example 1 | A | A | B | C |
| Example 2 | A | A | B | C |
| Example 3 | A | A | A | B |
| Example 4 | A | A | A | A |
| Example 5 | A | A | A | B |
| Example 6 | A | A | A | B |
| Example 7 | A | A | A | A |
| Example 8 | A | A | A | A |
| Example 9 | A | A | A | A |
| Example 10 | A | A | A | B |
| Example 11 | A | A | B | C |
| Example 12 | A | A | A | B |
| Example 13 | A | A | A | A |
| Example 14 | A | A | B | C |
| Example 15 | A | A | B | C |
| Example 16 | A | A | A | B |
| Example 17 | A | A | A | A |
| Example 18 | A | A | B | C |
| Example 19 | A | A | A | B |
| Example 20 | A | A | A | A |
| Example 21 | A | A | A | B |
| Example 22 | A | A | A | A |
| Example 23 | A | A | A | B |
| Example 24 | A | A | A | B |
| Example 25 | A | A | A | B |
| Example 26 | A | A | A | A |
| Example 27 | A | A | A | B |
| Example 28 | A | A | A | A |
| Example 29 | A | A | A | A |
| Example 30 | A | A | A | A |
| Example 31 | A | A | A | B |
| Example 32 | A | A | A | B |
| Example 33 | A | A | A | B |
| Comparative Example 1 | D | C | C | C |
| Comparative Example 2 | D | C | C | C |
| Comparative Example 3 | C | C | C | C |
| Comparative Example 4 | C | B | C | C |
| Comparative Example 5 | B | B | C | C |
| Comparative Example 6 | C | C | C | C |
| Comparative Example 7 | C | B | C | C |
| Comparative Example 8 | B | B | C | C |
| Comparative Example 9 | B | B | C | C |
| Comparative Example 10 | B | B | C | C |

Example B

Example 34

Preparation of Dye Ink Composition 34

Deionized water was added to a mixture including components below in the corresponding amounts below up to a total weight of 90 g, and the resulting mixture was then stirred for one hour while the temperature was held at 30° C. to 40° C. Subsequently, the pH was adjusted to 9.0 with a 10 mol/L aqueous lithium hydroxide solution, filtration was performed under reduced pressure with a microfilter having an average pore size of 0.25 µm, and the filtration device was then washed with 10 g of deionized water to collect an ink residue. Ten grams of the deionized water used for collecting the ink residue was added to 90 g of the mixture that had been previously filtered to prepare a dye ink composition 34 (100 g).

| | |
|---|---|
| A-1 | 1.63 g |
| B-1 | 2.11 g |
| C-1-1 and C-1-2 | 1.05 g |
| D-1 | 0.24 g |
| E-1 | 0.02 g |
| Preservative | 0.11 g |
| Organic solvent | 26.00 g |
| Surfactant | 0.50 g |

Examples 35 to 37

Dye ink compositions 35 to 37 (100 g each) were prepared as in Example 34 except that mixtures including components shown in Table 13 below in the corresponding amounts shown in Table 13 below were used. The preservative, the organic solvent, and the surfactant are the same as those in Example 34.

Examples 38 to 43

Dye ink compositions 38 to 43 (100 g each) were prepared as in Example 34 except that mixtures including components shown in Table 13 below in the corresponding amounts shown in Table 13 below were used and a 10 mol/L aqueous sodium hydroxide solution was used instead of the 10 mol/L aqueous lithium hydroxide solution. The preservative, the organic solvent, and the surfactant are the same as those in Example 34.

TABLE 13

| | | Example 34 | Example 35 | Example 36 | Example 37 | Example 38 | Example 39 | Example 40 | Example 41 | Example 42 | Example 43 |
|---|---|---|---|---|---|---|---|---|---|---|---|
| Compound A | Type | A-1 | A-1 | A-1 | A-1 | A-12 | A-12 | A-12 | A-12 | A-12 | A-12 |
| | Amount | 1.63 | 0.31 | 0.31 | 0.31 | 1.63 | 0.31 | 0.31 | 0.15 | 0.19 | 0.38 |
| Compound B | Type | B-1 | B-1 | B-1 | B-1 | B-2 | B-2 | B-2 | B-2 | B-2 | B-2 |
| | Amount | 2.11 | 1.25 | 1.25 | 1.25 | 2.11 | 1.25 | 1.25 | 0.63 | 0.75 | 1.50 |
| Compound C-I | Type | C-1-1 | C-1-1 | C-1-1 | C-1-1 | C-4-1 | C-4-1 | C-4-1 | C-4-1 | C-4-1 | C-4-1 |
| Compound C-II | | C-1-2 | C-1-2 | C-1-2 | C-1-2 | C-4-2 | C-4-2 | C-4-2 | C-4-2 | C-4-2 | C-4-2 |
| | Amount | 1.05 | 1.88 | 1.88 | 1.88 | 1.05 | 1.88 | 1.88 | 0.94 | 1.13 | 2.26 |
| Compound D | Type | D-1 | D-1 | D-1 | D-1 | D-2 | D-2 | D-2 | D-2 | D-2 | D-2 |
| | Amount | 0.24 | 1.25 | 1.25 | 1.25 | 0.24 | 1.25 | 1.25 | 0.63 | 0.75 | 1.50 |
| Compound E | Type | E-1 | E-1 | E-1 | E-1 | E-1 | E-1 | E-1 | E-1 | E-1 | E-1 |
| | Amount | 0.02 | 0.31 | 0.31 | 0.31 | 0.02 | 0.31 | 0.31 | 0.15 | 0.19 | 0.38 |
| Compound represented by general formula (II) | Type | — | — | (P-4) | (P-4) | (P-3) | (P-3) | (P-3) | (P-3) | (P-3) | (P-3) |
| | Amount | 0.00 | 0.00 | 0.50 | 0.50 | 0.50 | 0.50 | 0.50 | 0.50 | 0.50 | 0.50 |
| Chelating agent | Type | — | — | — | EDTA4Li | — | — | EDTA4Na | EDTA4Na | EDTA4Na | EDTA4Na |
| | Amount | 0.00 | 0.00 | 0.00 | 0.05 | 0.00 | 0.00 | 0.05 | 0.05 | 0.05 | 0.05 |
| Preservative | Amount | 0.11 | 0.11 | 0.11 | 0.11 | 0.11 | 0.11 | 0.11 | 0.11 | 0.11 | 0.11 |
| Organic solvent | Amount | 26.00 | 26.00 | 26.00 | 26.00 | 26.00 | 26.00 | 26.00 | 26.00 | 26.00 | 26.00 |
| Surfactant | Amount | 0.50 | 0.50 | 0.50 | 0.50 | 0.50 | 0.50 | 0.50 | 0.50 | 0.50 | 0.50 |

Unit of amount: g

A-1 corresponds to the compound A, B-1 corresponds to the compound B, C-1-1 corresponds to the compound C-I, C-1-2 corresponds to the compound C-II, D-1 corresponds to the compound D, and E-1 corresponds to the compound E.

The above preservative and the above surfactant are the same as those used in Example 1.

The above organic solvent is a mixed solvent including compounds below in the corresponding amounts below.

| | |
|---|---|
| Glycerin | 7.00 g |
| Ethylene urea | 7.00 g |
| 1,5-Pentanediol | 7.00 g |
| 2-Pyrrolidone | 5.00 g |

Examples 44 to 59

Dye ink compositions 44 to 59 (100 g each) were prepared as in Example 34 except that mixtures including components shown in Tables 14 to 15 below in the corresponding amounts shown in Tables 14 to 15 below were used. The preservative, the organic solvent, and the surfactant are the same as those in Example 34.

Examples 60 to 63

Dye ink compositions 60 to 63 (100 g each) were prepared as in Example 34 except that mixtures including components shown in Table 15 below in the corresponding amounts shown in Table 15 below were used and a 10 mol/L aqueous sodium hydroxide solution was used instead of the 10 mol/L aqueous lithium hydroxide solution. The preservative, the organic solvent, and the surfactant are the same as those in Example 34.

TABLE 14

|  |  | Example 44 | Example 45 | Example 46 | Example 47 | Example 48 | Example 49 | Example 50 | Example 51 | Example 52 | Example 53 | Example 54 | Example 55 |
|---|---|---|---|---|---|---|---|---|---|---|---|---|---|
| Compound A | Type | A-16 | A-16 | A-16 | A-1 | A-1 | A-1 | A-1 | A-11 | A-11 | A-11 | A-11 | A-11 |
|  | Amount | 0.31 | 0.31 | 0.31 | 1.63 | 0.31 | 0.31 | 0.31 | 0.31 | 0.31 | 0.31 | 0.31 | 0.31 |
| Compound B | Type | B-13 | B-13 | B-13 | B-4 | B-4 | B-4 | B-4 | B-11 | B-11 | B-11 | B-15 | B-15 |
|  | Amount | 1.25 | 1.25 | 1.25 | 2.11 | 1.25 | 1.25 | 1.25 | 1.25 | 1.25 | 1.25 | 1.25 | 1.25 |
| Compound C-I | Type | C-3-1 | C-3-1 | C-3-1 | C-6-1 | C-6-1 | C-6-1 | C-6-1 | C-5-1 | C-5-1 | C-5-1 | C-7-1 | C-7-1 |
| Compound C-II |  | C-3-2 | C-3-2 | C-3-2 | C-6-2 | C-6-2 | C-6-2 | C-6-2 | C-5-2 | C-5-2 | C-5-2 | C-7-2 | C-7-2 |
|  | Amount | 1.88 | 1.88 | 1.88 | 1.05 | 1.88 | 1.88 | 1.88 | 1.88 | 1.88 | 1.88 | 1.88 | 1.88 |
| Compound D | Type | D-3 | D-3 | D-3 | D-8 | D-8 | D-8 | D-8 | D-5 | D-5 | D-5 | D-5 | D-4 |
|  | Amount | 1.25 | 1.25 | 1.25 | 0.24 | 1.25 | 1.25 | 1.25 | 1.25 | 1.25 | 1.25 | 1.25 | 1.25 |
| Compound E | Type | E-1 | E-1 | E-1 | E-4 | E-4 | E-4 | E-4 | E-11 | E-11 | E-11 | E-11 | E-12 |
|  | Amount | 0.31 | 0.31 | 0.31 | 0.02 | 0.31 | 0.31 | 0.31 | 0.31 | 0.31 | 0.31 | 0.31 | 0.31 |
| Compound represented by general formula (II) | Type | — | (P-4) | (P-4) | — | — | (P-4) | (P-4) | — | (P-4) | (P-4) | (P-4) | (P-4) |
|  | Amount | 0.00 | 0.50 | 0.50 | 0.00 | 0.00 | 0.50 | 0.50 | 0.00 | 0.50 | 0.50 | 0.50 | 0.50 |
| Chelating agent | Type | — | — | EDTA4Li | — | — | — | EDTA4Li | — | — | EDTA4Li | — | EDTA4Li |
|  | Amount | 0.00 | 0.00 | 0.05 | 0.00 | 0.00 | 0.00 | 0.05 | 0.00 | 0.00 | 0.05 | 0.00 | 0.05 |
| Preservative | Amount | 0.11 | 0.11 | 0.11 | 0.11 | 0.11 | 0.11 | 0.11 | 0.11 | 0.11 | 0.11 | 0.11 | 0.11 |
| Organic solvent | Amount | 26.00 | 26.00 | 26.00 | 26.00 | 26.00 | 26.00 | 26.00 | 26.00 | 26.00 | 26.00 | 26.00 | 26.00 |
| Surfactant | Amount | 0.50 | 0.50 | 0.50 | 0.50 | 0.50 | 0.50 | 0.50 | 0.50 | 0.50 | 0.50 | 0.50 | 0.50 |

Unit of amount: g

TABLE 15

|  |  | Example 56 | Example 57 | Example 58 | Example 59 | Example 60 | Example 61 | Example 62 | Example 63 |
|---|---|---|---|---|---|---|---|---|---|
| Compound A | Type | A-1 | A-1 | A-1 | A-1 | A-12 | A-12 | A-12 | A-12 |
|  | Amount | 1.46 | 0.28 | 0.28 | 0.28 | 0.28 | 0.28 | 0.28 | 0.28 |
| Compound B | Type | B-1 | B-1 | B-1 | B-1 | B-2 | B-2 | B-2 | B-2 |
|  | Amount | 1.90 | 1.13 | 1.13 | 1.13 | 1.13 | 1.13 | 1.13 | 1.13 |
| Compound C-I | Type | C-1-1 | C-1-1 | C-1-1 | C-1-1 | C-4-1 | C-4-1 | C-4-1 | C-4-1 |
| Compound C-II |  | C-1-2 | C-1-2 | C-1-2 | C-1-2 | C-4-2 | C-4-2 | C-4-2 | C-4-2 |
|  | Amount | 0.94 | 1.68 | 1.68 | 1.68 | 1.68 | 1.68 | 1.68 | 1.68 |
| Compound D | Type | D-1 | D-1 | D-1 | D-1 | D-2 | D-2 | D-2 | D-2 |
|  | Amount | 0.22 | 1.13 | 1.13 | 1.13 | 1.13 | 1.13 | 1.13 | 1.13 |
| Compound E | Type | E-1 | E-1 | E-1 | E-1 | E-1 | E-1 | E-1 | E-1 |
|  | Amount | 0.02 | 0.28 | 0.28 | 0.28 | 0.28 | 0.28 | 0.28 | 0.28 |
| Cyan dye | Type | Q-1 | Q-1 | Q-1 | Q-1 | Q-2 | Q-2 | DB199 | AB9 |
|  | Amount | 0.51 | 0.50 | 0.50 | 0.50 | 0.50 | 0.50 | 0.50 | 0.50 |
| Compound represented by general formula (II) | Type | — | — | (P-4) | (P-4) | (P-3) | (P-3) | (P-3) | (P-3) |
|  | Amount | 0.00 | 0.00 | 0.50 | 0.50 | 0.50 | 0.50 | 0.50 | 0.50 |
| Chelating agent | Type | — | — | — | EDTA4Li | — | EDTA4Na | EDTA4Na | EDTA4Na |
|  | Amount | 0.00 | 0.00 | 0.00 | 0.05 | 0.00 | 0.05 | 0.05 | 0.05 |
| Preservative | Amount | 0.11 | 0.11 | 0.11 | 0.11 | 0.11 | 0.11 | 0.11 | 0.11 |
| Organic solvent | Amount | 26.00 | 26.00 | 26.00 | 26.00 | 26.00 | 26.00 | 26.00 | 26.00 |
| Surfactant | Amount | 0.50 | 0.50 | 0.50 | 0.50 | 0.50 | 0.50 | 0.50 | 0.50 |

Unit of amount: g

Examples 64 to 66

Dye ink compositions 64 to 66 (100 g each) were prepared as in Example 34 except that mixtures including components shown in Table 16 below in the corresponding amounts shown in Table 16 below were used. The preservative, the organic solvent, and the surfactant are the same as those in Example 34. In Example 66, A-1 and A-16 were used as the compound A in combination at a mass ratio of 1:1.

TABLE 16

|  |  | Example 64 | Example 65 | Example 66 |
|---|---|---|---|---|
| Compound A | Type | A-1 | A-1 | A-1 + A-16 (1:1) |
|  | Amount | 0.30 | 0.30 | 0.28 + 0.28 |
| Compound B | Type | B-1 | B-1 | B-1 |
|  | Amount | 1.35 | 1.35 | 1.13 |
| Compound C-I | Type | C-1-1 | C-1-1 | C-1-1 |
| Compound C-II |  | C-1-2 | C-1-2 | C-1-2 |
|  | Amount | 2.00 | 2.00 | 1.68 |
| Compound D | Type | D-1 | D-1 | D-1 |
|  | Amount | 1.35 | 1.35 | 1.13 |
| Compound E | Type | — | — | — |
|  | Amount | 0.00 | 0.00 | 0.00 |
| Cyan dye | Type | — | — | — |
|  | Amount | 0.00 | 0.00 | 0.00 |
| Compound represented by general formula (II) | Type | — | (P-4) | (P-4) |
|  | Amount | 0.00 | 0.50 | 0.50 |
| Chelating agent | Type | EDTA4Li | EDTA4Li | EDTA4Li |
|  | Amount | 0.05 | 0.05 | 0.05 |
| Preservative | Amount | 0.11 | 0.11 | 0.11 |
| Organic solvent | Amount | 26.00 | 26.00 | 26.00 |
| Surfactant | Amount | 0.50 | 0.50 | 0.50 |

Unit of amount: g

With regard to the dye ink compositions 34 to 63 prepared in Examples 34 to 63, $(W_1/W_{A2}) \times 100$, $(W_2/W_{A2}) \times 100$, $(W_3/W_{A2}) \times 100$, $(W_4/W_{A2}) \times 100$, $(W_5/W_{A2}) \times 100$, $(W_{A2}/W_A) \times 100$, and $(W_P/W_A) \times 100$ are shown in Tables 17 to 19 below.

All "%" described in Tables 17 to 19 below are percentages based on the mass (that is, "% by mass").

TABLE 17

|  | Example 34 | Example 35 | Example 36 | Example 37 | Example 38 | Example 39 | Example 40 | Example 41 | Example 42 | Example 43 |
|---|---|---|---|---|---|---|---|---|---|---|
| $(W_1/W_{A2}) \times 100$ | 32.28% | 6.20% | 6.20% | 6.20% | 32.28% | 6.20% | 6.20% | 6.00% | 6.31% | 6.31% |
| $(W_2/W_{A2}) \times 100$ | 41.78% | 25.00% | 25.00% | 25.00% | 41.78% | 25.00% | 25.00% | 25.20% | 24.92% | 24.92% |
| $(W_3/W_{A2}) \times 100$ | 20.79% | 37.60% | 37.60% | 37.60% | 20.79% | 37.60% | 37.60% | 37.60% | 37.54% | 37.54% |
| $(W_4/W_{A2}) \times 100$ | 4.75% | 25.00% | 25.00% | 25.00% | 4.75% | 25.00% | 25.00% | 25.20% | 24.92% | 24.92% |
| $(W_5/W_{A2}) \times 100$ | 0.40% | 6.20% | 6.20% | 6.20% | 0.40% | 6.20% | 6.20% | 6.00% | 6.31% | 6.31% |
| $(W_{A2}/W_A) \times 100$ | 5.05% | 5.00% | 5.00% | 5.00% | 5.05% | 5.00% | 5.00% | 2.50% | 3.01% | 6.02% |
| $(W_P/W_A) \times 100$ | 0.00% | 0.00% | 0.50% | 0.50% | 0.50% | 0.50% | 0.50% | 0.50% | 0.50% | 0.50% |

TABLE 18

|  | Example 44 | Example 45 | Example 46 | Example 47 | Example 48 | Example 49 | Example 50 | Example 51 | Example 52 | Example 53 | Example 54 | Example 55 |
|---|---|---|---|---|---|---|---|---|---|---|---|---|
| $(W_1/W_{A2}) \times 100$ | 6.20% | 6.20% | 6.20% | 32.28% | 6.20% | 6.20% | 6.20% | 6.20% | 6.20% | 6.20% | 6.20% | 6.20% |
| $(W_2/W_{A2}) \times 100$ | 25.00% | 25.00% | 25.00% | 41.78% | 25.00% | 25.00% | 25.00% | 25.00% | 25.00% | 25.00% | 25.00% | 25.00% |
| $(W_3/W_{A2}) \times 100$ | 37.60% | 37.60% | 37.60% | 20.79% | 37.60% | 37.60% | 37.60% | 37.60% | 37.60% | 37.60% | 37.60% | 37.60% |
| $(W_4/W_{A2}) \times 100$ | 25.00% | 25.00% | 25.00% | 4.75% | 25.00% | 25.00% | 25.00% | 25.00% | 25.00% | 25.00% | 25.00% | 25.00% |
| $(W_5/W_{A2}) \times 100$ | 6.20% | 6.20% | 6.20% | 0.40% | 6.20% | 6.20% | 6.20% | 6.20% | 6.20% | 6.20% | 6.20% | 6.20% |
| $(W_{A2}/W_A) \times 100$ | 5.00% | 5.00% | 5.00% | 5.05% | 5.00% | 5.00% | 5.00% | 5.00% | 5.00% | 5.00% | 5.00% | 5.00% |
| $(W_P/W_A) \times 100$ | 0.00% | 0.50% | 0.50% | 0.00% | 0.00% | 0.50% | 0.50% | 0.00% | 0.50% | 0.50% | 0.50% | 0.50% |

TABLE 19

|  | Example 56 | Example 57 | Example 58 | Example 59 | Example 60 | Example 61 | Example 62 | Example 63 |
|---|---|---|---|---|---|---|---|---|
| $(W_1/W_{A2}) \times 100$ | 32.16% | 6.22% | 6.22% | 6.22% | 6.22% | 6.22% | 6.22% | 6.22% |
| $(W_2/W_{A2}) \times 100$ | 41.85% | 25.11% | 25.11% | 25.11% | 25.11% | 25.11% | 25.11% | 25.11% |
| $(W_3/W_{A2}) \times 100$ | 20.70% | 37.33% | 37.33% | 37.33% | 37.33% | 37.33% | 37.33% | 37.33% |
| $(W_4/W_{A2}) \times 100$ | 4.85% | 25.11% | 25.11% | 25.11% | 25.11% | 25.11% | 25.11% | 25.11% |
| $(W_5/W_{A2}) \times 100$ | 0.44% | 6.22% | 6.22% | 6.22% | 6.22% | 6.22% | 6.22% | 6.22% |
| $(W_{A2}/W_A) \times 100$ | 4.54% | 4.50% | 4.50% | 4.50% | 4.50% | 4.50% | 4.50% | 4.50% |
| $(W_P/W_A) \times 100$ | 0.00% | 0.00% | 0.50% | 0.50% | 0.50% | 0.50% | 0.50% | 0.50% |

With regard to the dye ink compositions 64 to 66 prepared in Examples 64 to 66, $(W_1/W_{A1}) \times 100$, $(W_2/W_{A1}) \times 100$, $(W_3/W_{A1}) \times 100$, $(W_4/W_{A1}) \times 100$, $(W_5/W_{A1}) \times 100$, $(W_{A1}/W_A) \times 100$, and $(W_P/W_A) \times 100$ are shown in Table 20 below.

All "%" described in Tables 20 below are percentages based on the mass (that is, "% by mass").

TABLE 20

|  | Example 64 | Example 65 | Example 66 |
|---|---|---|---|
| $(W_1/W_{A1}) \times 100$ | 6.0% | 6.0% | 12.4% |
| $(W_2/W_{A1}) \times 100$ | 27.0% | 27.0% | 25.1% |
| $(W_3/W_{A1}) \times 100$ | 40.0% | 40.0% | 37.3% |
| $(W_4/W_{A1}) \times 100$ | 27.0% | 27.0% | 25.1% |
| $(W_5/W_{A1}) \times 100$ | 0.0% | 0.0% | 0.0% |
| $(W_{A1}/W_A) \times 100$ | 5.0% | 5.0% | 4.5% |
| $(W_P/W_A) \times 100$ | 0.0% | 0.5% | 0.5% |

Comparative Examples 11 to 15

Comparative dye ink compositions r11 to r15 (100 g each) were prepared as in Example 34 except that mixtures including components shown in Table 21 below in the corresponding amounts shown in Table 21 below were used. The preservative, the organic solvent, and the surfactant are the same as those in Example 34.

Comparative Examples 16 to 20

Comparative dye ink compositions r16 to r20 (100 g each) were prepared as in Example 34 except that mixtures including components shown in Table 21 below in the corresponding amounts shown in Table 21 below were used and a 10 mol/L aqueous sodium hydroxide solution was used instead of the 10 mol/L aqueous lithium hydroxide solution. The preservative, the organic solvent, and the surfactant are the same as those in Example 34.

TABLE 21

|  |  | Comparative Example 11 | Comparative Example 12 | Comparative Example 13 | Comparative Example 14 | Comparative Example 15 | Comparative Example 16 | Comparative Example 17 | Comparative Example 18 | Comparative Example 19 | Comparative Example 20 |
|---|---|---|---|---|---|---|---|---|---|---|---|
| Compound A | Type | — | — | — | — | — | — | — | — | — | — |
|  | Amount | 0.00 | 0.00 | 0.00 | 0.00 | 0.00 | 0.00 | 0.00 | 0.00 | 0.00 | 0.00 |
| Compound B | Type | — | — | B-1 | B-1 | B-1 | B-2 | B-2 | B-2 | B-2 | B-2 |
|  | Amount | 0.00 | 0.00 | 1.50 | 1.50 | 1.35 | 1.50 | 1.50 | 1.50 | 1.50 | 1.50 |
| Compound C-I | Type | — | — | C-1-1 | C-1-1 | C-1-1 | C-4-1 | C-4-1 | C-4-1 | C-4-1 | C-4-1 |
| Compound C-II |  |  |  | C-1-2 | C-1-2 | C-1-2 | C-4-2 | C-4-2 | C-4-2 | C-4-2 | C-4-2 |
|  | Amount | 0.00 | 0.00 | 2.00 | 2.00 | 1.80 | 2.00 | 2.00 | 2.00 | 2.00 | 2.00 |
| Compound D | Type | — | — | D-1 | D-1 | D-1 | D-2 | D-2 | D-2 | D-2 | D-2 |
|  | Amount | 0.00 | 0.00 | 1.50 | 1.50 | 1.35 | 1.50 | 1.50 | 1.50 | 1.50 | 1.50 |
| Compound E | Type | E-1 | E-1 | — | — | — | — | — | — | — | — |
|  | Amount | 5.00 | 5.00 | 0.00 | 0.00 | 0.00 | 0.00 | 0.00 | 0.00 | 0.00 | 0.00 |
| Cyan dye | Type | — | — | — | — | Q-1 | — | — | Q-2 | DB199 | AB9 |
|  | Amount | 0.00 | 0.00 | 0.00 | 0.00 | 0.50 | 0.00 | 0.00 | 0.50 | 0.50 | 0.50 |
| Compound represented by general formula (II) | Type | (P-4) | (P-4) | (P-4) | (P-4) | (P-4) | (P-3) | (P-3) | (P-3) | (P-3) | (P-3) |
|  | Amount | 0.50 | 0.50 | 0.50 | 0.50 | 0.50 | 0.50 | 0.50 | 0.50 | 0.50 | 0.50 |
| Chelating agent | Type | — | EDTA4Li | — | EDTA4Li | EDTA4Li | — | EDTA4Na | EDTA4Na | EDTA4Na | EDTA4Na |
|  | Amount | 0.00 | 0.05 | 0.00 | 0.05 | 0.05 | 0.00 | 0.05 | 0.05 | 0.05 | 0.05 |
| Preservative | Amount | 0.11 | 0.11 | 0.11 | 0.11 | 0.11 | 0.11 | 0.11 | 0.11 | 0.11 | 0.11 |
| Organic solvent | Amount | 26.00 | 26.00 | 26.00 | 26.00 | 26.00 | 26.00 | 26.00 | 26.00 | 26.00 | 26.00 |
| Surfactant | Amount | 0.50 | 0.50 | 0.50 | 0.50 | 0.50 | 0.50 | 0.50 | 0.50 | 0.50 | 0.50 |

Unit of amount: g

With regard to the comparative dye ink compositions r11 to r20 prepared in Comparative Examples 11 to 20, $(W_1/W_{AX}) \times 100$, $(W_2/W_{AX}) \times 100$, $(W_3/W_{AX}) \times 100$, $(W_4/W_{AX}) \times 100$, $(W_5/W_{AX}) \times 100$, $(W_{AX}/W_A) \times 100$, and $(W_P/W_A) \times 100$ are shown in Table 22 below.

All "%" described in Table 22 below are percentages based on the mass (that is, "% by mass").

In Table 22 below, "$W_{AX}$" related to Comparative Examples 11 to 12 represents "$W_{A2}$", and "$W_{AX}$" related to Comparative Examples 13 to 20 represents "$W_{A1}$".

TABLE 22

|  | Comparative Example 11 | Comparative Example 12 | Comparative Example 13 | Comparative Example 14 | Comparative Example 15 | Comparative Example 16 | Comparative Example 17 | Comparative Example 18 | Comparative Example 19 | Comparative Example 20 |
|---|---|---|---|---|---|---|---|---|---|---|
| $(W_1/W_{AX}) \times 100$ | 0.0% | 0.0% | 0.0% | 0.0% | 0.0% | 0.0% | 0.0% | 0.0% | 0.0% | 0.0% |
| $(W_2/W_{AX}) \times 100$ | 0.0% | 0.0% | 30.0% | 30.0% | 30.0% | 30.0% | 30.0% | 30.0% | 30.0% | 30.0% |
| $(W_3/W_{AX}) \times 100$ | 0.0% | 0.0% | 40.0% | 40.0% | 40.0% | 40.0% | 40.0% | 40.0% | 40.0% | 40.0% |
| $(W_4/W_{AX}) \times 100$ | 0.0% | 0.0% | 30.0% | 30.0% | 30.0% | 30.0% | 30.0% | 30.0% | 30.0% | 30.0% |
| $(W_5/W_{AX}) \times 100$ | 100.0% | 100.0% | 0.0% | 0.0% | 0.0% | 0.0% | 0.0% | 0.0% | 0.0% | 0.0% |
| $(W_{AX}/W_A) \times 100$ | 5.0% | 5.0% | 5.0% | 5.0% | 4.5% | 5.0% | 5.0% | 5.0% | 5.0% | 5.0% |
| $(W_P/W_A) \times 100$ | 0.5% | 0.5% | 0.5% | 0.5% | 0.5% | 0.5% | 0.5% | 0.5% | 0.5% | 0.5% |

Image Recording and Evaluation

Image recording was performed by using the dye ink compositions 34 to 66 prepared in Examples 34 to 66 and the comparative dye ink compositions r11 to r20 prepared in Comparative Examples 11 to 20, and the evaluation was performed.

The printing density was evaluated as in Examples 1 to 33 and Comparative Examples 1 to 10 except that PIXUS Pro9000 MkII manufactured by Canon Inc. was used as the ink jet printer and Photo Glossy Paper PT-201 manufactured by Canon Inc. was used as the ink jet paper.

Table 23 below shows the results.

TABLE 23

|  | Printing density | |
|---|---|---|
|  | Plain paper | Ink jet paper |
| Example 34 | B | A |
| Example 35 | A | A |
| Example 36 | A | A |
| Example 37 | A | A |
| Example 38 | B | A |
| Example 39 | A | A |
| Example 40 | A | A |

TABLE 23-continued

| | Printing density | |
|---|---|---|
| | Plain paper | Ink jet paper |
| Example 41 | B | B |
| Example 42 | A | A |
| Example 43 | A | A |
| Example 44 | A | A |
| Example 45 | A | A |
| Example 46 | A | A |
| Example 47 | B | A |
| Example 48 | B | A |
| Example 49 | A | A |
| Example 50 | A | A |
| Example 51 | A | A |
| Example 52 | A | A |
| Example 53 | A | A |
| Example 54 | A | A |
| Example 55 | A | A |
| Example 56 | A | A |
| Example 57 | A | A |
| Example 58 | A | A |
| Example 59 | A | A |
| Example 60 | A | A |
| Example 61 | A | A |
| Example 62 | A | A |
| Example 63 | A | A |
| Example 64 | B | A |
| Example 65 | A | A |
| Example 66 | A | A |
| Comparative Example 11 | D | D |
| Comparative Example 12 | D | D |
| Comparative Example 13 | C | C |
| Comparative Example 14 | C | C |
| Comparative Example 15 | B | C |
| Comparative Example 16 | C | C |
| Comparative Example 17 | C | C |
| Comparative Example 18 | B | C |
| Comparative Example 19 | B | C |
| Comparative Example 20 | A | C |

The above results show that the dye ink compositions of Examples 34 to 63, which include the compound A to the compound E, and the dye ink compositions of Examples 64 to 66, which include the compound A to the compound D, can form, in both cases of the ink jet paper and the plain paper, an image having a higher printing density than the dye ink compositions of Comparative Examples 11 to 12, which include the compound E but include none of the compound A to the compound D.

The results also show that the dye ink compositions of Examples 34 to 66 can form, in the case of the ink jet paper, an image having a higher printing density than the dye ink compositions of Comparative Examples 13 to 20, which include the compound B to the compound D but include neither the compound A nor the compound E.

In particular, the comparison between Example 48 and Example 49 shows that when the dye ink composition includes the compound represented by general formula (II), the printing density in the case of the plain paper can be improved.

Continuous Ejection Stability of Ink

The evaluation of continuous ejection stability was performed by using the dye ink compositions 34 to 66 prepared in Examples 34 to 66 and the comparative dye ink compositions r11 to r20 prepared in Comparative Examples 11 to 20.

The continuous ejection stability was evaluated as in Examples 1 to 33 and Comparative Examples 1 to 10 except that PIXUS Pro9000 MkII manufactured by Canon Inc. was used as the ink jet printer and Photo Glossy Paper PT-201 manufactured by Canon Inc. was used as the ink jet paper.

Storage Stability

With regard to each of the dye ink compositions 34 to 66 prepared in Examples 34 to 66 and the comparative dye ink compositions r11 to r20 prepared in Comparative Examples 11 to 20, the evaluation of storage stability of the ink was performed after the ink was preserved at 60° C. and a relative humidity of 50% for 4 weeks, after the ink was preserved at 60° C. and a relative humidity of 50% for 10 weeks, and after the ink was preserved at 60° C. and a relative humidity of 50% for 15 weeks, as a forced test.

The storage stability was evaluated in three grades. When substantially the same performance as that of the dye ink composition immediately after ink preparation was maintained (when the same evaluation results were obtained in all the printing density on the plain paper, the printing density on the ink jet paper, and the continuous ejection stability), the dye ink composition was evaluated as A. When the performance was degraded in one of the evaluation items (the printing density on the plain paper, the printing density on the ink jet paper, and the continuous ejection stability) after the forced test, the dye ink composition was evaluated as B. When the performance was degraded in two or more items after the forced test, the dye ink composition was evaluated as C.

It is desirable that the evaluation of the storage stability be A after the preservation at 60° C. and a relative humidity of 50% for 4 weeks, it is more desirable that the evaluation of the storage stability be A after the preservation at 60° C. and a relative humidity of 50% for 10 weeks, and it is most desirable that the evaluation of the storage stability be A after the preservation at 60° C. and a relative humidity of 50% for 15 weeks.

Table 24 below shows the results.

TABLE 24

| | Ink continuous ejection stability | Storage stability (Forced test) | | |
|---|---|---|---|---|
| | Immediately after preparation of ink | After 4 weeks | After 10 weeks | After 15 weeks |
| Example 34 | A | A | B | C |
| Example 35 | A | A | B | C |
| Example 36 | A | A | A | B |
| Example 37 | A | A | A | A |
| Example 38 | A | A | A | B |
| Example 39 | A | A | A | B |
| Example 40 | A | A | A | A |
| Example 41 | A | A | A | A |
| Example 42 | A | A | A | A |
| Example 43 | A | A | A | B |
| Example 44 | A | A | B | C |
| Example 45 | A | A | A | B |
| Example 46 | A | A | A | A |
| Example 47 | A | A | B | C |
| Example 48 | A | A | B | C |
| Example 49 | A | A | B | B |
| Example 50 | A | A | A | A |
| Example 51 | A | A | A | C |
| Example 52 | A | A | A | B |
| Example 53 | A | A | A | A |
| Example 54 | A | A | A | B |
| Example 55 | A | A | A | A |
| Example 56 | A | A | A | B |
| Example 57 | A | A | A | B |
| Example 58 | A | A | A | B |
| Example 59 | A | A | A | A |
| Example 60 | A | A | A | B |
| Example 61 | A | A | A | A |
| Example 62 | A | A | A | A |
| Example 63 | A | A | A | A |
| Example 64 | A | A | A | B |

TABLE 24-continued

|  | Ink continuous ejection stability | Storage stability (Forced test) | | |
|---|---|---|---|---|
|  | Immediately after preparation of ink | After 4 weeks | After 10 weeks | After 15 weeks |
| Example 65 | A | A | A | B |
| Example 66 | A | A | A | B |
| Comparative Example 11 | D | C | C | C |
| Comparative Example 12 | D | C | C | C |
| Comparative Example 13 | C | C | C | C |
| Comparative Example 14 | C | B | C | C |
| Comparative Example 15 | B | B | C | C |
| Comparative Example 16 | C | C | C | C |
| Comparative Example 17 | C | B | C | C |
| Comparative Example 18 | B | B | C | C |
| Comparative Example 19 | B | B | C | C |
| Comparative Example 20 | B | B | C | C |

Example C

Example 67

Preparation of Aqueous Dye Solution 67

In 200.00 parts by mass of deionized water, 31.6 parts by mass the compound A (A-1), 42.0 parts by mass of the compound B (B-1), 21.2 parts by mass of the compound C-I and the compound C-II (C-1-1 and C-1-2), 4.80 parts by mass of the compound D (D-1), 0.40 parts by mass of the compound E (E-1), 2.20 parts by mass of a preservative (PROXEL (registered trademark) XL2(s), manufactured by LONZA), and 0.60 parts by mass of a buffering agent (LiHCO$_3$) were dissolved, and the pH of the resulting solution was then adjusted to 8.5 with a pH adjusting agent (10 mol/L aqueous lithium hydroxide solution). The solution was filtered under reduced pressure through a microfilter having an average pore size of 0.20 μm and washed with deionized water to prepare an aqueous dye solution 67 (1,000 parts by mass).

Examples 68 and 71 to 78

Aqueous dye solutions 68 and 71 to 78 (1,000 g each) were prepared as in Example 67 except that mixtures including components shown in Table 25 below in the corresponding amounts shown in Table 25 below were used. The preservative is the same as that in Example 67.

Examples 69 to 70

Aqueous dye solutions 69 to 70 (1,000 g each) were prepared as in Example 67 except that mixtures including components shown in Table 25 below in the corresponding amounts shown in Table 25 below were used and a 10 mol/L aqueous sodium hydroxide solution was used as the pH adjusting agent instead of the 10 mol/L aqueous lithium hydroxide solution. The preservative is the same as that in Example 67.

"A-1+A-16 (5:5)" of Example 72 in Table 25 indicates that A-1 and A-16 were used in combination at a mass ratio of A-1:A-16=5:5 and means that 6.20 g of A-1 and 6.20 g of A-16 were used.

TABLE 25

|  |  | Example 67 | Example 68 | Example 69 | Example 70 | Example 71 | Example 72 | Example 73 | Example 74 | Example 75 | Example 76 | Example 77 | Example 78 |
|---|---|---|---|---|---|---|---|---|---|---|---|---|---|
| Compound A | Type | A-1 | A-1 | A-12 | A-12 | A-1 | A-1 + A-16 (5:5) | A-1 | A-1 | A-1 | A-1 | A-1 | A-1 |
|  | Amount | 31.6 | 6.2 | 31.6 | 6.2 | 6.6 | 12.4 | 9.3 | 47.4 | 63.2 | 63.2 | 5.0 | 3.1 |
| Compound B | Type | B-1 | B-1 | B-2 | B-2 | B-1 | B-1 | B-1 | B-1 | B-1 | B-1 | B-1 | B-1 |
|  | Amount | 42.0 | 25.0 | 42.0 | 25.0 | 26.7 | 25.0 | 37.5 | 63.0 | 84.0 | 84.0 | 20.0 | 12.5 |
| Compound C-I | Type | C-1-1 | C-1-1 | C-4-1 | C-4-1 | C-1-1 | C-1-1 | C-1-1 | C-1-1 | C-1-1 | C-1-1 | C-1-1 | C-1-1 |
| Compound C-II |  | C-1-2 | C-1-2 | C-4-2 | C-4-2 | C-1-2 | C-1-2 | C-1-2 | C-1-2 | C-1-2 | C-1-2 | C-1-2 | C-1-2 |
|  | Amount | 21.2 | 37.6 | 21.2 | 37.6 | 40.0 | 37.6 | 56.4 | 31.8 | 42.4 | 42.4 | 30.1 | 18.8 |
| Compound D | Type | D-1 | D-1 | D-2 | D-2 | D-1 | D-1 | D-1 | D-1 | D-1 | D-1 | D-1 | D-1 |
|  | Amount | 4.8 | 25.0 | 4.8 | 25.0 | 26.7 | 25.0 | 37.5 | 7.2 | 9.6 | 9.6 | 20.0 | 12.5 |
| Compound E | Type | E-1 | E-1 | E-1 | E-1 | — | — | E-1 | E-1 | E-1 | E-1 | E-1 | E-1 |
|  | Amount | 0.4 | 6.2 | 0.4 | 6.2 | 0.0 | 0.0 | 9.3 | 0.6 | 0.8 | 0.8 | 5.0 | 3.1 |
| Compound represented by general formula (II) | Type | — | — | (P-3) | (P-3) | (P-4) | (P-4) | (P-4) | (P-4) | (P-4) | (P-4) | (P-4) | (P-4) |
|  | Amount | 0.0 | 0.0 | 10.0 | 10.0 | 10.0 | 10.0 | 15.0 | 15.0 | 20.0 | 20.0 | 8.0 | 5.0 |
| Chelating agent | Type | — | — | — | — | — | — | EDTA4Li | EDTA4Li | EDTA4Li | — | — | — |
|  | Amount | 0.00 | 0.00 | 0.00 | 0.00 | 0.00 | 0.00 | 0.15 | 0.15 | 0.20 | 0.00 | 0.00 | 0.00 |
| Preservative | Amount | 2.2 | 2.2 | 2.2 | 2.2 | 2.2 | 2.2 | 2.2 | 2.2 | 4.4 | 4.4 | 4.4 | 4.4 |

Unit of amount: g

Examples 79 to 80

Aqueous dye solutions 79 to 80 (1,000 g each) were prepared as in Example 67 except that mixtures including components shown in Table 26 below in the corresponding amounts shown in Table 26 below were used and a mixed aqueous solution containing 9 mol of sodium hydroxide and 1 mol of ammonia in 1 L was used as the pH adjusting agent instead of the 10 mol/L aqueous lithium hydroxide solution. The preservative is the same as that in Example 67.

"A-12+A-14 (9:1)" of Examples 79 and 80 in Table 26 indicates that A-12 and A-14 were used in combination at a mass ratio of A-12:A-14=9:1 and means that 5.58 g of A-12 and 0.62 g of A-14 were used.

"B-2+B-17 (9:1)" indicates that B-2 and B-17 were used in combination at a mass ratio of B-2:B-17=9:1 and means that 22.50 g of B-2 and 2.50 g of B-17 were used.

"C-4-1+C-9-1 (9:1), C-4-2+C-9-2 (9:1)" indicates that C-4-1+C-4-2 and C-9-1+C-9-2 were used in combination at a mass ratio of (C-4-1+C-4-2):(C-9-1+C-9-2)=9:1 and means that C-4-1 and C-4-2 were used in an amount of 33.84 g in total, and C-9-1 and C-9-2 were used in an amount of 3.76 g in total.

"D-2+D-9 (9:1)" indicates that D-2 and D-9 were used in combination at a mass ratio of D-2:D-9=9:1 and means that 22.50 g of D-2 and 2.50 g of D-9 were used.

"(P-3)+(P-5) (9:1)" indicates that (P-3) and (P-5) were used in combination at a mass ratio of (P-3):(P-5)=9:1 and means that 9.0 g of (P-3) and 1.0 g of (P-5) were used.

TABLE 26

| | | Example 79 | Example 80 |
|---|---|---|---|
| Compound A | Type | A-12 + A-14 (9:1) | A-12 + A-14 (9:1) |
| | Amount | 6.2 | 6.2 |
| Compound B | Type | B-2 + B-17 (9:1) | B-2 + B-17 (9:1) |
| | Amount | 25.0 | 25.0 |
| Compound C-I | Type | C-4-1 + C-9-1 (9:1) | C-4-1 + C-9-1 (9:1) |
| Compound C-II | | C-4-2 + C-9-2 (9:1) | C-4-2 + C-9-2 (9:1) |
| | Amount | 37.6 | 37.6 |
| Compound D | Type | D-2 + D-9 (9:1) | D-2 + D-9 (9:1) |
| | Amount | 25.0 | 25.0 |
| Compound E | Type | E-1 | E-1 |
| | Amount | 6.2 | 6.2 |
| Compound represented by general formula (II) | Type | (P-3) + (P-5) (9:1) | (P-3) + (P-5) (9:1) |
| | Amount | 10.0 | 10.0 |
| Chelating agent | Type | — | EDTA4Na |
| | Amount | 0.00 | 0.15 |
| Preservative | Amount | 2.2 | 2.2 |

Unit of amount: g

With regard to the aqueous dye solutions 67 to 78 prepared in Examples 67 to 78, $(W_1/W_{AX}) \times 100$, $(W_2/W_{AX}) \times 100$, $(W_3/W_{AX}) \times 100$, $(W_4/W_{AX}) \times 100$, $(W_5/W_{AX}) \times 100$, $(W_{AX}/W_A) \times 100$, and $(W_P/W_A) \times 100$ are shown in Table 27 below.

All "%" described in Table 27 below are percentages based on the mass (that is, "% by mass").

In Table 27 below, "$W_{AX}$" related to Examples 67 to 70 and 73 to 78 represents "$W_{A2}$", and "$W_{AX}$" related to Examples 71 to 72 represents "$W_{A1}$".

With regard to the aqueous dye solutions 79 to 80 prepared in Examples 79 to 80, $(W_1/W_{A2}) \times 100$, $(W_2/W_{A2}) \times 100$, $(W_3/W_{A2}) \times 100$, $(W_4/W_{A2}) \times 100$, $(W_5/W_{A2}) \times 100$, $(W_{A2}/W_A) \times 100$, and $(W_P/W_A) \times 100$ are shown in Table 28 below.

All "%" described in Table 28 below are percentages based on the mass (that is, "% by mass").

TABLE 27

| | Example 67 | Example 68 | Example 69 | Example 70 | Example 71 | Example 72 | Example 73 | Example 74 | Example 75 | Example 76 | Example 77 | Example 78 |
|---|---|---|---|---|---|---|---|---|---|---|---|---|
| $(W_1/W_{AX}) \times 100$ | 31.6% | 6.2% | 31.6% | 6.2% | 6.6% | 12.4% | 6.2% | 31.6% | 31.6% | 31.6% | 6.2% | 6.2% |
| $(W_2/W_{AX}) \times 100$ | 42.0% | 25.0% | 42.0% | 25.0% | 26.7% | 25.0% | 25.0% | 42.0% | 42.0% | 42.0% | 25.0% | 25.0% |
| $(W_3/W_{AX}) \times 100$ | 21.2% | 37.6% | 21.2% | 37.6% | 40.0% | 37.6% | 37.6% | 21.2% | 21.2% | 21.2% | 37.6% | 37.6% |
| $(W_4/W_{AX}) \times 100$ | 4.8% | 25.0% | 4.8% | 25.0% | 26.7% | 25.0% | 25.0% | 4.8% | 4.8% | 4.8% | 25.0% | 25.0% |
| $(W_5/W_{AX}) \times 100$ | 0.4% | 6.2% | 0.4% | 6.2% | 0.0% | 0.0% | 6.2% | 0.4% | 0.4% | 0.4% | 6.2% | 6.2% |
| $(W_{AX}/W_A) \times 100$ | 10.0% | 10.0% | 10.0% | 10.0% | 10.0% | 10.0% | 15.0% | 15.0% | 20.0% | 20.0% | 8.0% | 5.0% |
| $(W_P/W_A) \times 100$ | 0.0% | 0.0% | 1.0% | 1.0% | 1.0% | 1.0% | 1.5% | 1.5% | 2.0% | 2.0% | 0.8% | 0.5% |

TABLE 28

| | Example 79 | Example 80 |
|---|---|---|
| $(W_1/W_{A2}) \times 100$ | 6.2% | 6.2% |
| $(W_2/W_{A2}) \times 100$ | 25.0% | 25.0% |
| $(W_3/W_{A2}) \times 100$ | 37.6% | 37.6% |
| $(W_4/W_{A2}) \times 100$ | 25.0% | 25.0% |
| $(W_5/W_{A2}) \times 100$ | 6.2% | 6.2% |
| $(W_{A2}/W_A) \times 100$ | 10.0% | 10.0% |
| $(W_P/W_A) \times 100$ | 1.0% | 1.0% |

Storage Stability of Aqueous Dye Solution

The evaluation of storage stability was performed after each of the aqueous dye solutions prepared in Examples 67 to 80 was preserved at 60° C. and a relative humidity of 50% for 4 weeks, after the aqueous dye solution was preserved at 60° C. and a relative humidity of 50% for 10 weeks, and after the aqueous dye solution was preserved at 60° C. and a relative humidity of 50% for 15 weeks, as a forced test.

The storage stability was evaluated in three grades. When substantially the same physical properties (a viscosity, a surface tension, and an absorbance value) as those of the aqueous dye solution immediately after the preparation of the aqueous dye solution were maintained, the aqueous dye solution was evaluated as A. When the physical property value of the solution changed by ±5% or more in one item after the forced test, the aqueous dye solution was evaluated as B. When the physical property value of the solution changed by ±5% or more in two or more items after the forced test, the aqueous dye solution was evaluated as C. The viscosity, the surface tension, and the absorbance value were measured by the methods described below.

Viscosity

After 1.5 mL of the undiluted solution of the aqueous dye solution was measured, the measurement was performed with a viscometer (RE85) manufactured by Toki Sangyo Co., Ltd. in an environment at 25° C. and a relative humidity of 50% to 70% for a measurement time of 2 minutes.

Surface Tension

After 5 mL of the undiluted solution of the aqueous dye solution was measured, the measurement was performed with a surface tensiometer (DY-200) manufactured by Kyowa Interface Science Co., Ltd. in an environment at 25° C. and a relative humidity of 30% using a platinum plate.

Absorbance Value

After 450 mg of the undiluted solution of the aqueous dye solution was weighed, the undiluted solution was diluted with deionized water up to 50 mL, and 2 mL of the resulting diluted solution was further diluted with deionized water up to 50 mL. The diluted aqueous dye solution was then poured into a quartz cell with a size of 1 cm×1 cm, and the absorbance in the range of 350 nm to 900 nm was measured with a UV-Vis spectrophotometer (UV-1800) manufactured by Shimadzu Corporation in an environment at 25° C. and a relative humidity of 50%. The absorbance at λmax in the visible range (400 to 700 nm) was checked, and a change before and after the forced test was then calculated.

Table 29 below shows the results.

TABLE 29

| | Storage stability | | | |
|---|---|---|---|---|
| | After 4-week forced test | After 10-week forced test | After 15-week forced test | Concentration of dye |
| Example 67 | A | A | B | 10% by mass |
| Example 68 | A | A | B | 10% by mass |
| Example 69 | A | A | B | 10% by mass |
| Example 70 | A | A | B | 10% by mass |
| Example 71 | A | A | B | 10% by mass |
| Example 72 | A | A | B | 10% by mass |
| Example 73 | A | A | A | 15% by mass |
| Example 74 | A | A | A | 15% by mass |
| Example 75 | A | B | B | 20% by mass |
| Example 76 | B | B | B | 20% by mass |
| Example 77 | A | A | A | 8% by mass |
| Example 78 | A | B | B | 5% by mass |
| Example 79 | A | A | B | 10% by mass |
| Example 80 | A | A | A | 10% by mass |

The results showed that the aqueous dye solutions of Examples of the present invention had good storage stability even when the aqueous dye solutions included dyes in high concentrations. In particular, when the concentration of the dye was 8% to 15% by mass, the physical properties of the liquids did not change even after the forced test was performed for 10 weeks, and thus the storage stability was found to be very high. Moreover, in the case of using a chelating agent in combination, the physical properties of the liquids did not change even after the forced test was performed for 15 weeks, and thus the storage stability was found to be extremely high.

According to the present invention, it is possible to provide a dye ink composition that enables the formation of an image having high printing density on both ink jet paper and plain paper, that enables stable ejection of an ink even during long time use (that has good continuous ejection stability), and that enables the formation of an image having high printing density and has good continuous ejection stability even after a long period of time has passed after preparation; a cyan dye ink including the dye ink composition; a dye ink for ink jet recording, the dye ink including the dye ink composition; an ink jet recording method using the dye ink for ink jet recording; and an aqueous dye solution that can be used to produce the dye ink composition.

The present invention has been described in detail and with reference to specific embodiments. It is obvious for those skilled in the art that various changes and modifications can be made without departing from the spirit and scope of the present invention.

What is claimed is:

1. A dye ink composition comprising:
   a compound A represented by the following general formula (I-1);
   a compound B represented by the following general formula (I-2);
   at least one of a compound C-I represented by the following general formula (I-3-1) or a compound C-II represented by the following general formula (I-3-2);
   a compound D represented by the following general formula (I-4); and
   water,

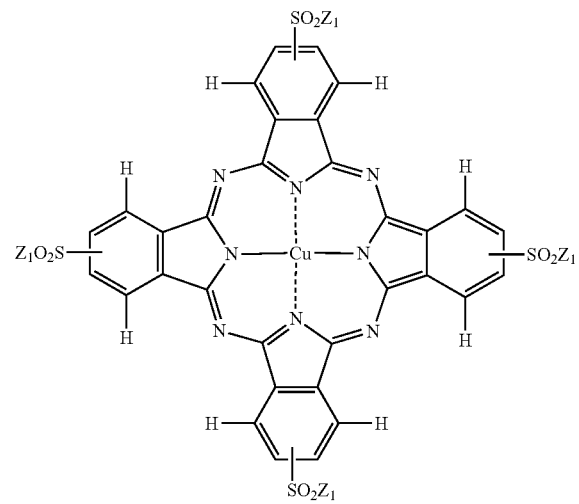

(I-1)

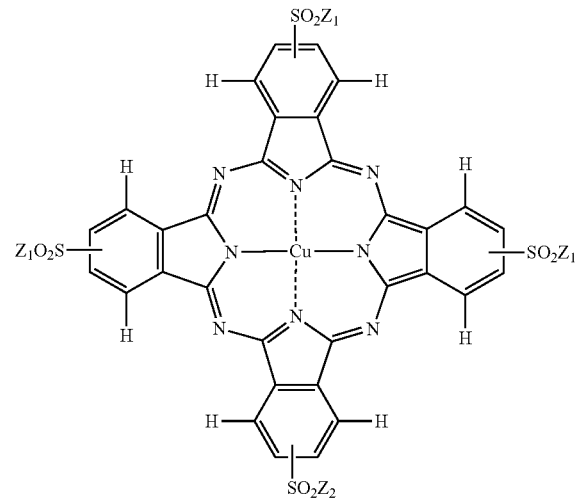

(I-2)

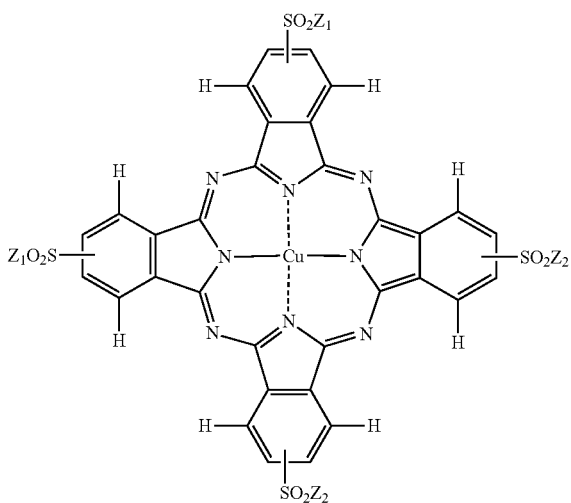
(I-3-1)

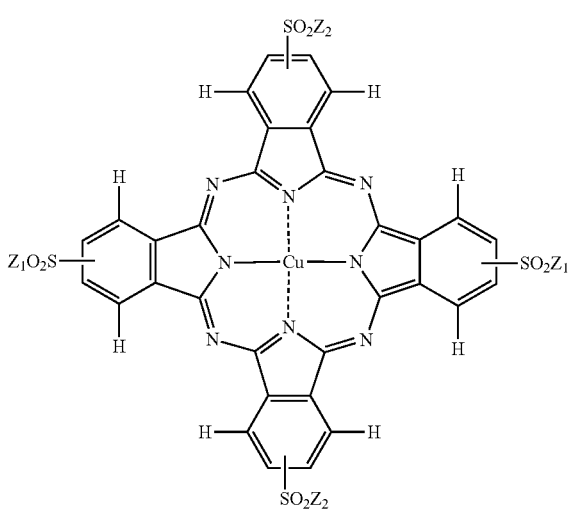
(I-3-2)

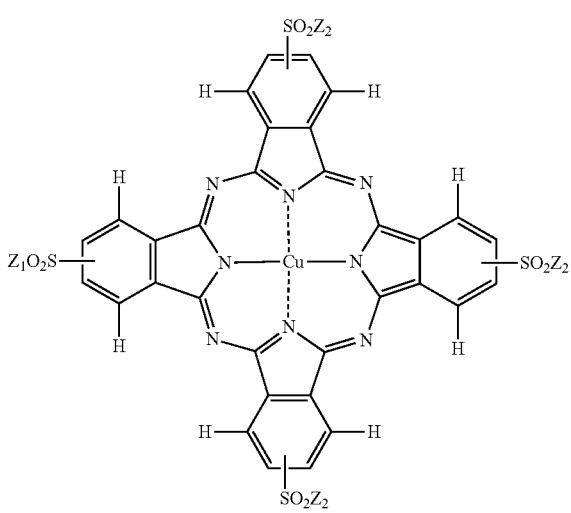
(I-4)

wherein, in the general formulae (I-1), (I-2), (I-3-1), (1-3-2), and (I-4), each $Z_1$ represents an alkyl group, an aryl group, or a heterocyclic group, the alkyl group, the aryl group, and the heterocyclic group having a substituent that has at least one ionic hydrophilic group; a plurality of $Z_1$'s in the general formulae (I-1), (I-2), (I-3-1), and (1-3-2) may be the same as or different from each other;

wherein, in the general formulae (I-2), (I-3-1), (1-3-2), and (I-4), each $Z_2$ represents a substituted or unsubstituted alkyl group, a substituted or unsubstituted aryl group, or a substituted or unsubstituted heterocyclic group; each $Z_2$ does not have an ionic hydrophilic group; and a plurality of $Z_2$'s in the general formulae (I-3-1), (1-3-2), and (I-4) may be the same as or different from each other; and wherein, in the dye ink composition, in a case where a mass of the compound A is represented by $W_1$, a mass of the compound B is represented by $W_2$, a sum of a mass of the compound C-I and a mass of the compound C-II is represented by $W_3$, a mass of the compound D is represented by $W_4$, and a total sum of $W_1$, $W_2$, $W_3$, and $W_4$ is represented by $W_{A1}$, a ratio of $W_1$ to $W_{A1}$ is 6.0% to 35.0% by mass,
a ratio of $W_2$ to $W_{A1}$ is 20.0% to 45.0% by mass,
a ratio of $W_3$ to $W_{A1}$ is 15.0% to 45.0% by mass, and
a ratio of $W_4$ to $W_{A1}$ is 1.0% to 30.0% by mass.

2. The dye ink composition according to claim 1, wherein $Z_2$ has at least one of a hydroxy group or a tertiary nitrogen atom.

3. The dye ink composition according to claim 1, wherein the ionic hydrophilic group is at least one of —SO$_3$M, —CO$_2$M, or —PO(OM)$_2$ wherein M represents a hydrogen atom or a counter cation.

4. The dye ink composition according to claim 2, wherein the ionic hydrophilic group is at least one of —SO$_3$M, —CO$_2$M, or —PO(OM)$_2$ wherein M represents a hydrogen atom or a counter cation.

5. The dye ink composition according to claim 1, wherein a ratio of $W_{A1}$ to a total mass of the dye ink composition is 3.0% by mass or more and 5.5% by mass or less.

6. The dye ink composition according to claim 2, wherein a ratio of $W_{A1}$ to a total mass of the dye ink composition is 3.0% by mass or more and 5.5% by mass or less.

7. The dye ink composition according to claim 3, wherein a ratio of $W_{A1}$ to a total mass of the dye ink composition is 3.0% by mass or more and 5.5% by mass or less.

8. The dye ink composition according to claim 1, further comprising:
a compound represented by the following general formula (II),

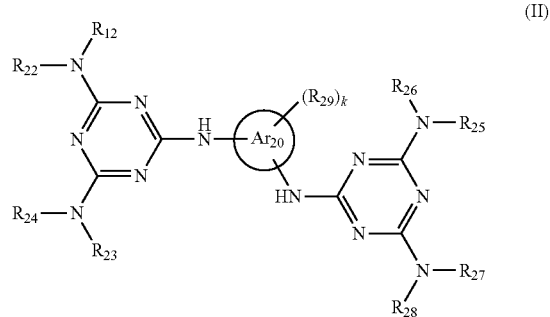
(II)

wherein, in the general formula (II), Ar$_{20}$ represents a benzene ring or a naphthalene ring; $R_{21}$ to $R_{28}$ each independently represent a hydrogen atom or a substituent; $R_{21}$ and $R_{22}$ may be linked to each other to form a ring; $R_{23}$ and $R_{24}$ may be linked to each other to form a ring; $R_{25}$ and $R_{26}$ may be linked to each other to form a ring; $R_{27}$ and $R_{28}$ may be linked to each other to form a ring; $R_{29}$ represents a substituent; in a case where $Ar_{20}$ represents a benzene ring, k represents an integer of 0 to 4; in a case where $Ar_{20}$ represents a naphthalene ring, k represents an integer of 0 to 6; in a case where a plurality of $R_{29}$'s are present, the plurality of $R_{29}$'s may be the same as or different from each other; and in a case where a plurality of $R_{29}$'s are present, the plurality of $R_{29}$'s may be linked to each other to form a ring; and at least any one of $R_{21}$ to $R_{29}$ has a hydrophilic group.

9. The dye ink composition according to claim 8, wherein a content of the compound represented by the general formula (II) is 0.5% to 3.0% by mass with respect to a total mass of the dye ink composition.

10. The dye ink composition according to claim 1, further comprising:
a compound represented by the following general formula (Cy-1),

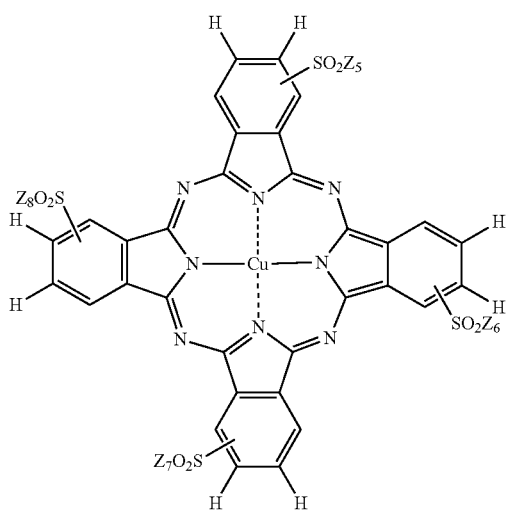

(Cy-1)

wherein, in the general formula (Cy-1), $Z_5$, $Z_6$, $Z_7$, and $Z_8$ each independently represent a substituted or unsubstituted alkyl group, a substituted or unsubstituted aryl group, or a substituted or unsubstituted heterocyclic group, and at least one of $Z_5$, $Z_6$, $Z_7$, or $Z_8$ has a substituent that has an ionic hydrophilic group.

11. The dye ink composition according to claim 1, further comprising:
a compound represented by any of the following general formulae (Cy-2) to (Cy-5),

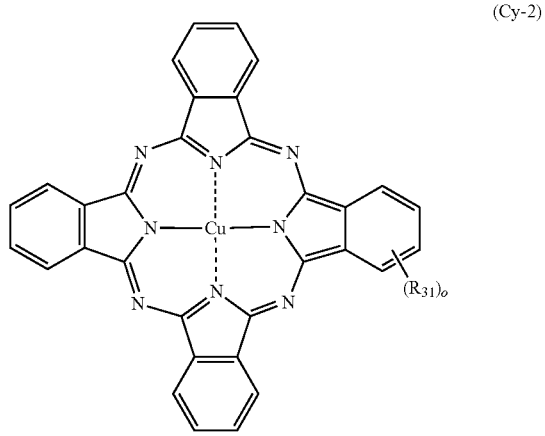

(Cy-2)

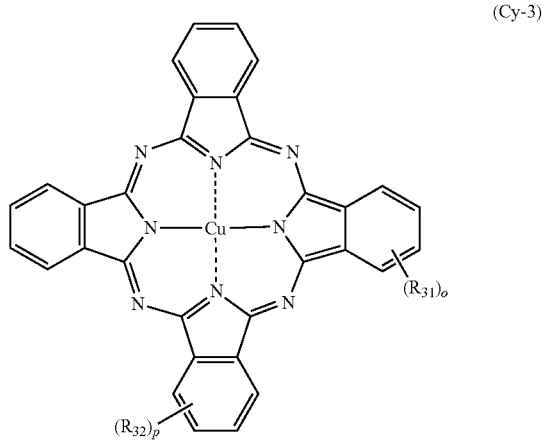

(Cy-3)

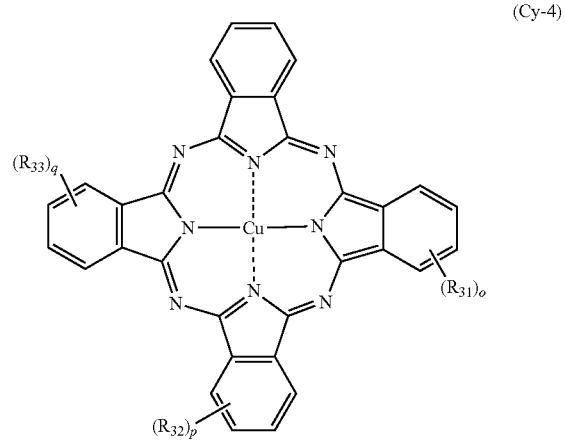

(Cy-4)

-continued

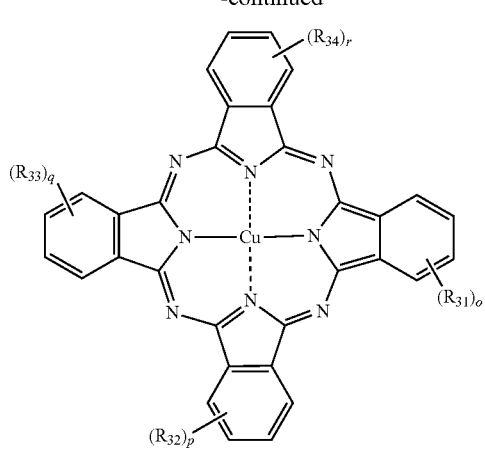

(Cy-5)

wherein, in the general formulae (Cy-2) to (Cy-5), $R_{31}$, $R_{32}$, $R_{33}$, and $R_{34}$ each independently represent a substituted or unsubstituted sulfamoyl group, a substituted or unsubstituted carbamoyl group, a sulfo group, or a carboxy group; in a case where a plurality of $R_{31}$'s are present, the plurality of $R_{31}$'s may be the same as or different from each other; in a case where a plurality of $R_{32}$'s are present, the plurality of $R_{32}$'s may be the same as or different from each other; in a case where a plurality of $R_{33}$'s are present, the plurality of $R_{33}$'s may be the same as or different from each other; in a case where a plurality of $R_{34}$'s are present, the plurality of $R_{34}$'s may be the same as or different from each other; and o, p, q, and r each independently represent an integer of 1 to 4.

12. The dye ink composition according to claim 1, further comprising a chelating agent.

13. The dye ink composition according to claim 1, further comprising a preservative.

14. A cyan dye ink comprising the dye ink composition according to claim 1.

15. A dye ink for ink jet recording, the dye ink comprising the dye ink composition according to claim 1.

16. An ink jet recording method comprising ejecting the dye ink for ink jet recording according to claim 15 with a recording head for an ink jet process.

17. An aqueous dye solution comprising:
a preservative;
a compound A represented by the following general formula (I-1);
a compound B represented by the following general formula (I-2);
at least one of a compound C-I represented by the following general formula (I-3-1) or a compound C-II represented by the following general formula (I-3-2); and
a compound D represented by the following general formula (I-4),
wherein, in the aqueous dye solution, in a case where a mass of the compound A is represented by $W_1$, a mass of the compound B is represented by $W_2$, a sum of a mass of the compound C-I and a mass of the compound C-II is represented by $W_3$, a mass of the compound D is represented by $W_4$, and a total sum of $W_1$, $W_2$, $W_3$, and $W_4$ is represented by $W_{A1}$,
a ratio of $W_1$ to $W_{A1}$ is 6.0% to 35.0% by mass,
a ratio of $W_2$ to $W_{A1}$ is 20.0% to 45.0% by mass,
a ratio of $W_3$ to $W_{A1}$ is 15.0% to 45.0% by mass,
a ratio of $W_4$ to $W_{A1}$ is 1.0% to 30.0% by mass, and
a ratio of $W_{A1}$ to a total mass of the aqueous dye solution is 8% to 15% by mass,

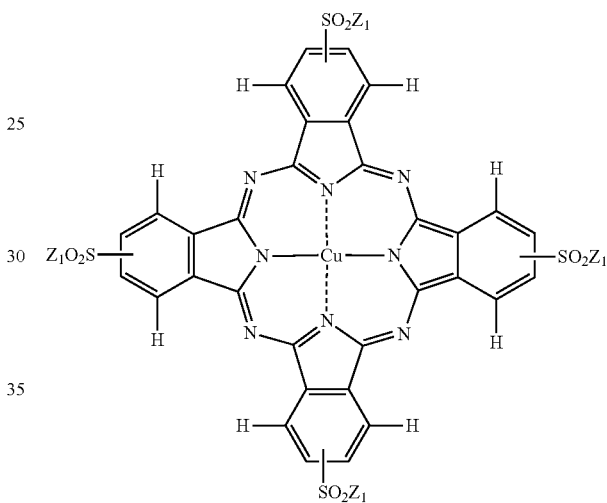

(I-1)

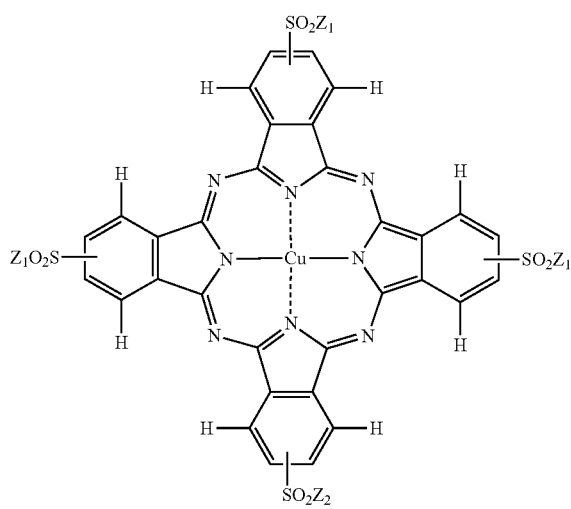

(I-2)

(I-3-1)

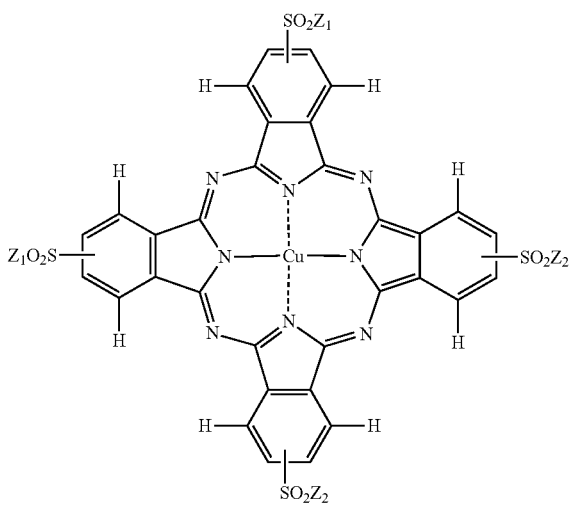

(I-3-2)

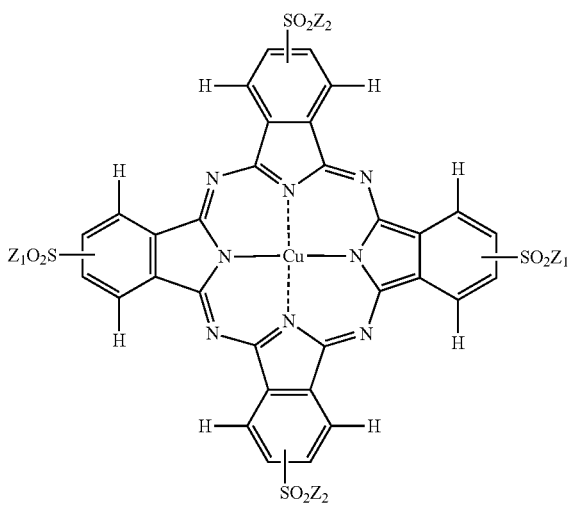

(I-4)

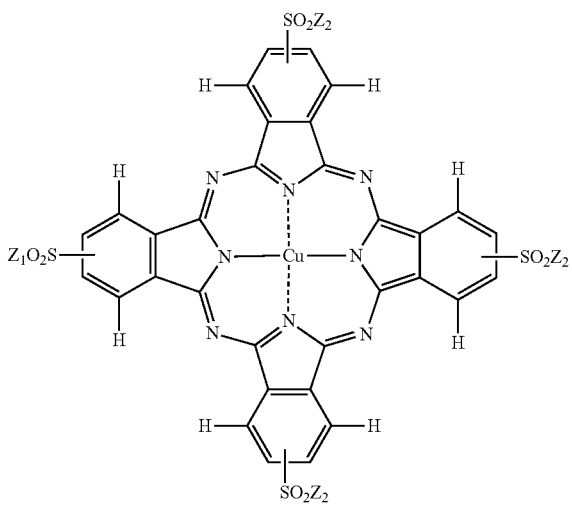

wherein, in the general formulae (I-1), (I-2), (I-3-1), (I-3-2), and (I-4), each $Z_1$ represents an alkyl group, an aryl group, or a heterocyclic group, the alkyl group, the aryl group, and the heterocyclic group having a substituent that has at least one ionic hydrophilic group; a plurality of $Z_1$'s in the general formulae (I-1), (I-2), (1-3-1), and (I-3-2) may be the same as or different from each other; and wherein, in the general formulae (I-2), (I-3-1), (I-3-2), and (I-4), each $Z_2$ represents a substituted or unsubstituted alkyl group, a substituted or unsubstituted aryl group, or a substituted or unsubstituted heterocyclic group; each $Z_2$ does not have an ionic hydrophilic group; and a plurality of $Z_2$'s in the general formulae (I-3-1), (I-3-2), and (I-4) may be the same as or different from each other.

18. The aqueous dye solution according to claim 17, further comprising a compound E represented by the following general formula (I-5), wherein, in the aqueous dye solution, in a case where a mass of the compound E is represented by $W_5$ and a total sum of $W_1$, $W_2$, $W_3$, $W_4$, and $W_5$ is represented by $W_{A2}$, a ratio of $W_{A2}$ to a total mass of the aqueous dye solution is 8% to 15% by mass, (I-5)

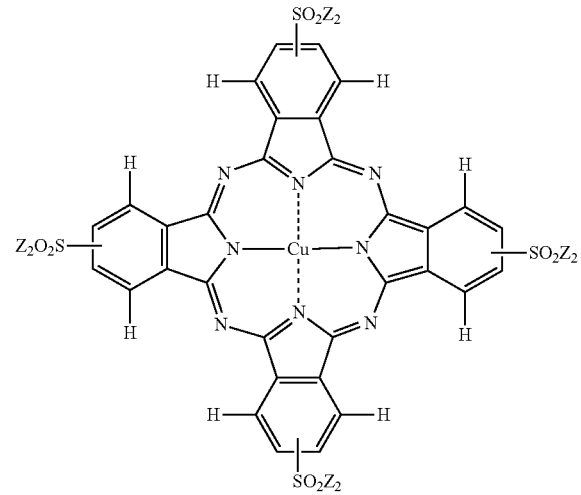

wherein, in the general formula (I-5), each $Z_2$ represents a substituted or unsubstituted alkyl group, a substituted or unsubstituted aryl group, or a substituted or unsubstituted heterocyclic group; each $Z_2$ does not have an ionic hydrophilic group; and a plurality of $Z_2$'s may be the same as or different from each other.

19. The aqueous dye solution according to claim 17, further comprising a compound represented by the following general formula (II), (II)

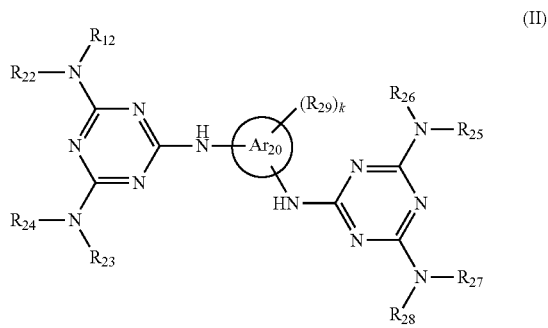

wherein, in the general formula (II), $Ar_{20}$ represents a benzene ring or a naphthalene ring; $R_{21}$ to $R_{28}$ each independently represent a hydrogen atom or a substituent; $R_{21}$ and $R_{22}$ may be linked to each other to form a ring; $R_{23}$ and $R_{24}$ may be linked to each other to form a ring; $R_{25}$ and $R_{26}$ may be linked to each other to form a ring; $R_{27}$ and $R_{28}$ may be linked to each other to form a ring; $R_{29}$ represents a substituent; in a case where $Ar_{20}$ represents a benzene ring, k represents an integer of 0 to 4; in a case where $Ar_{20}$ represents a naphthalene ring, k represents an integer of 0 to 6; in a case where a plurality of $R_{29}$'s are present, the plurality of $R_{29}$'s may be the same as or different from each other; and in a case where a plurality of $R_{29}$'s are present, the plurality of $R_{29}$'s may be linked to each other to form a ring; and at least any one of $R_{21}$ to $R_{29}$ has a hydrophilic group.

20. The aqueous dye solution according to claim 17, further comprising a chelating agent.

\* \* \* \* \*